(12) United States Patent
Wich-Vila

(10) Patent No.: US 10,353,720 B1
(45) Date of Patent: Jul. 16, 2019

(54) COMPUTER SYSTEM, METHOD, AND MEDIA FOR PREPARING QUALITATIVE ELEMENTS OF AN ACADEMIC APPLICATION

(71) Applicant: Maria Wich-Vila, Playa Vista, CA (US)

(72) Inventor: Maria Wich-Vila, Playa Vista, CA (US)

(73) Assignee: ApplicantLab Inc., Los Angeles, CA (US)

( * ) Notice: Subject to any disclaimer, the term of this patent is extended or adjusted under 35 U.S.C. 154(b) by 278 days.

(21) Appl. No.: 14/517,104

(22) Filed: Oct. 17, 2014

Related U.S. Application Data

(60) Provisional application No. 61/893,048, filed on Oct. 18, 2013, provisional application No. 62/016,230, filed on Jun. 24, 2014.

(51) Int. Cl.
  G06F 9/451 (2018.01)
  G06F 3/0484 (2013.01)
(52) U.S. Cl.
  CPC .......... *G06F 9/453* (2018.02); *G06F 3/04842* (2013.01)
(58) Field of Classification Search
  CPC .............................. G06F 9/4446; G06F 9/453
  USPC ......................................................... 715/708
  See application file for complete search history.

(56) References Cited

U.S. PATENT DOCUMENTS

| | | | |
|---|---|---|---|
| 6,302,698 B1 * | 10/2001 | Ziv-El | G09B 7/02 434/322 |
| 6,345,278 B1 | 2/2002 | Hitchock et al. | |
| 6,460,042 B1 | 10/2002 | Hitchock et al. | |
| 6,688,889 B2 * | 2/2004 | Wallace | G09B 7/06 434/307 R |
| 7,376,891 B2 | 5/2008 | Hitchock et al. | |
| 7,640,209 B1 * | 12/2009 | Brooks | G06Q 40/025 705/38 |

(Continued)

OTHER PUBLICATIONS

Essay Writing Service by Essaytrust.com, May 2013, https://web.archive.org/web/20130606072804/http://essaytrust.com:80/write_my_essay, downloaded Jan. 2018.*

(Continued)

*Primary Examiner* — Ryan F Pitaro
*Assistant Examiner* — Henry Orr
(74) *Attorney, Agent, or Firm* — Carrie M. Stroup

(57) ABSTRACT

A computerized method, system and media that assists the user in creating optimal answers for an academic or employment application and interview. The computer processor: computes a "brand" for the user to characterize and differentiate himself from other applicants; guides them through brainstorming their unique stories or anecdotes, and then allocating their stories or personal traits amongst the discrete pieces of an application; checks to make sure that an optimal mix of stories is being used; guides a user on a strategy for soliciting strong letters of recommendation; advises on the best type of resume to construct; breaks down a specific set of essay or interview questions into sub-questions; compiles and rearranges the sub-questions into a rough draft; provides guidance on how to create a final draft; automatedly solicits editing feedback from third parties; and, prepares the user for an interview, to include recording and critiquing a mock videotaped interview.

8 Claims, 23 Drawing Sheets

(56) References Cited

U.S. PATENT DOCUMENTS

| | | | | |
|---|---|---|---|---|
| 8,266,068 B1* | 9/2012 | Foss | G06Q 10/06 | 705/321 |
| 8,601,002 B1* | 12/2013 | Ali | G06F 16/24578 | 707/748 |
| 8,655,793 B2* | 2/2014 | Asaimuthu | G06Q 10/1053 | 705/321 |
| 8,849,740 B2* | 9/2014 | Liu | G06Q 10/06 | 706/48 |
| 9,454,584 B1* | 9/2016 | Ostler | G06F 16/81 | |
| 2001/0031458 A1 | 10/2001 | Schramm | | |
| 2002/0180770 A1* | 12/2002 | Sirhall | G06F 3/0481 | 715/700 |
| 2003/0034999 A1* | 2/2003 | Coughlin, III | G09B 7/00 | 715/738 |
| 2003/0093322 A1* | 5/2003 | Sciuk | G06Q 10/1053 | 705/7.32 |
| 2003/0148253 A1* | 8/2003 | Sacco | G09B 7/00 | 434/322 |
| 2004/0186743 A1* | 9/2004 | Cordero, Jr. | G06Q 10/1053 | 705/321 |
| 2006/0105303 A1* | 5/2006 | Ames | G09B 19/00 | 434/165 |
| 2006/0265258 A1 | 11/2006 | Powell et al. | | |
| 2007/0162455 A1* | 7/2007 | Oney | G06F 16/3329 | |
| 2007/0198319 A1* | 8/2007 | Sciuk | G06Q 10/06316 | 705/7.26 |
| 2007/0198572 A1* | 8/2007 | Sciuk | G06F 16/00 | |
| 2007/0218449 A1 | 9/2007 | Reck et al. | | |
| 2008/0026360 A1* | 1/2008 | Hull | G09B 7/00 | 434/324 |
| 2008/0178084 A1* | 7/2008 | Morse | G06F 17/24 | 715/708 |
| 2009/0299993 A1* | 12/2009 | Novack | G06Q 10/06 | |
| 2009/0311653 A1* | 12/2009 | Kim | G09B 3/02 | 434/128 |
| 2009/0319289 A1* | 12/2009 | Pande | G06Q 10/105 | 705/1.1 |
| 2011/0060695 A1* | 3/2011 | Boyland | G06Q 10/06 | 705/327 |
| 2011/0131120 A1* | 6/2011 | Sciuk | G06Q 10/063112 | 705/34 |
| 2011/0271203 A1* | 11/2011 | Fraser | G06Q 10/10 | 715/752 |
| 2012/0078803 A1* | 3/2012 | MacArthur | G06Q 10/063112 | 705/319 |
| 2012/0221477 A1* | 8/2012 | Pande | G06Q 10/10 | 705/321 |
| 2012/0329014 A1 | 12/2012 | Pham | | |
| 2014/0188904 A1* | 7/2014 | Sciuk | G06Q 30/0633 | 707/749 |
| 2015/0050631 A1* | 2/2015 | Reynaldo | G09B 7/02 | 434/308 |
| 2016/0283905 A1* | 9/2016 | Lahti | G06Q 10/105 | |

OTHER PUBLICATIONS

IvyEssays, Professional Editing services and essays sales, May 2012, https://web.archive.org/web/20120502020057/http://www.ivyessays.com:80/buy.aspdownloaded Jan. 2018.*

Website by Inventor: "MBA Admissions is a tough game. We Teach You How to Win It." https://applicantlab.com/. First posted Jun. 2014.

* cited by examiner

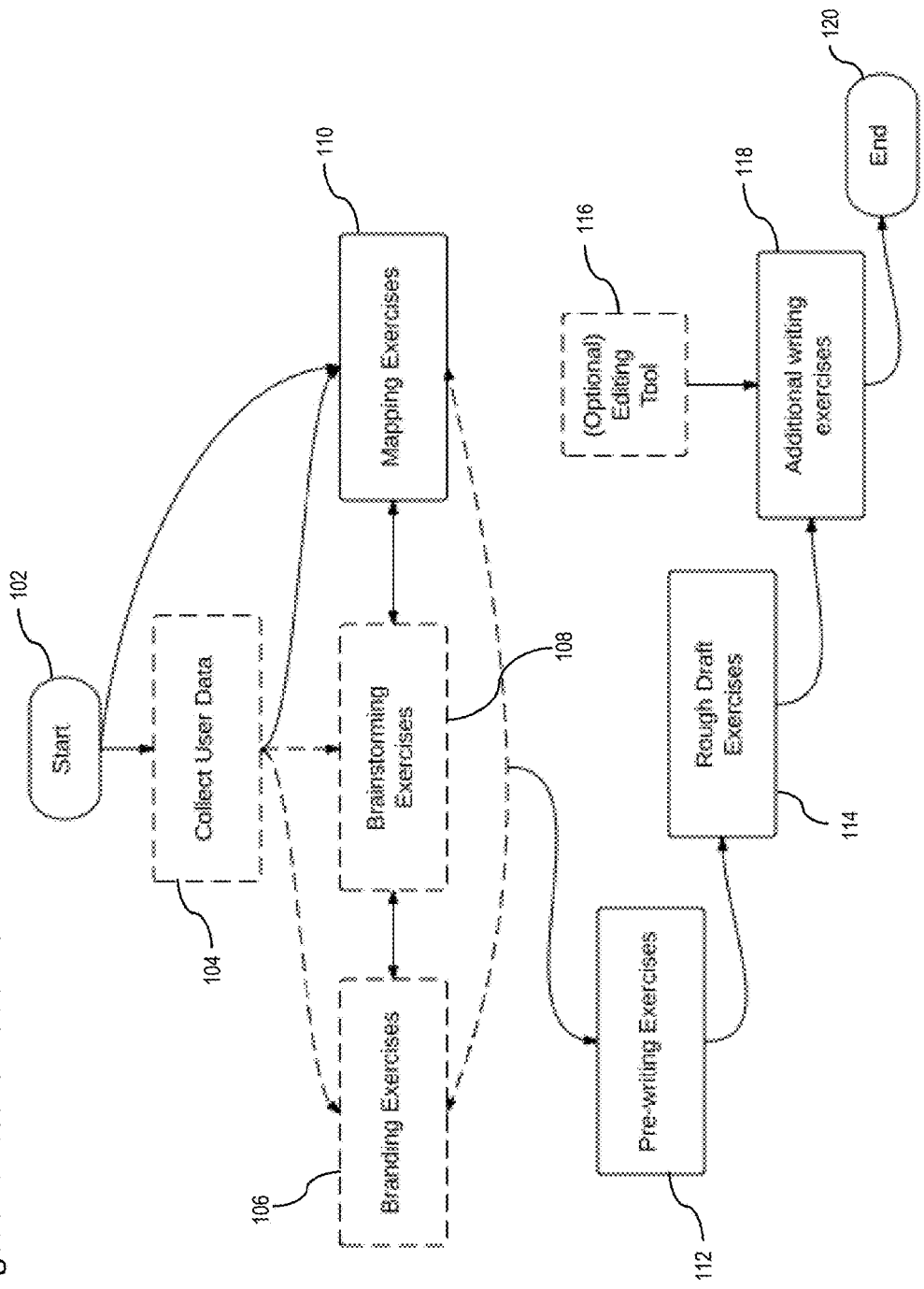
Figure 1: Method Overview

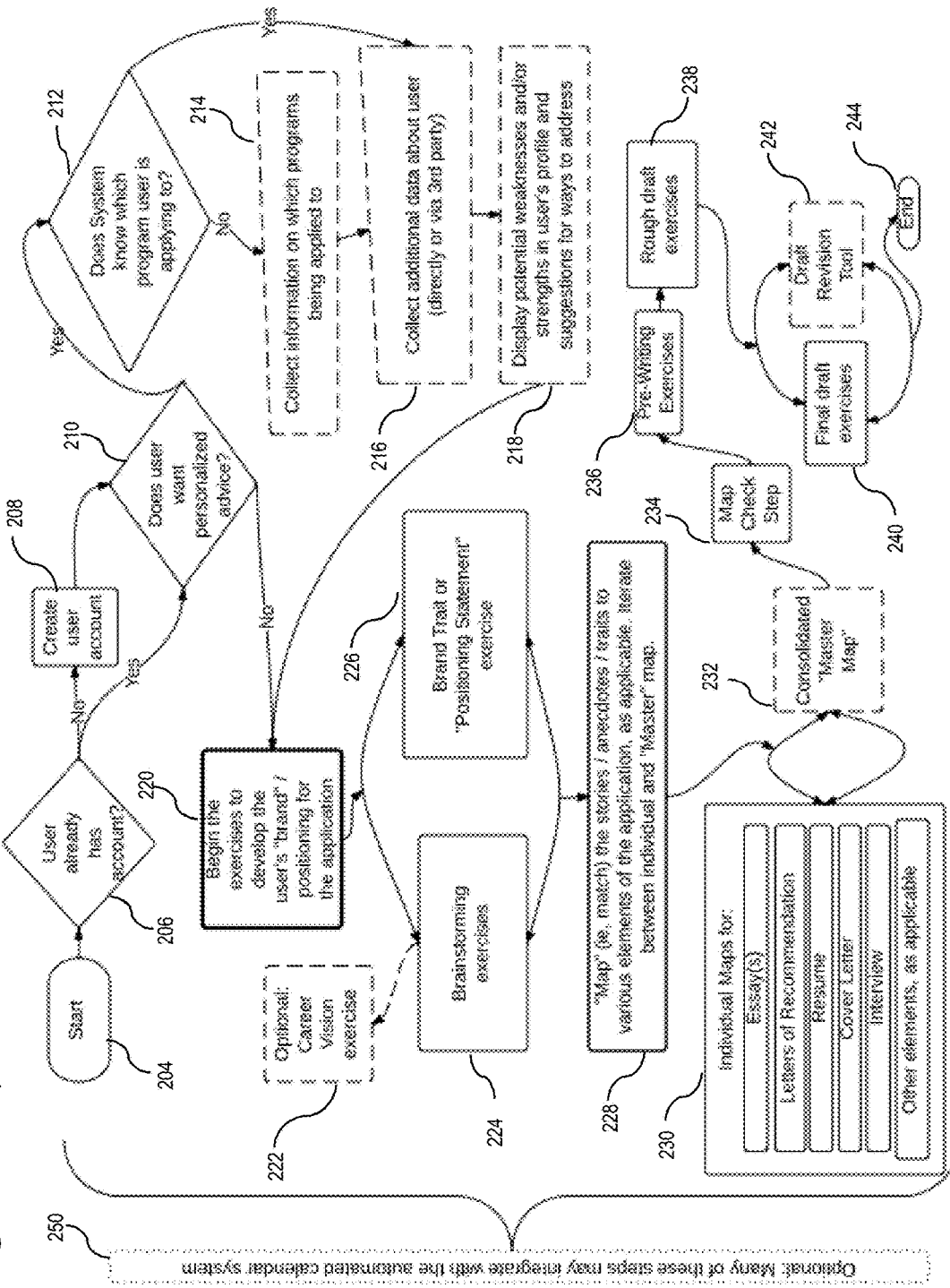
Figure 2: Sample Method Embodiment

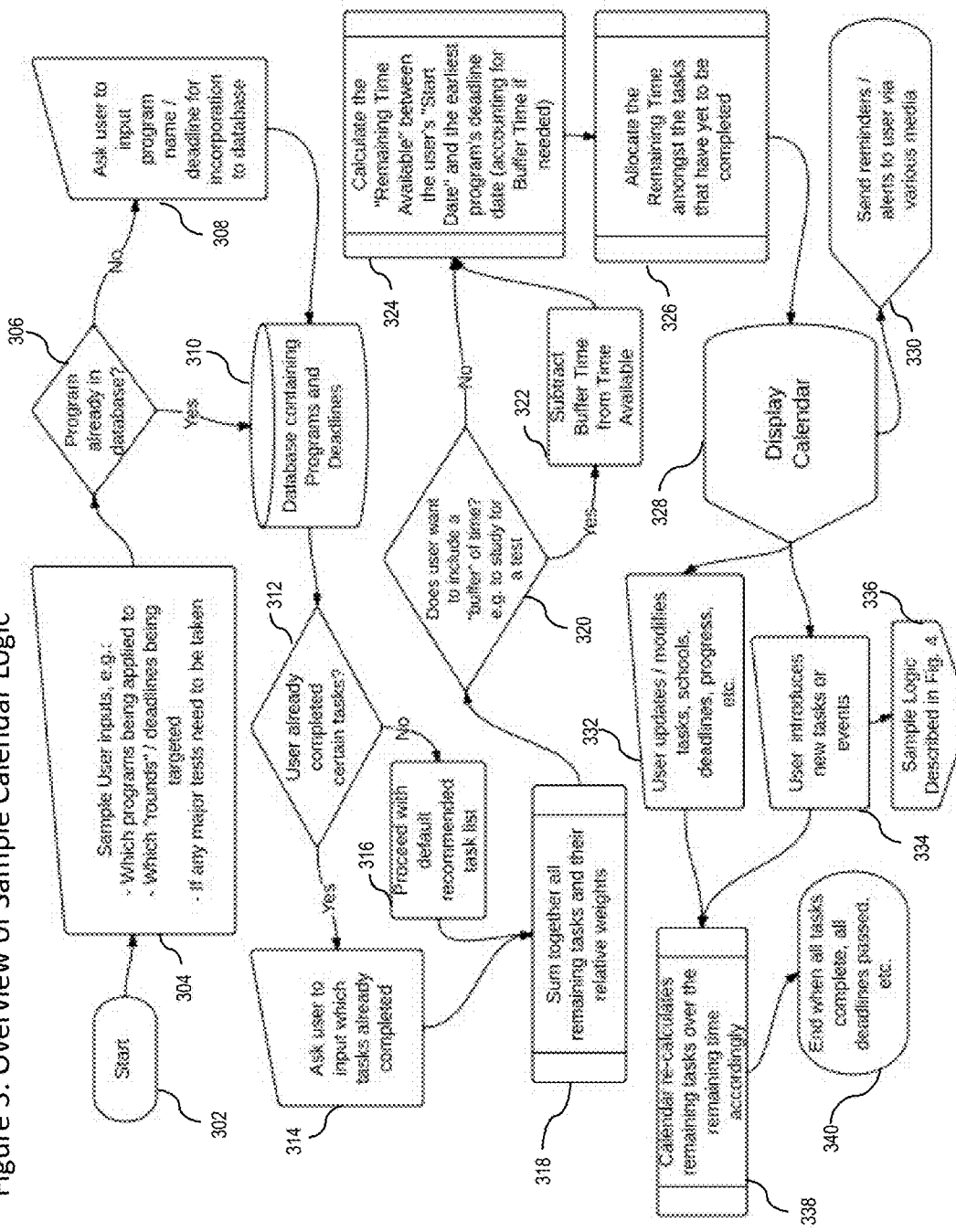
Figure 3: Overview of Sample Calendar Logic

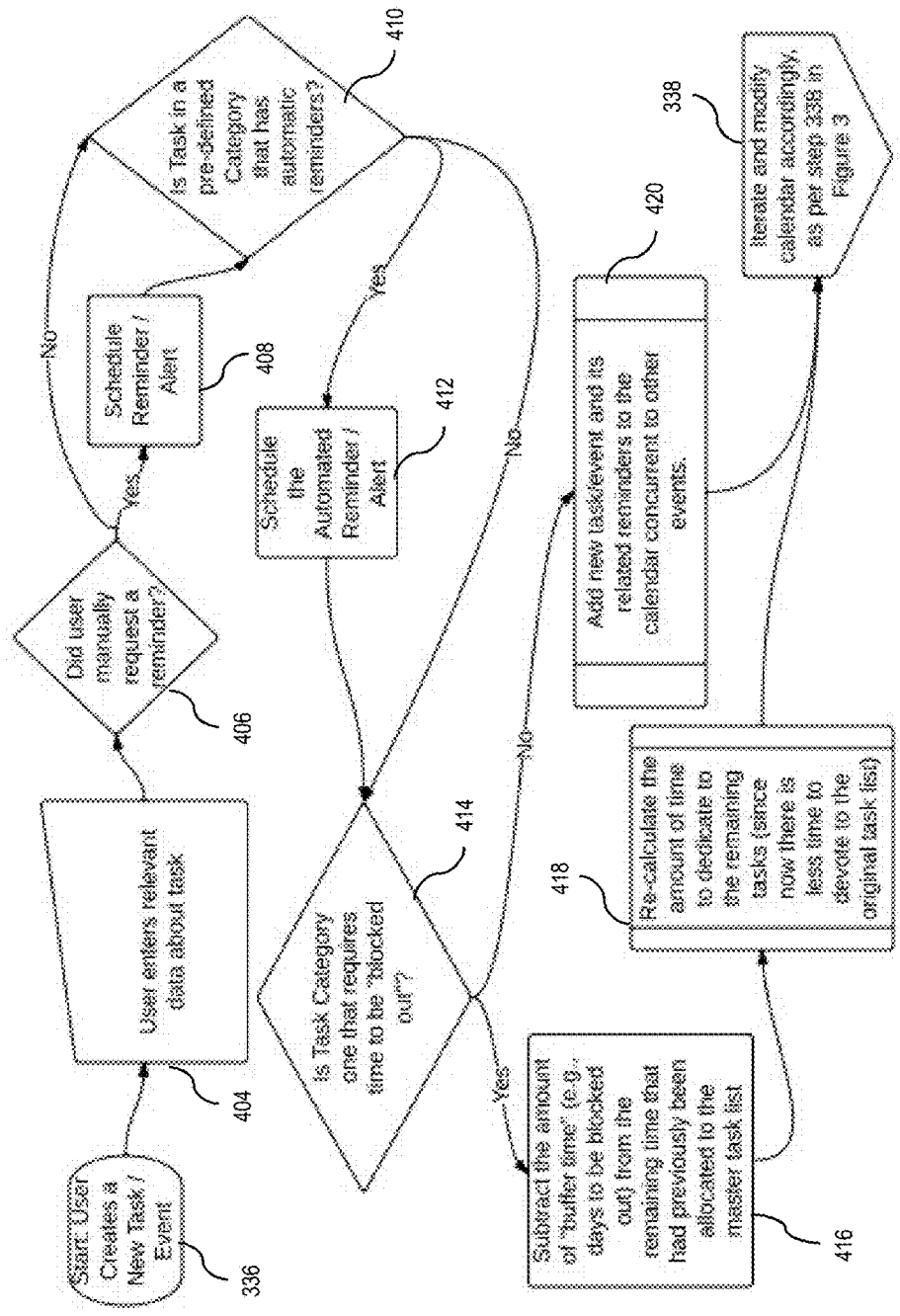
Figure 4: Overview of Sample Calendar Logic for User-Added Task

Figure 5: Advice Displayed, Based Upon User's Data / Meta-Data

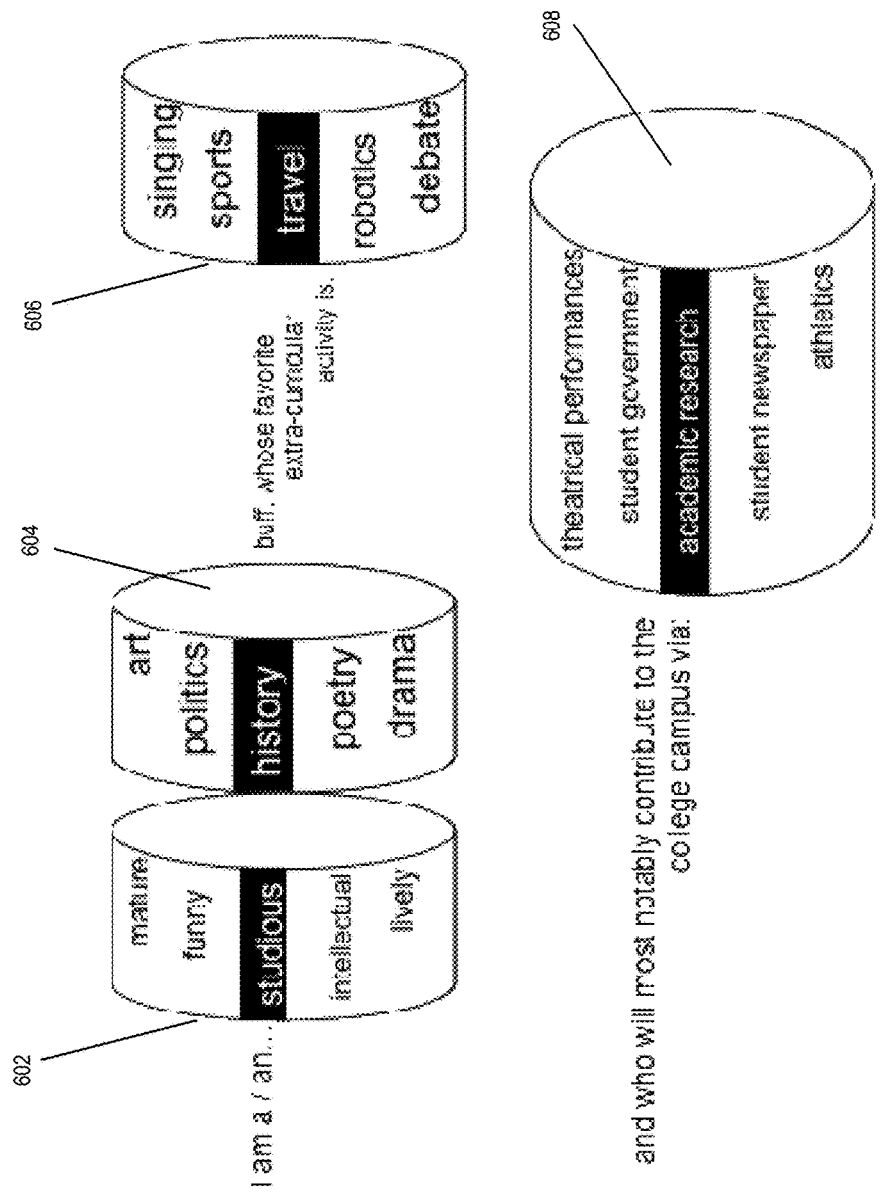
Figure 6: Sample Sub-Method for Creating a Sample "Brand Statement"

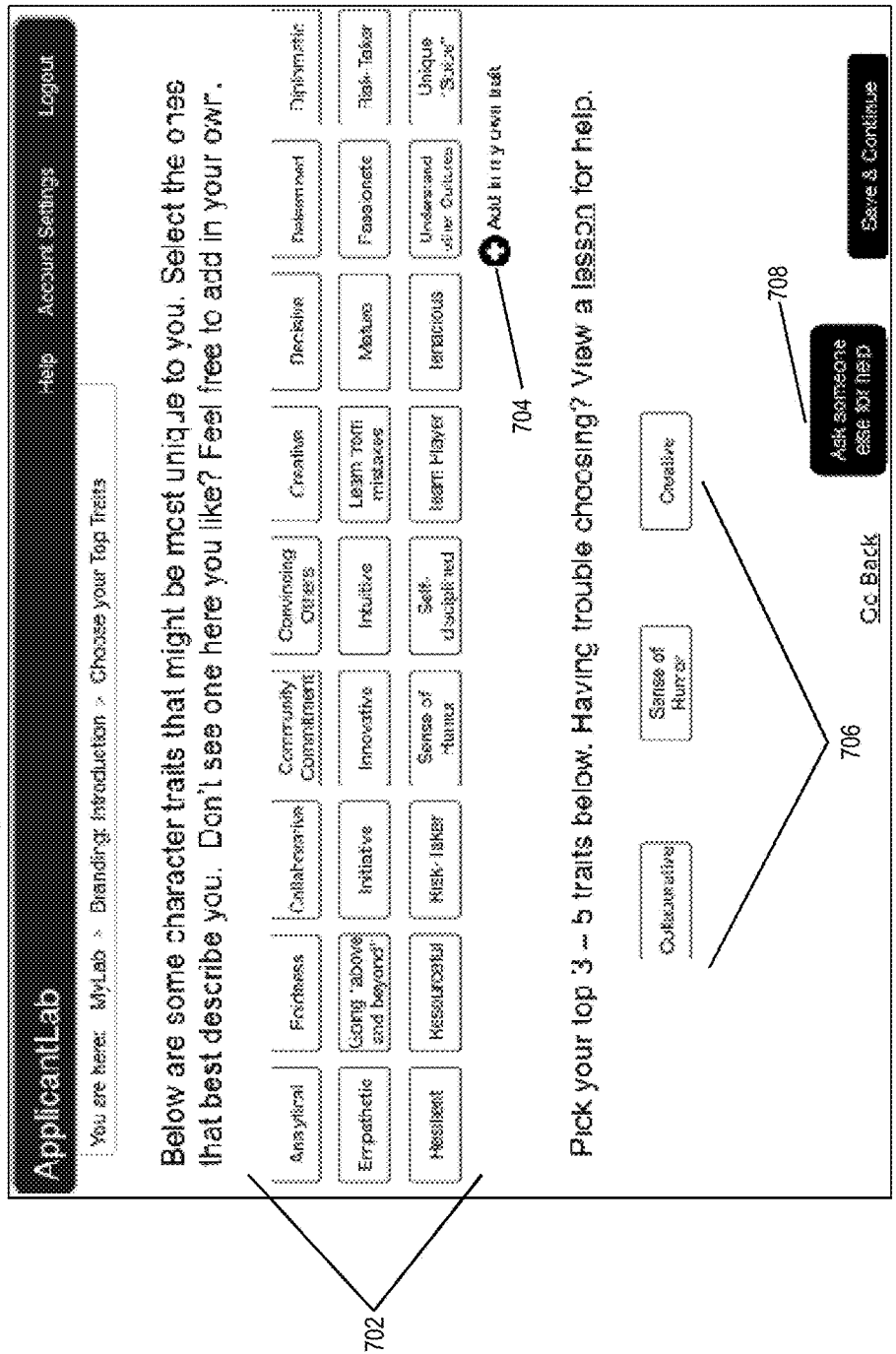
Figure 7: Selecting Brand Traits

Figure 8: Brainstorming Exercise

Figure 9: Assigning Brand Traits as Meta-Data Linked to Stories

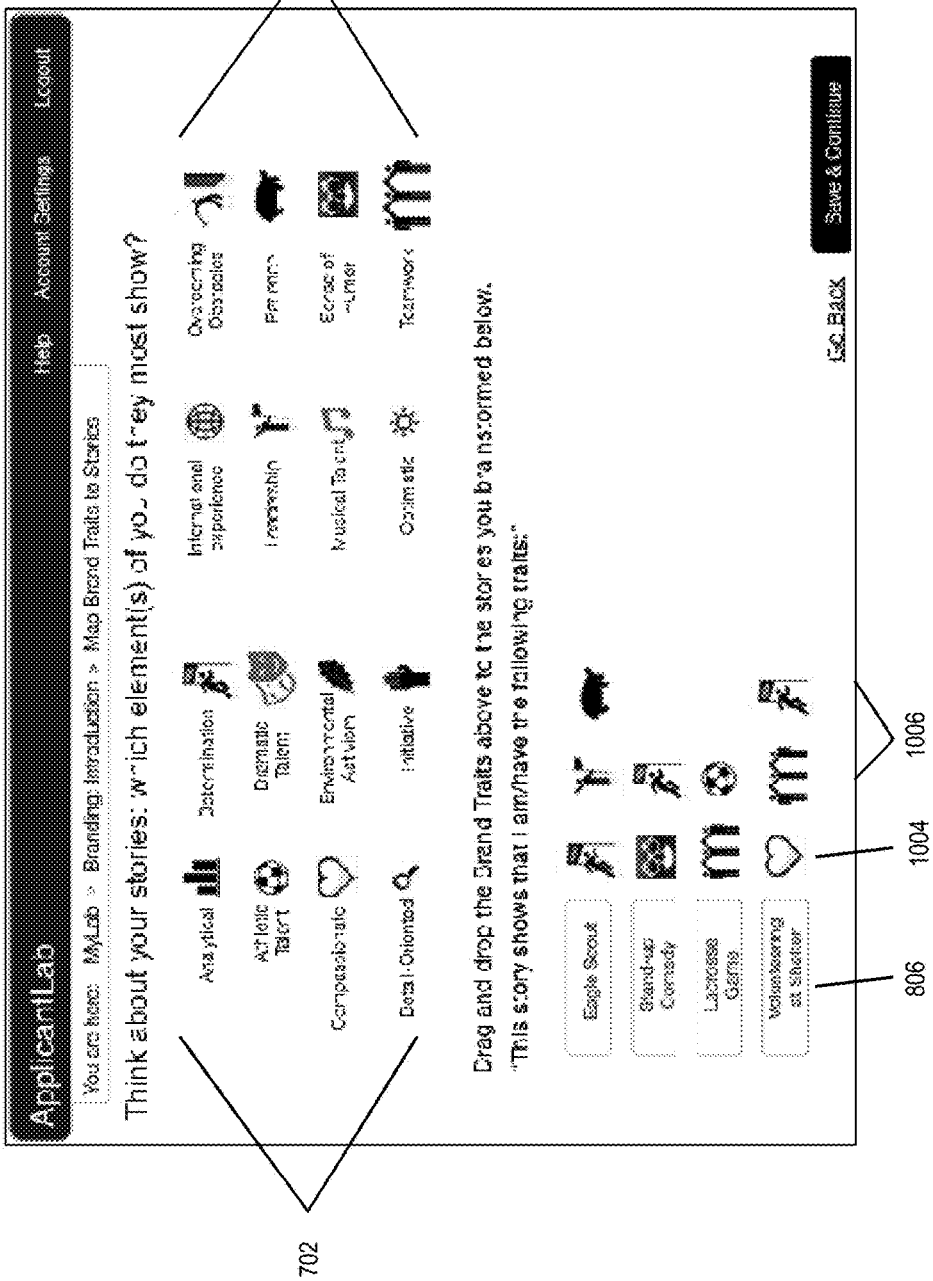
Figure 10: Brand Trait Page, Alternate Version Using Icons

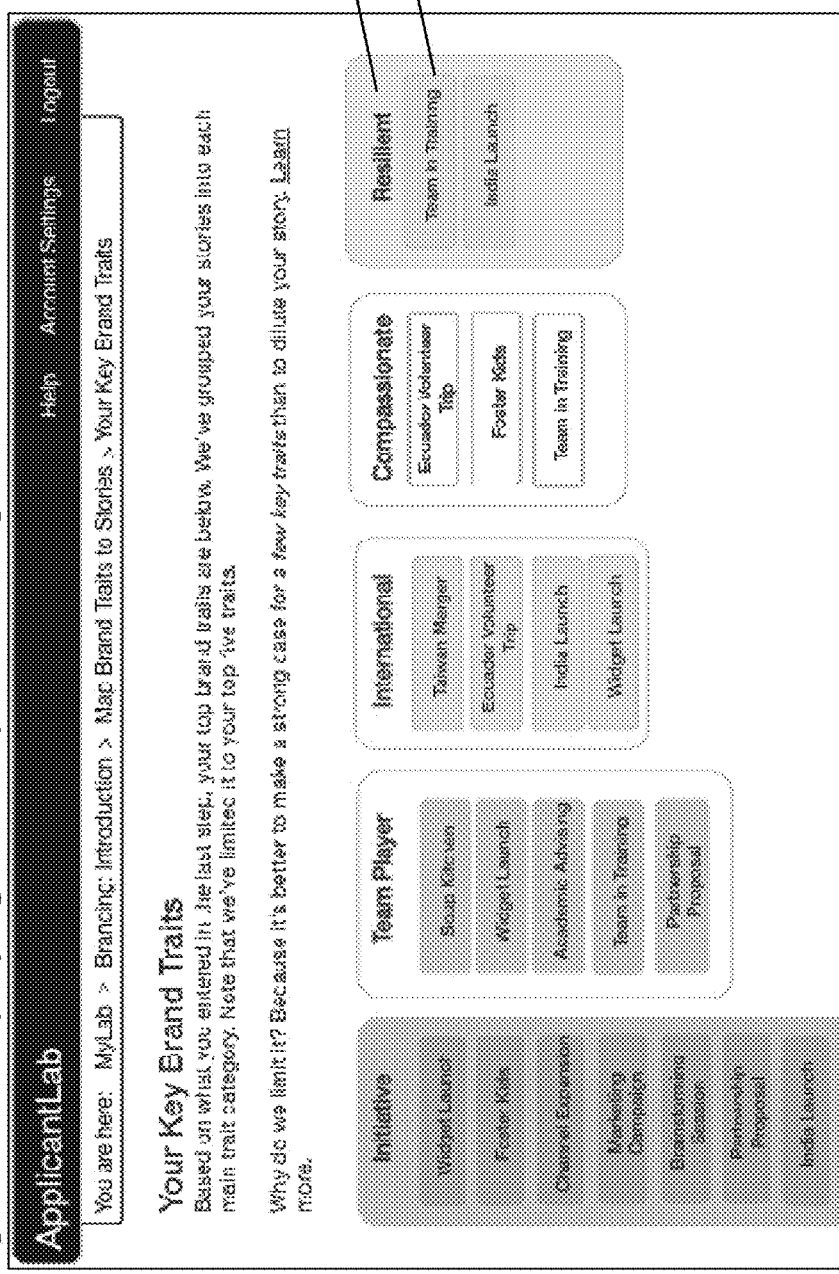
Figure 11: Displaying the "Top" or Strongest Brand Traits Calculated

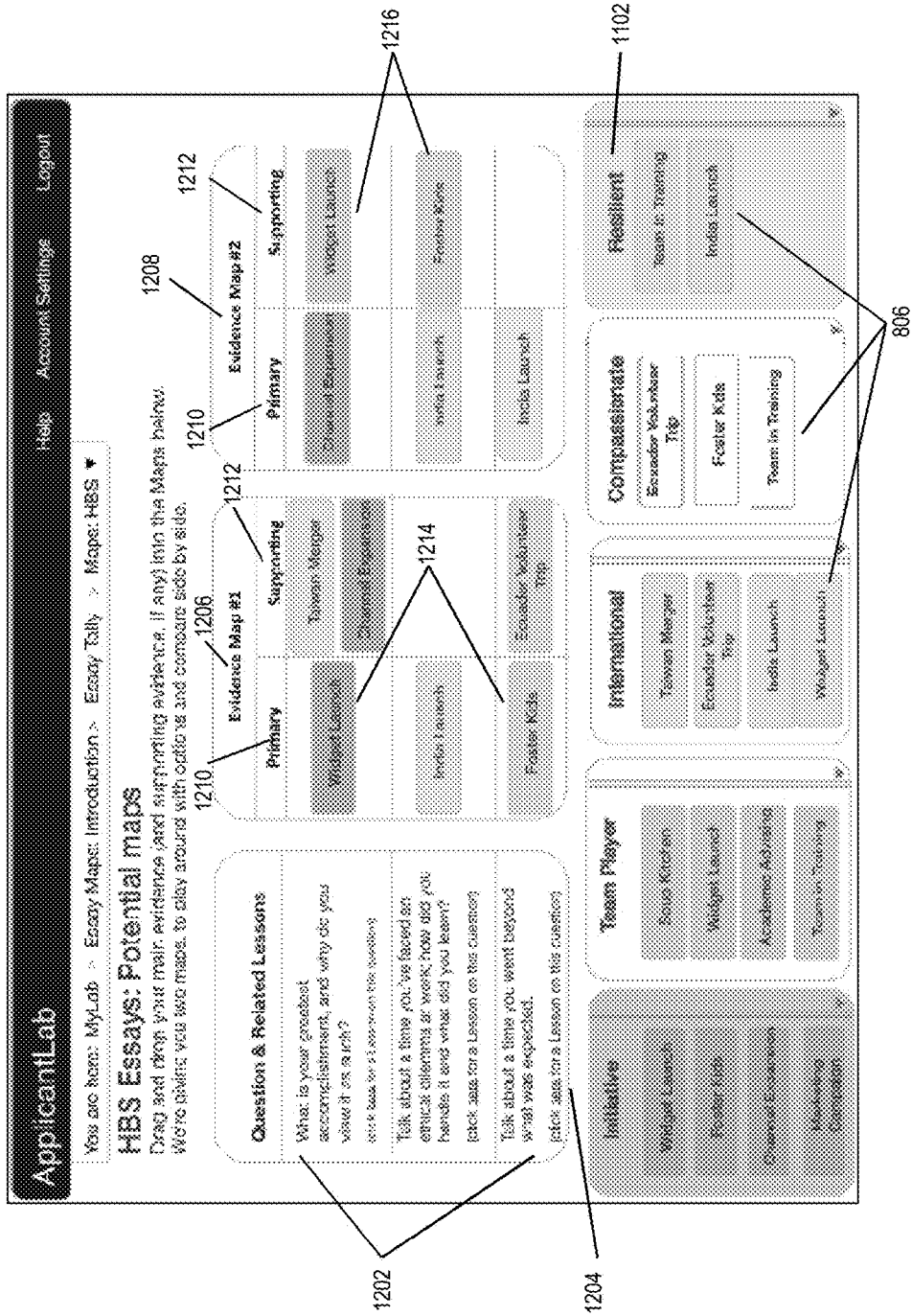
Figure 12: Sample map for one school's essays (completed)

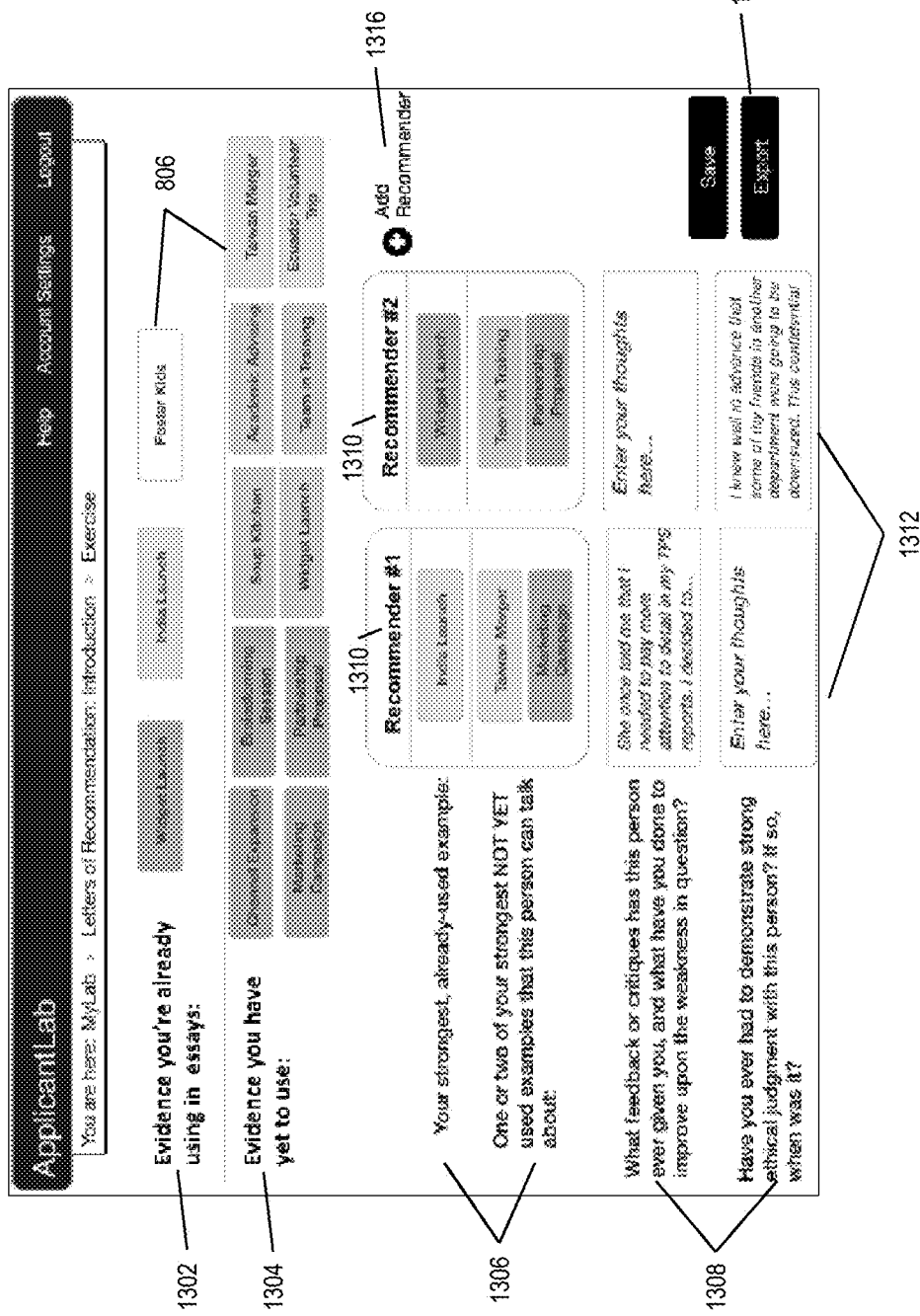
Figure 13: Sample map for letters of recommendation

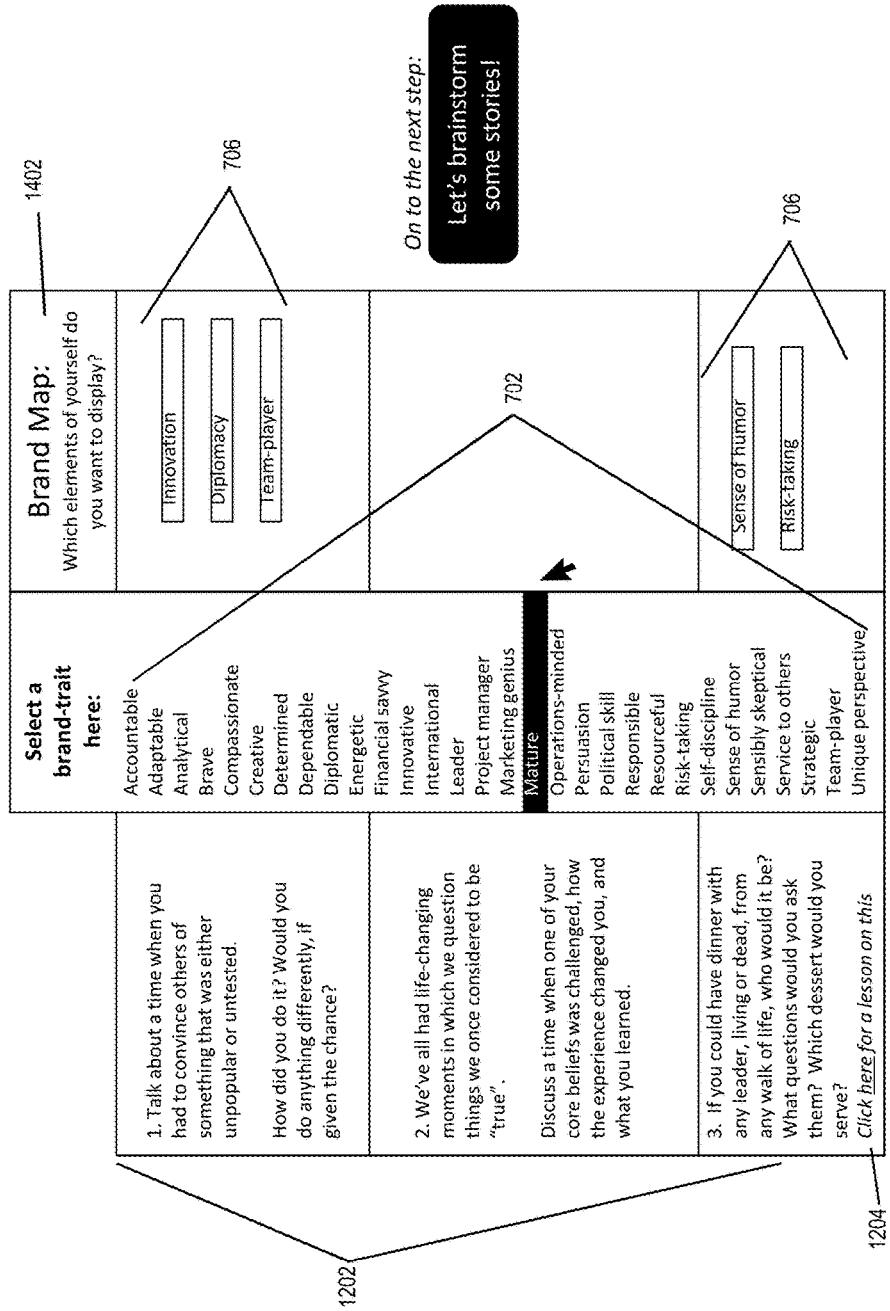
Figure 14: Alternative Process for Completing a Map

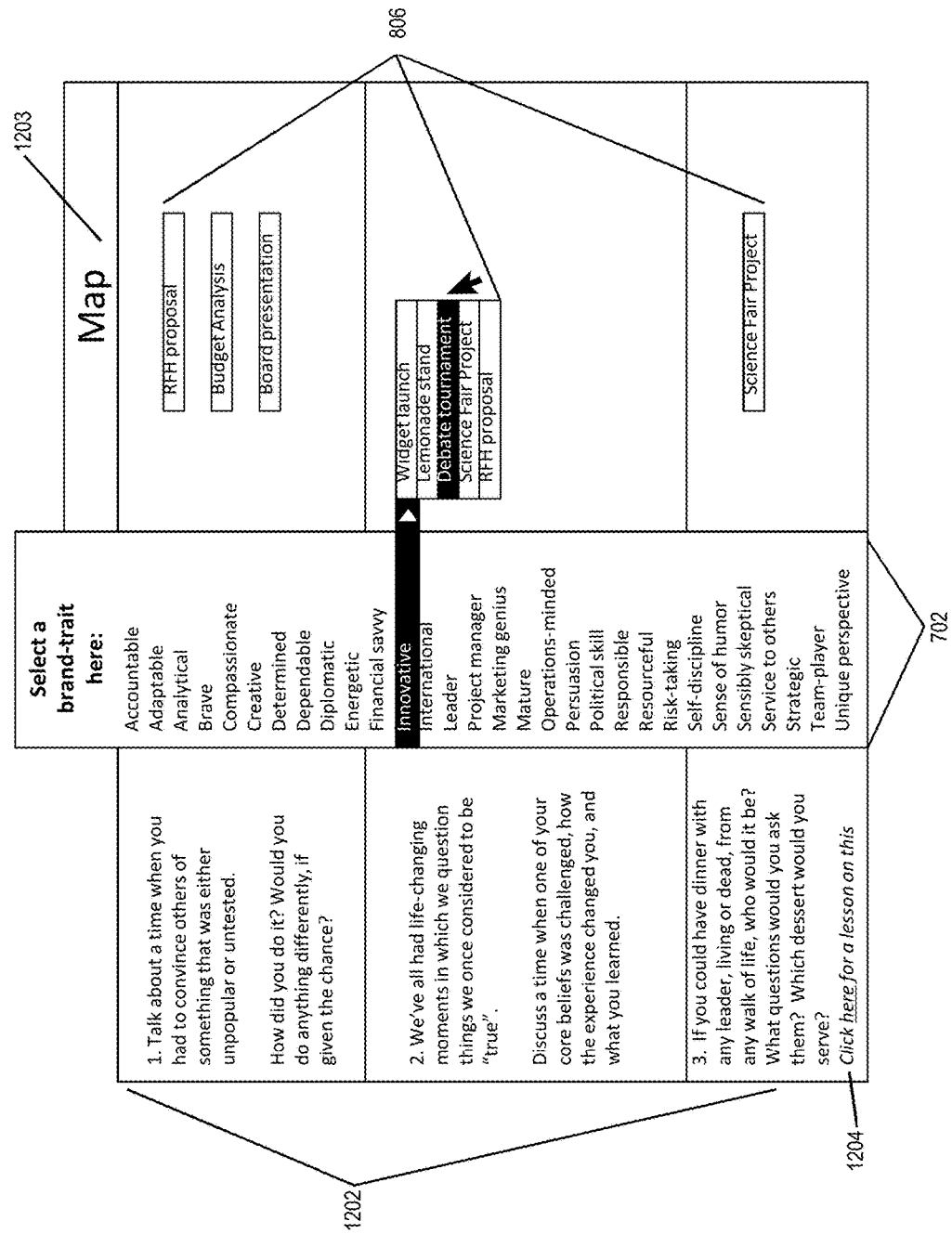

Figure 16: Pre-Writing Exercise -- Essay

ApplicantLab

You are here: MyLab > Pre-Writing Introduction > Schools: UPenn > Question #: 1 > Step #: 2     Help   Account Settings   Logout — 1202

"Tell us about a time when you put knowledge into action."

Save   Export — 1214

Primary Evidence

- Let's distill: What was the KNOWLEDGE / skill in question? (List up to 3)
- Let's distill: Which specific ACTIONS did YOU take? Hint: use first-person verbs
- Did you learn anything from this episode? How do you grow?

— 1604

Widget Launch

- Project Management
- Communication
- Morale-boosting for a consolescent team

- Interviewed lead engineer
- Took GA manager out to lunch
- Called meeting with senior team Enter your thoughts here...

— 1608

Supporting Evidence

What is the primary inner-question in your lesson learned? Between the supporting examples and the primary examples?

— 1606

Academic Advisor

When I was an Academic Advisor in college, I learned the importance of communication

— 1610

Senior Manager

After the Widget Launch, I had demonstrated my abilities to the senior team so I was promoted to...

— 1610

— 1216

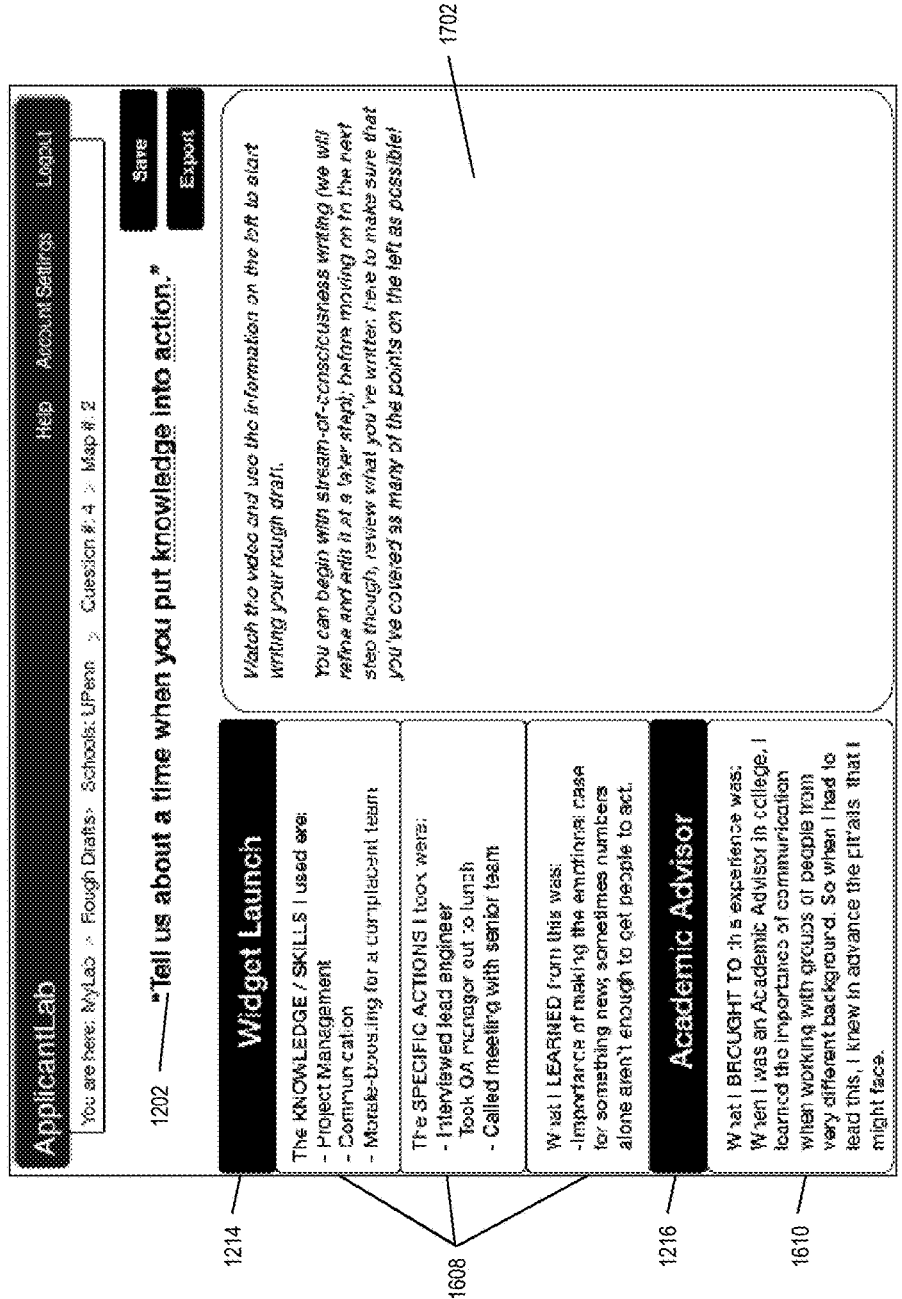
Figure 17: Writing the Rough Draft

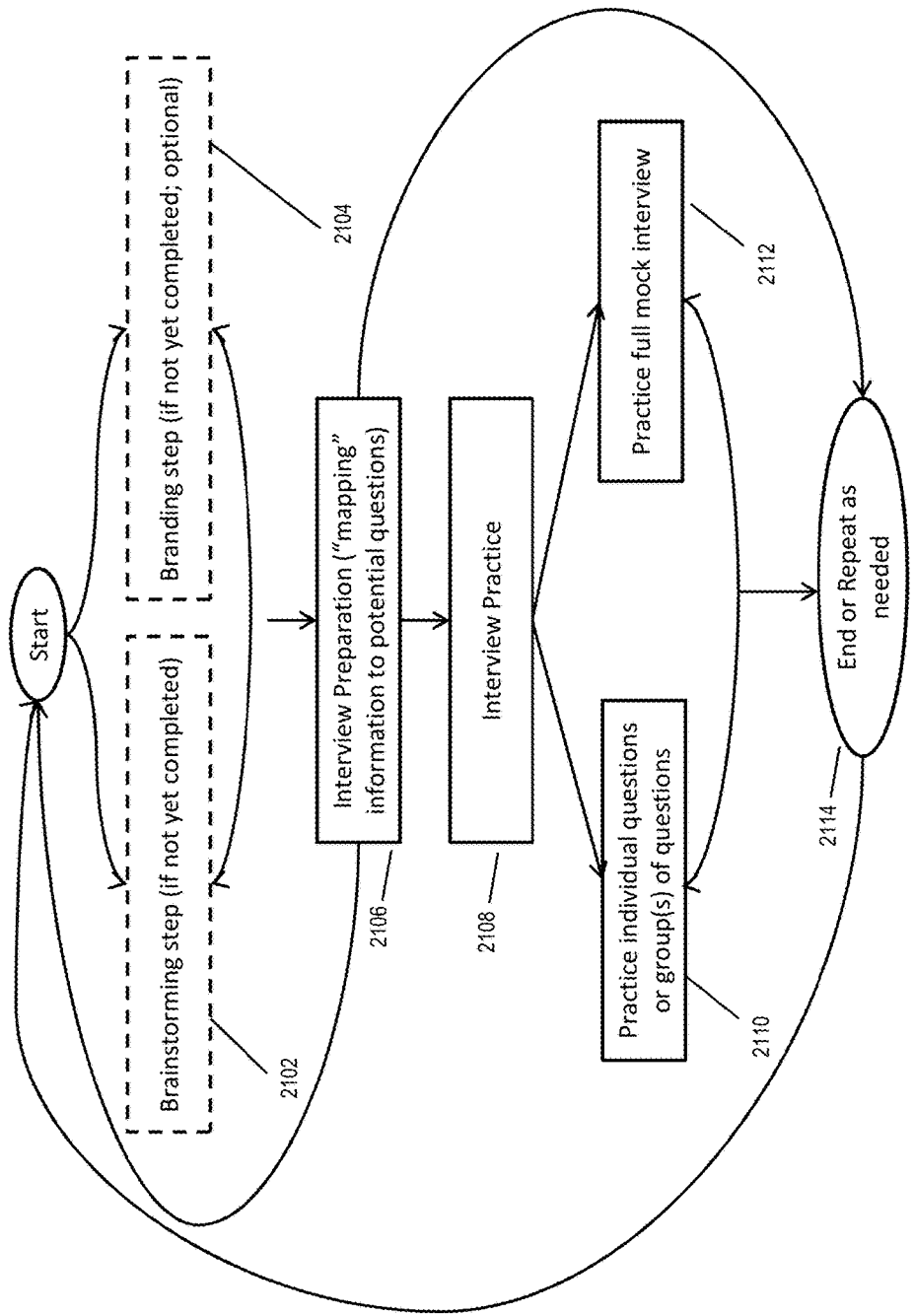
Figure 21: Sample embodiment for interview preparation method

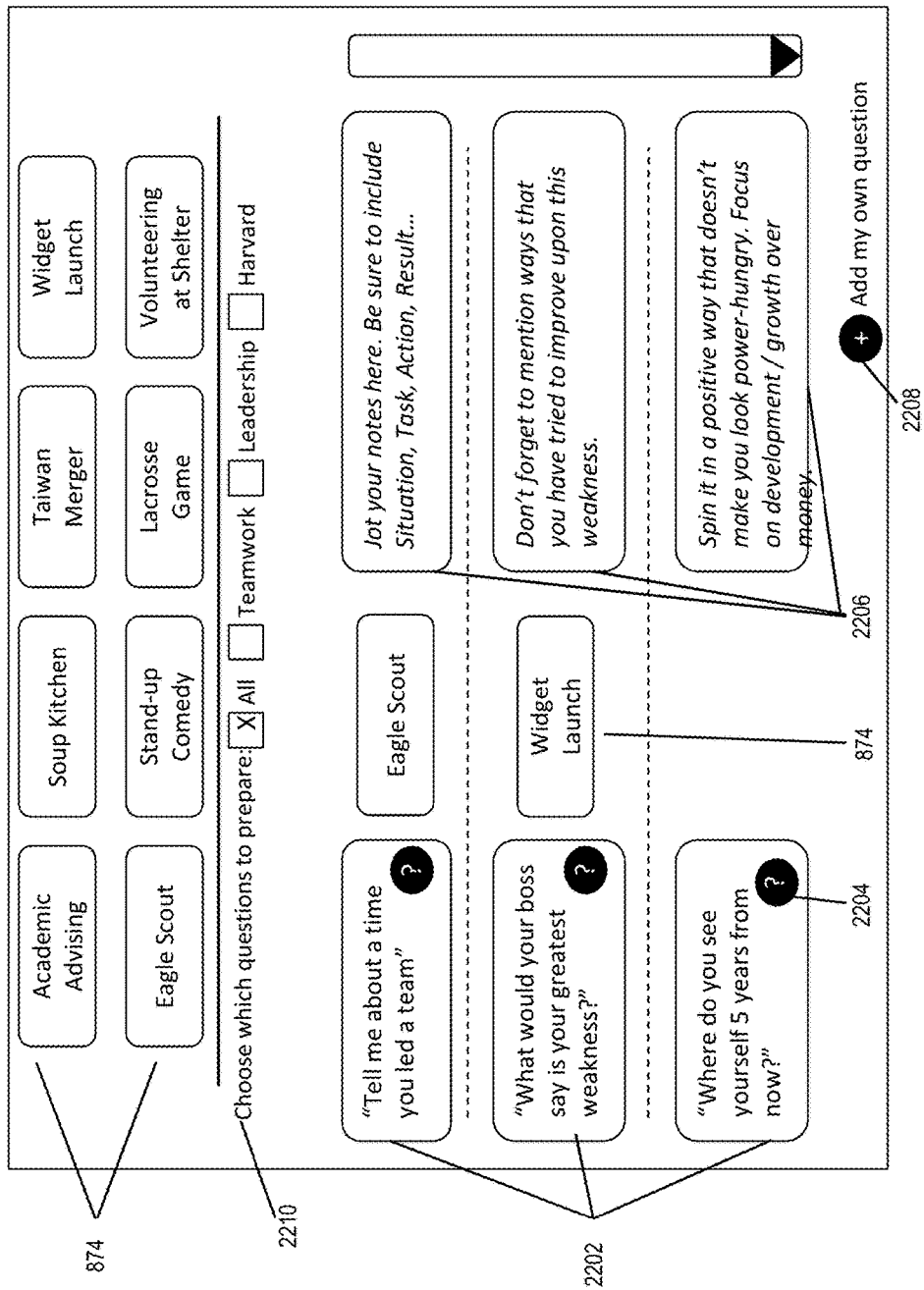
Figure 22: Sample "Map" Interface for Interview Preparation

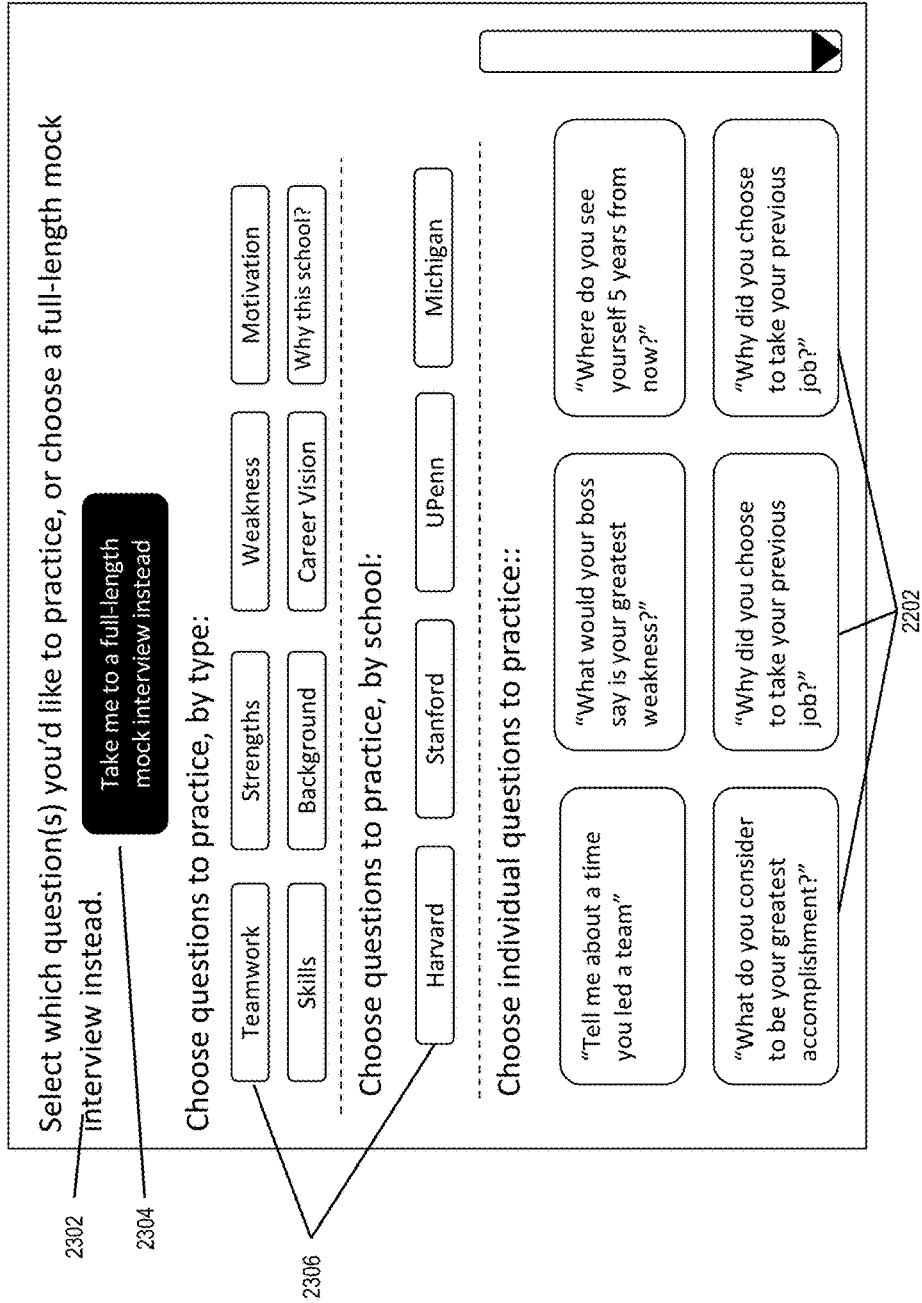
Figure 23: Sample Interface for Interview Practice

US 10,353,720 B1

COMPUTER SYSTEM, METHOD, AND MEDIA FOR PREPARING QUALITATIVE ELEMENTS OF AN ACADEMIC APPLICATION

PRIORITY CLAIM

This application is a non-provisional patent application that claims priority to and the benefit of U.S. Provisional Patent Application Ser. No. 62/016,230 filed on Jun. 24, 2014, and U.S. Provisional Patent Application Ser. No. 61/893,048 filed on Oct. 18, 2013, both incorporated herein by reference.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE DISCLOSURE

The present disclosure generally relates to data processing using digital electronic computers in the field of document preparation. The disclosure relates more specifically to computer-assisted techniques for preparing qualitative aspects of applications, such as applications to educational institutions and for employment, including interview preparation.

BACKGROUND OF THE DISCLOSURE

A successful application to an academic institution, such as college or graduate school, and/or an employment position, usually has both quantitative and qualitative elements. Quantitative elements may include scores from standardized tests, grades received in prior coursework, and number of years of experience. Qualitative elements may include essays, cover letters, interviews, and letters of recommendation.

While many computerized or and online options to prepare for the quantitative elements of an application have emerged, most notably in a number of online test preparation courses, a computer-assisted system that adequately guides a user in how to prepare the qualitative elements of their application is unavailable. Typically, commercial entities that offer online test preparation services deliver admissions consulting only through human assistance.

Some online services currently exist containing either basic instructional videos, or a compilation of essay topics, or some downloadable forms, or a generic series of alerts sent out in static time-intervals (for example "weekly alerts" or a "monthly checklist"). However, these current solutions are inadequate, as they do not adapt to each unique user. They also do not guide the user with enough detail, instead providing only high-level, generic advice.

The generally accepted sentiment in the current industry is that guidance for the qualitative elements requires a high level of creativity and therefore must be done via a person known as an "Admissions Consultant". "Admissions Consultants" may charge fees that are beyond the reach of certain applicants; they also have finite availability and limitations on how rapidly they can perform certain tasks. There is an acute unfulfilled need for a computerized system, perhaps using sophisticated rules engines and a step-by-step method, which could serve applicants with useful, tailored and personalized advice.

Some academic programs, such as medical degrees (M.D.), and most employment opportunities require an interview, either face-to-face, telephonic, or via video chat. The applicant is often asked tough questions that require them to disclose their personal history, professional work experience and skill set, etc. The interview can therefore create a stressful situation for many applicants in which their ability to handle the stress is another factor for which they are judged by the interviewer(s). They may also be judged on a number of other factors: wardrobe, hairstyle, makeup, mannerisms, etc. Therefore, there is a need for an internet based service to assist applicants in creating the optimal answers to potential interview questions based upon their personal and professional history, beliefs, etc., and then to practice their answers via a simulated interview.

There is also a need for a system that provides a significantly more granular, yet more rapid, level of guidance than is possible through currently-available options, perhaps using variables and parameters related to a user to provide tailored, detailed guidance through the steps and sub-steps involved.

SUMMARY OF THE DISCLOSURE

The various embodiments of the present disclosure comprise a computerized system to assist a user in completing an application for a competitive process. Non-limiting examples of a "competitive process" comprise an employment application, an internship application, an application for admission into an academic program, an application for admission into an organization., and preparation for a live interview in a competitive process In the various embodiments disclosed herein, a data processing system implements a computerized method that guides the user through one or more of the following automated steps, in any one of several different orders, wherein the computer processor receives in order to compute: a "position" or "brand" for the user to characterize and differentiate himself from other applicants in a competitive selection process; guide a user through brainstorming their unique stories or anecdotes; guiding a user in allocating, or mapping, their stories or personal traits amongst the discrete pieces of an application; checking to make sure that an optimal mix of stories is being used; guiding a user on a strategy for soliciting strong letters of recommendation; advising on the best type of resume to construct; breaking down a specific set of essay or interview questions into sub-questions; compiling and rearranging the sub-questions into a rough draft; providing guidance on how to create a final draft; automatedly soliciting editing feedback from third parties; and, preparing for an interview, to include recording and critiquing a mock videotaped interview. The computerized system may also comprise a task-management system or calendar that truly adapts to each individual user and their application requirements, as opposed to providing generalized weekly checklists Embodiments may be configured to tailor advice to users based upon variables, data, or meta-data about the user.

The various embodiments of the present disclosure comprise computer modules and/or units that may function alone or in any combination with the other modules and/or units disclosed herein, wherein the modules and/or units comprise: User Data Collection; Branding, Brainstorming; Mapping; Interview Preparation; and, Dynamic Calendar.

User Data Collection Module and/or Unit

The User Data Collection module is used to receive biographical user information from which to primarily compute the user's strength and weaknesses, and to display advice on how to deal with their strengths and weaknesses when completing the application and preparing for the interview. The module may also generate and display additional questions for the user to clarify their information in order for the computer to properly complete the analysis.

Any data collected about the user or the program being applied to can be analyzed via a rules engine. The logic for determining problems and related advice may be comprised of a nesting logic, or Boolean logic, or other types of algorithms. Based upon the values of this data, the computer system may display varying advice on which strategy to pursue in the application, which brand positioning statement to generate, which weaknesses need to be addressed, how to address those weaknesses, which strengths may be highlighted, how to emphasize those strengths, etc. When combined with data about the program being applied to, it could add yet another level of granularity to the advice given. For example, if a user has a GMAT score below 700, at certain elite schools this may be seen as a "problem", since their average score is 730, but at other schools with lower average scores, this would not trigger a "red flag" message/advice. This module may be a discrete stand-alone section of the system, or the advice provided may be interspersed throughout. It transforms data about the user and/or the program being applied to display different guidance or advice. Any guidance or analysis provided by a rules engine can also be displayed and accessed manually by users, in less-advanced embodiments.

Branding Module and/or Unit

The Branding module is executed alone or following the user data collection module utilizing its analysis results. It may further be executed in conjunction with one of more of the modules of the present disclosure comprising Brainstorming, Mapping, and/or Interview Preparation.

The Branding module can perform different tasks, depending upon when it occurs in the overall application process. In one version, it provides one or several ways for a user to create a distilled "brand message", or a summary of key things about themselves they would like to convey to the decision-makers. On a simple level, the method could provide a place for a user to view, select, and save what their key brand-takeaways would be. A more complex version would utilize data about the user (either collected from the user him/herself, collected from another person perhaps via a survey of the applicant's strengths and weaknesses, or imported from a third-party data source or any variation therein) to pro-actively suggest a brand positioning statement to the user. Depending upon meta-data associated with the user, for example, test scores, grades in certain classes, number of hours devoted to a specific extra-curricular activity, jobs held, survey results from teachers, etc., the system could analyze the data and convert it into a potential brand for the user. That is, it could transform data about the user into a useful branding statement or brand summary. For example, an applicant who has received top score of "5" in AP tests related to history and government, who has spent 10 hours per week as president of their school's mock trial team, and who was described by teachers in a survey as being "outgoing" and "charming", could be prompted by the system to position themselves as a "dynamic pre-law major." If a user is on the cross country team, the system may suggest the brand trait of "disciplined". Similar rules/logic could act as a warning mechanism to the user; that is, if a user enters "Analytical" as one of their key potential "brand traits", but that user scored poorly on the Math section of the SAT test, or has demonstrated weakness in analysis in other ways, the system could advise the user to focus on a brand that is easier to substantiate, based upon data about the user. The computer system could even prevent the user from selecting certain brand-traits to describe themselves, if the user's data does not meet certain requirements/rules. The computer system could alert a user to potentially-conflicting brand traits; for example, if a user selects seemingly-opposing traits to define themselves, such as "boisterous" and "shy", the system will alert the user that there may be a conflict. The creation of a brand positioning statement could be useful even as a stand-alone module, to help an applicant be cognizant of how to focus their message in the application.

The concept of brand also applies to individual evidence or "stories" or other pieces of data available about the user. The user (or another person, such as a teacher, parent, etc.) could look at a story about the applicant which may potentially be used in the application, and may assign one or more "brand traits" to the story. The "brand trait" is a form of meta-data associated with the story. As an example, the story "Led science fair team" may have the "brand traits" of "leadership", "team-work", and "science buff" associated with it. As above, the system may recommend a given brand trait to be matched to a story, based upon other data associated with the user, keywords used within the story description, the specific program being applied to, etc. For example, if the user is applying to an engineering program, the system may only display brand traits that are historically useful to display for acceptance to those sorts of programs, such as "mathematical skill", "critical thinking" (which would, e.g. differ from the traits that are sought after by performing-arts schools), or may tell the user to focus on brainstorming evidence that demonstrates those traits. The determination of which traits are "important" to a given program may be entered manually, maybe automatically generated by type of program being applied to, or may be determined by mining text about the school or job. For example, the system could analyze the text in a job description, see that the word "detail" appears several times e.g. "detail-oriented", "attention to detail", "perform detailed tasks") and will transform that into guidance for the user to utilize evidence in their application that shows them being detailed oriented, or that their brand positioning statement for the job should include the term "detail-oriented". The program may analyze meta-data associated with a story, and match it to meta-data associated with an essay question, to recommend to the user which specific stories may be the best ones to use to answer a question. Again, the system can take information about the user, their evidence, the program being applied to, etc. and transform it into a recommended action-plan, primarily via rules or matching the brand traits associated with evidence to brand traits associated with an element of the application. In any variation of the brand exercises, the user can solicit third-party feedback as to whether or not the brand statement, brand trait meta-data, etc. "ring true".

Brainstorming Module and/or Unit

The Brainstorming module is executed alone or following the user data collection module utilizing its analysis results. It may further be executed in conjunction with one of more of the modules of the present disclosure comprising Branding, Mapping, and/or Interview Preparation.

The Brainstorming module provides a place for a user to consider and record potential evidence or stories they may use in their application. It provides thought-provoking prompts to get the user thinking of as many examples as possible, a place to record responses, possibly a place to jot notes, and possibly the ability to associate meta-data with a piece of evidence. The system may transform data about the user or the program being applied to into specific guidance provided. For example, if the user has entered information pertaining to a certain extra-curricular activity, brainstorming prompts may be displayed that relate specifically to that activity. Or if the data about the user implies a certain potential weakness in the application, the system may prompt the user to generate evidence that may counter that weakness. For example, a user with the industry variable with a value of "investment_banker" and "hrs per week of community service"=zero, may be viewed by decision makers at an MBA program as being self-centered, and as such the system may prompt the user to brainstorm examples of times that they have demonstrated empathy for others. The user may also solicit examples, stories, and data from third parties. For example, a teacher may remember a brilliant project the user worked on several years ago, that the user has since forgotten about. To try to make the brainstorming module as useful as possible, the brainstorming prompts displayed may vary based upon the program being applied to. That is, an applicant who has indicated that they are applying to an engineering program may be prompted to "Think about a time you built or improved something", since evidence demonstrating that particular action would be more useful for the decision makers at an engineering program to know about than, say, "Have you ever written a powerful poem?". As elsewhere, the system analyzes data associated with the user, the program, etc. and then may vary its guidance accordingly, based upon a rules engine or matching certain data to other data.

Mapping Module and/or Unit

The Mapping module is executed following the user data collection module utilizing its analysis results. It may further be executed in conjunction with the Branding and/or Brainstorming module. Results from executing the Mapping module may then be used by the computer in assisting the user in drafting responses to program questions, and in the Interview Preparation module.

"Mapping" is the module where information about the applicant is allocated or matched to some or all of the application, transforming individual data/stories/evidence about the user into an outline to use to proceed with the application. The user can determine which evidence/data/stories to allocate, or can solicit suggestions from third-parties. Depending upon the meta-data associated with the user, or the user's stories and section of the application being worked on, the system may make recommendations. For example, if the user has already allocated the story "science fair" as primary evidence in two separate essays for the same school, the system may warn the user to choose another story, in order to convey more variety in the application. Similarly, if a certain number or a certain percentage of stories allocated to a school's essays contain a certain brand trait, or if too many of the stories allocated are from a "professional" context, the system may warn the user that they should provide a more well-rounded view of who they are. If a user's brand positioning statement is "Analytical, detail-oriented future scientist", but none of the evidence used in the map contains the brand traits of "analytical" or "detail oriented", then the map may alert the user that they are not currently conveying evidence that supports the overall brand they are hoping to portray. Similarly, if the user has a potential weakness identified—e.g., an investment banker with no community service leadership appearing to be callous—the system at the map module will alert the user if none of the evidence used in a map contains the brand trait of "compassion" or "empathy". The system can also suggest which evidence the user may consider using to answer a specific essay question, based upon data/meta-data associated with the user or with the particular piece of evidence. For example, if the essay question, "Talk about a time you convinced a team to do something" has the trait of "persuasion" associated with it, then the system could determine which evidence might be most suited for that question, e.g. perhaps evidence that has the brand traits of "persuasion" and "team work" associated with it. The system could even automatically allocate specific stories to certain interview questions, based upon this data, The automated allocation may also be adapted and possibly also on where else specific evidence has been used.

Various embodiments of the present invention comprise: A data processing method to assist an applicant to prepare answers for an application for admission into a program, comprising: a. receiving data by the computer identifying one or more user selected program applications from a list of a plurality of applications; b. collecting by the computer biographical data about the user; c. receiving and storing by the computer user input comprising brainstorming stories disclosing interesting and relevant information about the user appropriate for a program; d. displaying by the computer on the graphical user interface questions general to the type of program or to a specific program the user in applying to; and, e. receiving and storing by the computer user input for mapping and assigning one or more brainstorming stories to the questions. And, if the user lacks stories for a question, then repeating steps (c)-(e). The method may further comprise: receiving and storing by the computer user input comprising one or more brand traits and/or brand positioning statements, and user's assignment of brands traits and statements to stories. And/or the method may further comprise: mapping user stories to interview questions, comprising, a. assigning by the computer meta-data to interview questions related to the type or topic of question or program; b. correlating by the computer the meta-data with brand traits and/or brand statements; and, c. displaying by the computer recommendations for stories to utilize in answering a question based upon the correlation of a question's meta-data to a brand trait/statement. And/or the method may further comprise interview practice by the user comprising, a. displaying by the computer the option to practice interview questions categorized by type of question, program, specific questions, or full mock interview; b. receiving by the computer user input of selection of category; and, c. displaying by the computer one or more questions associated with the category, wherein the association is based on a meta-data or meta-tag assigned to the question.

Interview Preparation Module and/or Unit

The Interview Preparation module may be executed with or without the User Data Collection, Branding and Brainstorming, and/or Mapping modules because it provides full functionality for mapping a user's data to questions that are generic to a type of program, or that are tailored to a specific program.

The Interview Preparation module can contain two sub-routines: preparation and practice. The preparation sub-routine, is analogous to the Mapping module, by allowing the user to allocate evidence/data/stories about themselves to common interview questions. The interview questions may have meta-tags associated with them, such as tags related to a trait like "team-player", or may be specific to a certain program, such as "University X", or any other data. The system can suggest which evidence the user may consider using to answer a specific essay question, based upon this data. That is, the system may suggest that evidence with the brand traits of "team-player" be used to answer an interview question tagged with a similar trait. Alternatively, the system could recommend that the user focus on an example that counters a "weakness", or emphasizes a "strength", identified elsewhere, such as by the User Data Collection module. The system could even automatically allocate specific stories to certain interview questions, based upon this data, and possibly also on where else specific evidence has been used. For example, if one piece of evidence has already been used in a job applicant's cover letter, and also cited by a reference, then perhaps it should be discussed in the interview, since it is clearly a key experience the applicant has had. In that scenario, the system could highlight or even automatically allocate that story to a potential interview question. Conversely, depending upon the program and what its interview style has historically been, the system may suggest that the applicant use the interview to bring up new information not yet covered elsewhere, and may therefore suggest that the evidence used for the interview be evidence that was not mapped to an essay or letter of recommendation. In addition to the evidence being allocated to an individual interview question, there may also be room provided for the user to jot some notes to themselves, e.g. perhaps about key points they would like to make.

The module may also include the ability for the user to practice responses to interview questions, perhaps by recording responses via a microphone or webcam, and watch their responses or send them to others for feedback. The user could choose to practice an individual question, or could choose to practice a full mock interview, consisting of a series of multiple questions, in order to replicate a true interview experience as much as possible. The questions presented in the practice section may be displayed based upon rules or criteria. For example, the system may randomly select interview questions to present to the user, or may randomly choose from a pool of questions with the meta-data "team-work" associated with it, but will choose no more than two team-work questions per mock interview, since most interviews ask questions across multiple dimensions. Or meta-data may be associated with the specific program, school, or job being applied to, such that a candidate applying to several jobs may have different questions displayed, based upon whether or not they wish to practice questions tagged with the meta-data "product manager" or questions tagged with "graphic designer". Similarly, certain schools are "famous" for asking certain interview questions, or for following a certain format in its interview. The system would then display different interview questions to prepare for or practice, based upon which program the user would like to focus on. For example, a mock interview for school=Wharton may have different questions, or presented in a different order, than a mock interview for school=Yale.

Various embodiments herein may comprise a data processing method to assist an applicant to prepare answers for and practice a program interview, comprising: a. receiving data by the computer identifying one or more user selected program applications from a list of a plurality of applications; b. collecting by the computer biographical data about the user; c. receiving and storing by the computer user input comprising brainstorming stories disclosing interesting and relevant information about the user appropriate for a program interview; d. displaying by the computer interview questions general to the type of program or to a specific program the user in interviewing for; and, e. receiving and storing by the computer user input for mapping and assigning one or more brainstorming stories to interview questions. And if the user lacks stories for an interview question, then repeating steps (c)-(e). And/or the method may further comprise: receiving and storing by the computer, user input comprising one or more brand traits and/or brand positioning statements, and user's assignment of brands traits and statements to stories. And/or the method may further comprise: mapping user stories to interview questions, comprising, a. assigning by the computer meta-data to interview questions related to the type or topic of question or program; b. correlating by the computer the meta-data with brand traits and/or brand statements; and, c. displaying by the computer recommendations for stories to utilize in answering a question based upon the correlation of a question's meta-data to a brand trait/statement. And/or the method may further comprise: interview practice by the user comprising, a. displaying by the computer the option to practice interview questions categorized by type of question, program, specific questions, or full mock interview; b. receiving by the computer user input of selection of category; and, c. displaying by the computer one or more questions associated with the category, wherein the association is based on a meta-data or meta-tag assigned to the question. And/or the method may further comprise: video and/or audio recording by the computer, wherein the recording may be conducted by a microphone or webcam of the computer or other recording device, and may further comprise displaying live feed of the interview. And/or the method may further comprise: receiving feedback from third parties on the video and/or audio taped interview, wherein the third party receives a copy of the interview via an electronic message, or directly via accessing the computer. And/or the method may further comprise: a. analyzing the data by the computer to determine potential user weaknesses and/or strengths, wherein if the computer determines additional user data is required to complete the analysis, then displaying questions by the computer and receiving user input to the questions and/or soliciting data about the user from others; and, b. displaying the computed user's strengths and weaknesses, and correlated advice for the user to overcome the weaknesses, and emphasize the strengths.

Dynamic Calendar Module and/or Unit

The dynamic calendar, described in more detail below, transforms information about the amount of time the user has available, and the application deadline(s) faced, into a step-by-step to-do list that is tailored to the applicant. It calculates the amount of time a user has left, and can then allocate that time accordingly, perhaps by assigning weights or percentages to key tasks and returning to the user a list of not only which tasks need to be completed, but also how much time should be allocated to each task.

Various embodiments herein comprise a data processing method to assist an applicant to meet all application deadlines for a program, comprising: a. receiving data by the computer identifying one or more user selected applications from a list of a plurality of applications, and the deadline dates for each application; b. calculating by the computer how much time a task should take, the sum of all the tasks times, and/or assigning a weight to the task based upon the relative importance or complexity of the task; c. calculating by the computer the remaining time available between the user's start date to the earliest date of a program deadline; d. determining how much time should be allocated to each task, and auto-populating by the computer a digital calendar displaying the start and stop date of each task and optionally communicating relevant dates to the user via various media.

System of Various Embodiments

Various embodiments herein comprise a network-based computing system for computing a user's optimally effective data input for an application for a program, comprising: a. a system computer comprising a processor and a memory device operably connected to one another, and a plurality of computer-executable instructions stored on said memory device and executed by said processor, comprising: i. a user data collection computer-executable instructions to receive user data input comprising programs applying to, and biographical data comprising one or more of work history, academic history, extra-curricular history, community service history, personal history, performance on exams, perceived strengths/weaknesses of the user, future desired goals or outcomes, prior employment positions, salary history, job performance reports, or other objective and subjective information about the user; ii. a database storing one or more user's records comprising user data input, data input from third parties and/or external data sources, partial and completed applications, and stories, brand traits, brand statements, maps, and videos; b. one or more user's computing systems in communication with the system computer over a network; and, c. a wired or wireless network connection between the system computer and the one or more user's computing systems.

The system may further comprise, iii. a branding module and/or unit of computer-executable instructions to: display by the computer lists of character or brand traits determined by the computer to be suitable for the selected application; receive and store one or more user selected or third-party inputted character traits; and, wherein if the computer determines that the user selected character trait(s) conflicts with the biographic data, then displaying a message indicating the conflict and repeating the preceding step, or wherein the computer determines that the user biographic data correlates to certain character trait(s), displaying a message recommending the usage of those traits.

The system may further comprise, iii. a brainstorming module and/or unit of computer executable instructions to: analyze and display by the computer one or more brainstorming categories, and one or more brainstorming prompts for each brainstorming category, wherein a category may comprise a desirable character trait and a prompt comprises a question in text, audio, and/or video format for evidence of the user possessing the trait; and, receive and store input comprising evidence data, wherein the data is input by the user, and/or a third party at the request of the user, and/or imported from a third-party database, and the data comprises a brief description of a story from a user's personal and professional life demonstrating the desired character trait.

The system may further comprise, iii. a mapping module and/or unit of executable instruction to: display by the computer application elements in an application, wherein the application can be generic to a type of program or to a specific program; receive and display user input to assign one or more user information data to at least one application element comprising questions, essays, letters of recommendation, resumes, curriculum vitaes, cover letters, interview questions or any other element of the application; and, wherein user information comprises: factual or subjective information pertaining to user's personal and professional history, brand traits, stories, antidotes, evidence, and the data and meta-data associated with each.

The system may further comprise, iii. an answer drafting module and/or unit to assist the user in preparing a response to an application element, comprising of executable instruction to: display by the computer one or more application elements, such as questions; determine and display by the computer sub-questions associated with the questions and/or brand traits to assist the user in responding to the application question(s); display by the computer primary evidence and supporting evidence that may have been mapped to the questions, wherein the sub-questions may be customized to the user; receive and store by the computer user response to the sub-questions, wherein the responses may further comprise brief notes; wherein the questions, sub-questions, and responses may be presented as text, video, audio, images, or messages; display the responses and receive user input for a rough draft of the question, wherein the rough draft may be imported into a third party word processing platform; and, receive by the computer feedback from a third party of the rough draft, wherein the third party logs into the computer, and/or receives and transmits via an electronic message, the video and feedback.

The system may further comprise, iii. an interview preparation module and/or unit with computer executable instructions to: receive data by the computer identifying one or more user selected program applications from a list of a plurality of applications; collect by the computer biographical data about the user; receive and store by the computer user input comprising brainstorming stories disclosing interesting and relevant information about the user appropriate for a program interview; display by the computer interview questions general to the type of program or to a specific program the user is interviewing for; and, receive and store by the computer user input for mapping and assigning one or more brainstorming stories to interview questions. The system may further comprise computer executable instructions to receive and store by the computer user input comprising one or more brand traits and/or brand positioning statements, and user's assignment of brands traits and statements to stories. And/or the system may further comprise: computer executable instructions to map user stories to interview questions, comprising, a. assign by the computer meta-data to interview questions related to the type or topic of question or program; b. correlate by the computer the meta-data with brand traits and/or brand statements; and, c. display by the computer recommendations for stories to utilize in answering a question based upon the correlation of a question's meta-data to a brand trait/statement. And/or the system may further comprise: computer executable instructions to practice an interview comprising, a. display by the computer the option to practice interview questions categorized by type of question, program, specific questions, or full mock interview; and, b. receive by the computer user input of selection of category; c. display by the computer one or more questions associated with the category, wherein the association is based on a meta-data or meta-tag assigned to the question. And/or the system may further comprise: computer executable instructions to video and/or audio record the interview by a webcam of the computer, wherein the recording is conducted by a webcam of the computer, and may further comprise displaying live feed of the interview. And/or the system may further comprise: computer executable instructions to receive feedback from third parties on the video and/or audio taped interview, wherein the third party receives a copy of the interview via an electronic message, or directly via accessing the computer.

BRIEF DESCRIPTION OF THE DRAWINGS

The above and other features, aspects, and advantages of the present disclosure will become better understood with regard to the following description, appended claims, and accompanying drawings where:

FIG. 1 illustrates an example embodiment of a data processing method;

FIG. 2 illustrates another example embodiment of a data processing method;

FIG. 3 illustrates an example dynamic calendar component;

FIG. 4 illustrates an example user-added task, which may be used in an embodiment of the dynamic calendar component;

FIG. 5 illustrates an example user interface for the advice which may be displayed, based upon a user's data or meta-data;

FIG. 6 illustrates an example user interface for assisting a user in developing positioning or a brand statement;

FIG. 7 illustrates an example user interface for assisting a user in selecting their brand traits;

FIG. 8 illustrates an example user interface for assisting a user in brainstorming anecdotes, stories and examples to be used in preparing their application;

FIG. 9 illustrates an example user interface for assisting a user in assigning meta-data to their anecdotes, stories and examples;

FIG. 10 illustrates an alternative example user interface for assisting a user in assigning meta-data to their anecdotes, stories and examples via an alternative graphical component, such as an icon;

FIG. 11 illustrates an example user interface for displaying a user's top brand traits in which the user's stories are grouped according to which top brand trait(s) a particular story conveys;

FIG. 12 illustrates an example user interface for a map outline, where a user has allocated some of their application elements to answer a school's essay questions;

FIG. 13 illustrates an example user interface for a map, as well as associated writing exercises, to strategize a user's letters of recommendation;

FIG. 14 illustrates an example user interface for an alternative process for developing a map, in which brand traits are mapped to essay questions;

FIG. 15 illustrates an example user interface for an alternative process for developing a map, in which brand traits are first mapped to an essay question, and then only stories that demonstrate that trait are displayed for the user to select;

FIG. 16 illustrates an example user interface for a pre-writing exercise in which an application element such as an essay question is divided into related sub-questions, and showing primary and supporting stories that were mapped to the essay;

FIG. 17 illustrates an example user interface for a rough draft exercise, which builds upon the work done by the user in the pre-writing exercise;

FIG. 21 illustrates an embodiment for an interview preparation module;

FIG. 22 illustrates an embodiment of a map interface for an interview preparation module; and, FIG. 23 illustrates an embodiment for a user interface for interview practice.

Figure 18:
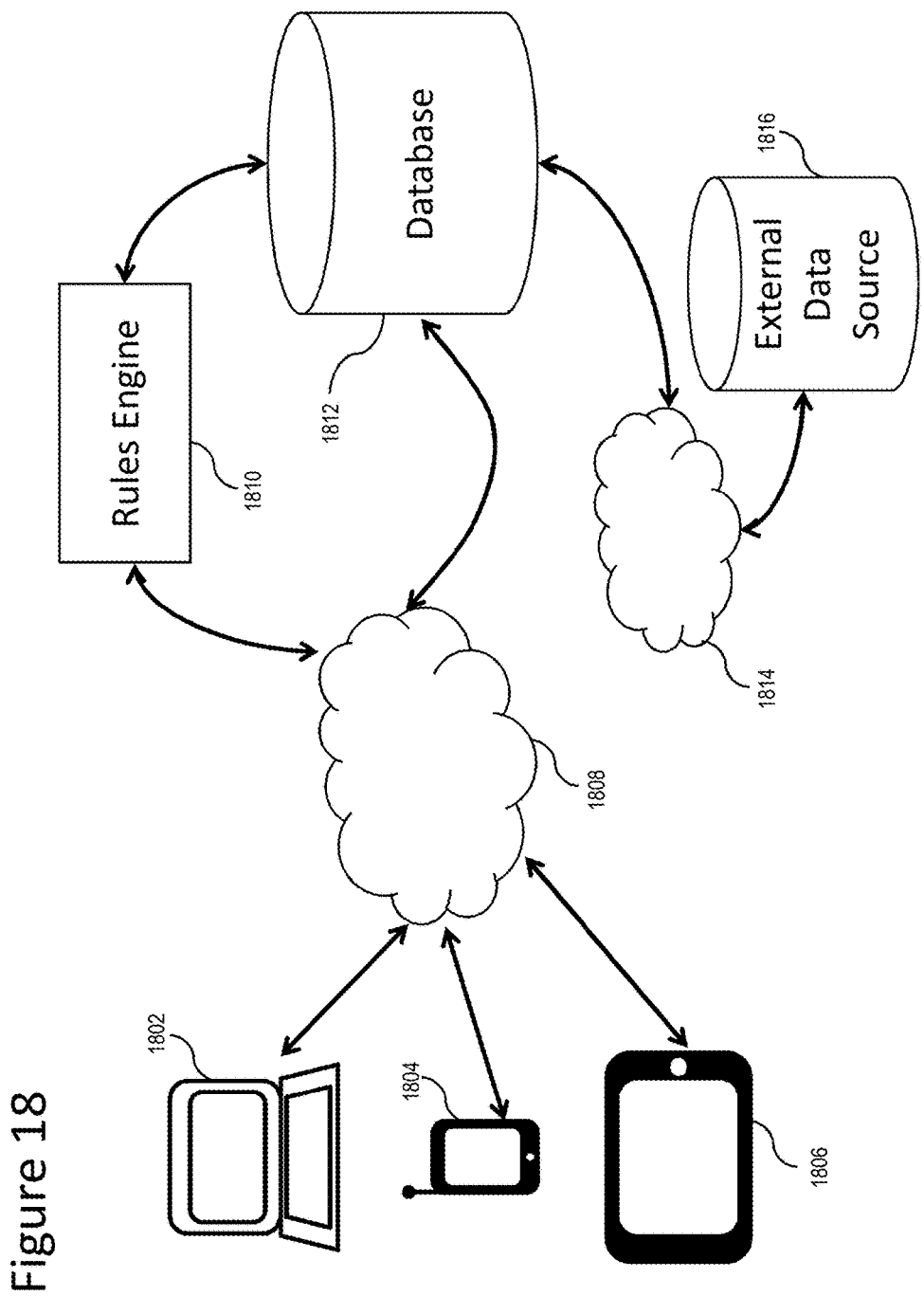
FIG. 18 illustrates one example way that users may access the system's rules engine(s) and database(s)

Unless otherwise indicated illustrations in the figures are not necessarily drawn to scale.

DETAILED DESCRIPTION OF EXAMPLE EMBODIMENTS

As used herein, the term "Applicant" refers to the entity (usually a person, but could conceivably be a group of people, for example a non-profit organization applying for a grant) that is submitting an application to a program.

As used herein, the term "Application" refers to an application to a college, graduate school, scholarship, employment opportunity, internship, etc. Many applications have a quantitative component (e.g. test scores, previous grades), and many applications have a qualitative component, including but not limited to essays, resumes, "brag sheets", letters of recommendation/referrals, interviews, presentations, creative pieces, etc.

As used herein, the term "Brainstorming" refers to a creative process meant to generate ideas. In this context, it is a process where a user thinks about as many details about themselves (e.g. "evidence", such as stories or traits) as they can. Fodder for brainstorming may come from $3^{rd}$ parties, such as teachers, co-workers, friends and family, etc.

As used herein, the term "Brainstorming prompts" refers to anything that assists the user in brainstorming a new idea. An example could be a thought-provoking question, a video, a creative visualization exercise, etc.

As used herein, the term "Brand" refers to a marketing concept that tries to distill and convey a product's key features. In this context, the "brand" can refer to the overall impression that the applicant may like to make on the decision-makers at the program they are applying to. The benefit of developing a user's brand is that decision-makers are often overwhelmed with the number of applicants they need to assess; focusing one's application around a concise brand may help the applicant stand out/more clearly convey their "fit" for the program being applied to. "Branding Statement" or "Brand Positioning Statement"—a summary of a user's key brand traits, perhaps consolidated into a sentence.

As used herein, the term "Brand Traits" refers to meta-data, usually descriptive words, assigned to a user or to their evidence/stories. Brand trait meta-data could also be assigned to elements of the application, to facilitate matching a user's evidence to a program or specific elements of its application. These could include personality traits, strengths/weaknesses, and the significance of a story to a user (e.g. "turning point" or "lesson learned". Brand traits could be assigned broadly to describe a user overall, or one or more brand traits could be assigned to a piece of evidence about the user. This meta-data can be used to guide the user through parts of the method. For example, an application may have an essay question that asks the user to describe a time they were on a team. This essay question may have the brand trait "team-work" assigned to it. If the user has any evidence with the meta-data of "team-work" assigned to it, the system may pro-actively prompt the user to consider using that particular example when answering that particular essay question. Or, continuing this example, if the program in question is one that focuses on "leadership", but a user's evidence does not have the brand trait of "leadership" assigned to it, the system may prompt the user to go back and brainstorm evidence that may demonstrate this brand trait. Meta-data can also be factual, vs. subjective, such as the time-period or context in which the evidence occurred.

As used herein, the term "Decision makers" refers to the person or people at a program who determine which applicants advance to the next phase of the application process, and/or which applicants are ultimately selected for the program. The decision makers could be members of an admissions committee, or of a human resources/recruiting department.

As used herein, the term "Evidence" refers to information about the applicant used in the application. Evidence could consist of stories or anecdotes from an applicant's life. It could also consist of factual information that the applicant may want to convey in the application, for example, if a close relative also attended the program. An applicant may first brainstorm evidence, and then consider which brand traits that evidence portrays in them, or they may first choose which brand traits they would like to convey in the application (either individual brand traits or via a brand positioning statement) and then try to generate evidence that supports that brand. Evidence may be gathered from other people, e.g. a parent, teacher, co-worker, coach. Evidence may also be imported from an external data source, e.g. a learning management system, an academic records system, or a system that stores employment information. Evidence may be broken out into types, such as "primary evidence" (i.e., something that will be a primary focus of the essay) or "supporting evidence" (i.e., something that is simply mentioned in passing).

As used herein, the term "Mapping" refers to a process of matching or allocating a user's evidence across various elements of an application.

As used herein, the term "Map" refers to the result(s) of a mapping exercise. A "map" can be created for individual application elements (e.g. one school's essays; one job's cover letter), or a "master map" can be created to holistically look at how all evidence is currently matched up to the entire application as a whole (e.g., adding in how the letters of recommendation, data forms, etc. will also play a part). The method will prompt users on how to construct a map. It may also pro-actively guide users in which pieces of evidence might be best mapped to a specific part of the application— for example, there may be brand trait meta-data associated with an interview question, and the system will recommend that a user utilize evidence containing the same brand trait to answer the question. The system may also calculate if a completed map shows an optimal balance. For example, if a high percentage of the evidence mapped to a school's essay questions only contain the brand trait of "analytical", but no other brand traits, the system may display a warning message to the user, telling them to consider using a broader mix of evidence to show that they are well-rounded.

As used herein, the term "Master Map" refers to a "Map" may be created for any specific element of an application, at varying levels of granularity. For example, a "map" may be created for only one portion of one specific essay question, or a user may create an overall map that examines several or all parts of the application simultaneously. There are several possible types of maps; a "master map" refers to a map that is created to look at/plan out several elements of an application at once; e.g. it may display the cover letter, resume, and letters of reference all in once visual display, so that the user can see the overall picture they are providing.

As used herein, the term "Positioning" refers to how an applicant chooses to portray themselves to the decision-makers at a program. Since it is almost impossible to convey every single detail of an applicant's personality or life history via the often-limited confines of an application, developing a positioning strategy may help determine which key traits/skills/experiences/details/etc. could be emphasized in the application. The positioning may be closely related to, or perhaps interchangeable with, the concept of "brand" or "brand positioning statement", etc. The idea is to distill an applicant's data into key "take-aways" that will be easier to understand for the decision-makers. This can be especially useful in cases where the decision-makers need to choose from a large number of similarly-qualified candidates, and/or make those decisions in a limited amount of time.

As used herein, the term "Program" refers to a "school" or "job" or "competition" (e.g. a scholarship competition) or whatever it is that user is applying to. The term may be used in other contexts as well, that is, any situation where someone (the applicant) is trying to be selected for something (by the decision-makers).

As used herein, the term "Story" refers to one type of "Evidence" comprising a piece of information the applicant may wish to convey to the decision-makers. Since stories and anecdotes often form the foundation for a successful application, the word "story" is used frequently throughout this text, but it is understood that the "story" could also be any piece of data or information about an applicant, and is not limited only to "stories" in the traditional narrative sense. That is, a "story" could indeed be a conventional anecdote, such as "leading the science project", or the story could be anything the applicant would like to convey about themselves, even if it not an anecdote per se, or even something about themselves in which they are not a direct protagonist, such as "mother died when young", "best friend in jail", "grand-father an alumnus", "visited campus last autumn", "color-blind", etc.

In an embodiment, a data processing system implements a computerized method that guides the user through one or more of the following steps, in any one of several different orders: developing a "positioning" or "brand"; identifying personal traits to emphasize or focus on; brainstorming each applicant's unique stories or anecdotes; providing a system to guide a user in allocating their stories or personal traits amongst the discrete pieces of an application; checking to make sure that an optimal mix of stories is being used; guiding a user on a strategy for soliciting strong letters of recommendation; advising on the best type of resume to construct; breaking down a specific set of essay or interview questions into sub-questions; compiling and rearranging the sub-questions into a rough draft; guidance on how to create a final draft; soliciting editing feedback from third parties; and, preparing for an interview.

It would also be useful to have a task-management system or calendar that truly adapts to each individual user, as opposed to providing generalized weekly checklists Embodiments may be configured to tailor advice to users based upon variables, data, or meta-data about the user.

The description given with respect to the drawing figures is for examples as the invention extends beyond these limited embodiments. Many alternate and suitable approaches are possible, depending upon the needs of the particular application, to implement the functionality of any given detail described herein. Descriptions of alternative embodiments do not necessarily imply that the two are mutually exclusive.

The terminology used herein is used for the purpose of describing particular embodiments only, and is not intended to limit the scope of the present invention. The singular forms "a," "an," and "the" include the plural reference unless the context clearly dictates otherwise. Thus, for example, a reference to "an element" is a reference to one or more elements and includes equivalents thereof known to those skilled in the art. Similarly, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which the invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

Features which are described in the context of separate embodiments may also be provided in combination in a single embodiment. Conversely, various features which are, for brevity, described in the context of a single embodiment, may also be provided separately or in any suitable sub-combination.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an example embodiment," do not necessarily refer to the same embodiment.

Devices or system modules that are in at least general communication with each other need not be in continuous communication with each other, unless expressly specified otherwise. In addition, devices or system modules that are in at least general communication with each other may communicate directly or indirectly through one or more intermediaries. A description of an embodiment with several components in communication with each other does not imply that all such components are required.

As used herein, a "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet computer, a personal digital assistant (PDA), a portable or mobile telephone or other mobile computing device; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; and generally, an apparatus that may accept data, process data according to one or more stored software programs, generate results, and typically include input, output, storage, arithmetic, logic, and control units.

Some embodiments may be practiced in network computing environments with many types of computer system configurations, including personal computers, hand-held devices, multi-processor systems, microprocessor-based or programmable consumer electronics, network PCs, mini-computers, mainframe computers, and the like. Where appropriate, embodiments may also be practiced in data centers, cloud computing environments, Software as a Service (SaaS) environments, or other distributed computing environments where tasks are performed by local and remote processing devices that are linked (either by hardwired links, wireless links, or by a combination thereof) through a communications network. In a distributed computing environment, program modules may be located in both local and remote memory storage devices.

As used herein, "Software" may refer to prescribed rules to operate a computer. Examples of software may include: code segments in one or more computer-readable languages; graphical and or/textual instructions; applets; pre-compiled code; interpreted code; compiled code; and computer programs.

As used herein, "Messages" may refer to methods of communicating information. Examples of messages my include: phone calls; calls via Voice Over Internet Protocol (VoIP); electronic mail (e-mail); text messages (SMS or MMS); instant messaging (IM); blogging and micro-blogging services; social media; audio recordings; "podcasts"; video recordings; video chat; etc.

Embodiments can be implemented in an operating environment comprising computer-executable instructions (for example, software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, HTML5, Extensible Markup Language (XML), Extensible Style sheet Language (XSL), Document Style Semantics and Specification Language (DSSSL), Cascading Style Sheets (CSS), Synchronized Multimedia Integration Language (SMIL), Wireless Markup Language (WML), JAVA; JavaScript., JINI, C, C++, Objective C or any language operable on a wireless platform like iOS, Ruby, Ruby on Rails, Perl, UNIX Shell, Visual Basic or Visual Basic Script, Virtual Reality Markup Language (VRML), ColdFusion™; Adobe Flash & related languages; or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of computing devices functioning logically as links and nodes for example and arranged so that information may be passed from one part of the network to another over multiple links and through various nodes. Examples of networks include the Internet, the public switched telephone network, the global Telex network, and other computer networks (for example, an intranet, an extranet, a local-area network, internetwork, or a wide-area network), using wired, wireless, and terrestrial or satellite links.

The Internet is a worldwide internetwork of computers and computer networks arranged to allow the easy and robust exchange of information between computer users. Computers may connect to the Internet via Internet Service Providers (ISPs). Content providers (for example, website owners or operators) place multimedia information (for example, text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products. In an embodiment, a block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. A block in the flowchart or block diagrams may represent a module, segment, or portion of code, which comprises one or more executable instructions for implementing the specified logical function(s). In some implementations, functions may occur out of the order shown in the figures. The steps of processes described herein may be performed in any order practical. Further, some steps may be performed simultaneously. A block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart and/or block diagram block or blocks.

As used herein, the term "computer-readable medium" refers to any medium that participates in providing data (for example, instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, alternative database structures to those described may be readily employed, other memory structures besides databases may be readily employed. Any schematic illustrations and accompanying descriptions of any sample databases presented herein are example arrangements for stored representations of information. Any number of other arrangements may be employed besides those suggested by the tables shown. Similarly, any illustrated entries of the databases represent example information only and the number and content of the entries can be different from those illustrated herein. Further, despite any depiction of the databases as tables, an object-based model could be used to store and manipulate the data types or implement the processes of the present invention.

As used herein, a "computer system" may refer to a system having one or more computers, where each computer may include computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

As used herein, the term "software" refers to computer program instructions adapted for execution by a hardware element, such as a processor, wherein the instruction comprise commands that when executed cause the processor to perform a corresponding set of commands. The software may be written or coded using a programming language, and stored using any type of non-transitory computer-readable media or machine-readable media well known in the art. Examples of software in the present disclosure comprise any software components, programs, applications, computer programs, application programs, system programs, machine programs, and operating system software.

As used herein, the term "module" refers to a portion of a computer program or software that carries out a specific function that may be used alone or combined with other algorithms of the same program.

As used herein, the term "unit" refers to one or more system hardware and software components (e.g. module) required to carry out a specific function. By way of non-limiting examples, "units" of the various embodiments of the present disclosure may comprise: a branding unit; a brainstorming unit; a mapping unit; an answer drafting unit; and a interview preparation unit.

A "client-side" application may refer to an application, a page associated with that application, or some other resource or function invoked by a client-side request to the application. A "browser" as used herein is not intended to refer to any specific browser (for example, Internet Explorer, Safari, Firefox, or the like), but should be broadly construed to refer to any client-side rendering engine that can access and display Internet-accessible resources. A "rich" client typically refers to a non-HTTP based client-side application, such as an SSH or CFIS client. The client-server interactions may occur using HTTP or other protocols. The client server interaction may be formatted to conform to the Simple Object Access Protocol (SOAP) and travel over HTTP or any other transport mechanism (such as CORBA, for transport over an enterprise intranet) may be used. Any application or functionality described herein may be implemented as native code, by providing hooks into another application, by facilitating use of the mechanism as a plug-in, by linking to the mechanism, and the like.

Example networks may operate with any of a number of protocols, such as Internet protocol (IP), asynchronous transfer mode (ATM), and/or synchronous optical network (SONET), user datagram protocol (UDP), IEEE 802.x.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. However, all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

As used herein, the term "processor" may refer to any device or portion of a device that processes electronic data from registers and/or memory to transform that electronic data into other electronic data that may be stored in registers and/or memory. A "computing platform" may comprise one or more processors.

FIG. 1 illustrates an example embodiment of a data processing method. Particular steps of FIG. 1 are described further in other sections herein. In an embodiment, the process of FIG. 1 is implemented using a server computer that is coupled over a network to a user computer.

In an embodiment, the process starts at step 102. Optionally, data about a user is collected from a user computer at step 104. This data may be entered by the user directly, may be collected from other people, for example, a teacher, parent, coach, boss, peer, or may be imported from an external data source. The more information collected on the user, the more tailored the guidance may be. This step is optional, as the computer method can still provide value without the personalized advice, via the exercises described in more detail below.

In an embodiment, the process may guide the user to a "Branding" exercise at step 106, or a "Brainstorming" exercise at step 108, or a "Mapping" exercise at step 110. As described in more detail below and as illustrated in various drawing figures, the order in which these steps occur may be changed. In addition, in an embodiment a "mapping" exercise 110 may be performed without performing steps 104 through 108. In various embodiments, each of the steps 106, 108, and 110 can be provided on a stand-alone basis. In an embodiment, performing a "mapping" exercise 110 could be the only step provided, or the branding exercises 106 could be the only step provided, or the brainstorming step 108 could be the only step provided. That is, various embodiments could be built that contain one or more of these elements, configured in varying orders. As an example, the brainstorming step 108 may come before or after the mapping step 110.

In an embodiment, the process may guide the user through a "Pre-writing" exercise at step 112, which may be followed by a "Rough Draft" exercise at step 114. Additional writing exercises may be provided at step 118, and an optional Editing Tool may be used at step 116. Block 120 represents a callback, return, end, or other termination of the process.

FIG. 2 illustrates another embodiment of a data processing method. In an embodiment, the process starts at block 204. Starting, in this context, may comprise receiving a login request from the user computer at the server computer, validating user credentials, and establishing a session for a particular user of the user computer. The process may check to see if a particular user has an account at block 206. If not, then an account may be created at block 208.

Once an account is verified or created, in an embodiment, the user computer may be prompted to specify whether the user would like personalized advice at block 210. The particular content of the prompting message is not critical; in an embodiment, the message specifies that personalized advice requires the entry of data points about the user. Some users may not wish to do this additional work, and therefore the process may proceed to the beginning of Branding exercises at block 220.

Otherwise, the process may check at block 212 whether stored data indicates to which academic programs or employment positions the user is applying. For example, a stored database record associated with the user account may specify that the user is applying to a particular type of program, such as an MBA program, and may specify that the user is applying to one or more particular schools. Additionally or alternatively, the database record associated with the user account may specify that the user is applying for a particular type of job title, and/or to designated companies and organizations for multiple positions and internships that have been identified by the user or the computer system as ones that the user is qualified to fill.

If the process determines that stored data indicates the programs involved in an application, then control transfers to block 216. Otherwise, the process may generate a prompt to the user computer to enter data indicating which programs they are applying to at block 214. In an embodiment, an option may be configured for the user to select "I don't know", as many of the exercises can be completed with generic essay topics and other information. In an embodiment, a user is not required to provide a specific program, school, or job or company to proceed. In an embodiment, if the user's desired program, company or job title is not currently in the system's database, the user may be able to add it, or to contact a system administrator who will then update the system with the missing data.

At block 216, the process may collect information about the user, such as work history, academic history, and performance on exams, prior employment positions, salary history, job performance reports, etc. The data may be entered in directly by the user, may be collected from other people such as a teacher, or may be imported via a third-party data source. Entering certain data points may prompt the process to generate and provide additional clarifying questions, for example to explain circumstances that may accompany poor grades. Different values of data, or combinations of data, may prompt the process to return messages related to the user's potential perceived strengths or weaknesses. That is, if the user has grades that fall below a certain threshold value, or too little work experience, or irrelevant work experience, or not enough community service, then one or more alerts or notifications may be displayed. The process may also display computer-generated advice on how to mitigate the issues that caused generating the alerts or notifications. Conversely, any potential strengths, such as extensive leadership experience, international experience, knowledge of an obscure language, or skill in playing a rare musical instrument may cause generating a display indicating a potential strength. Advice on how to most capitalize upon that strength may be displayed.

Figure 5:
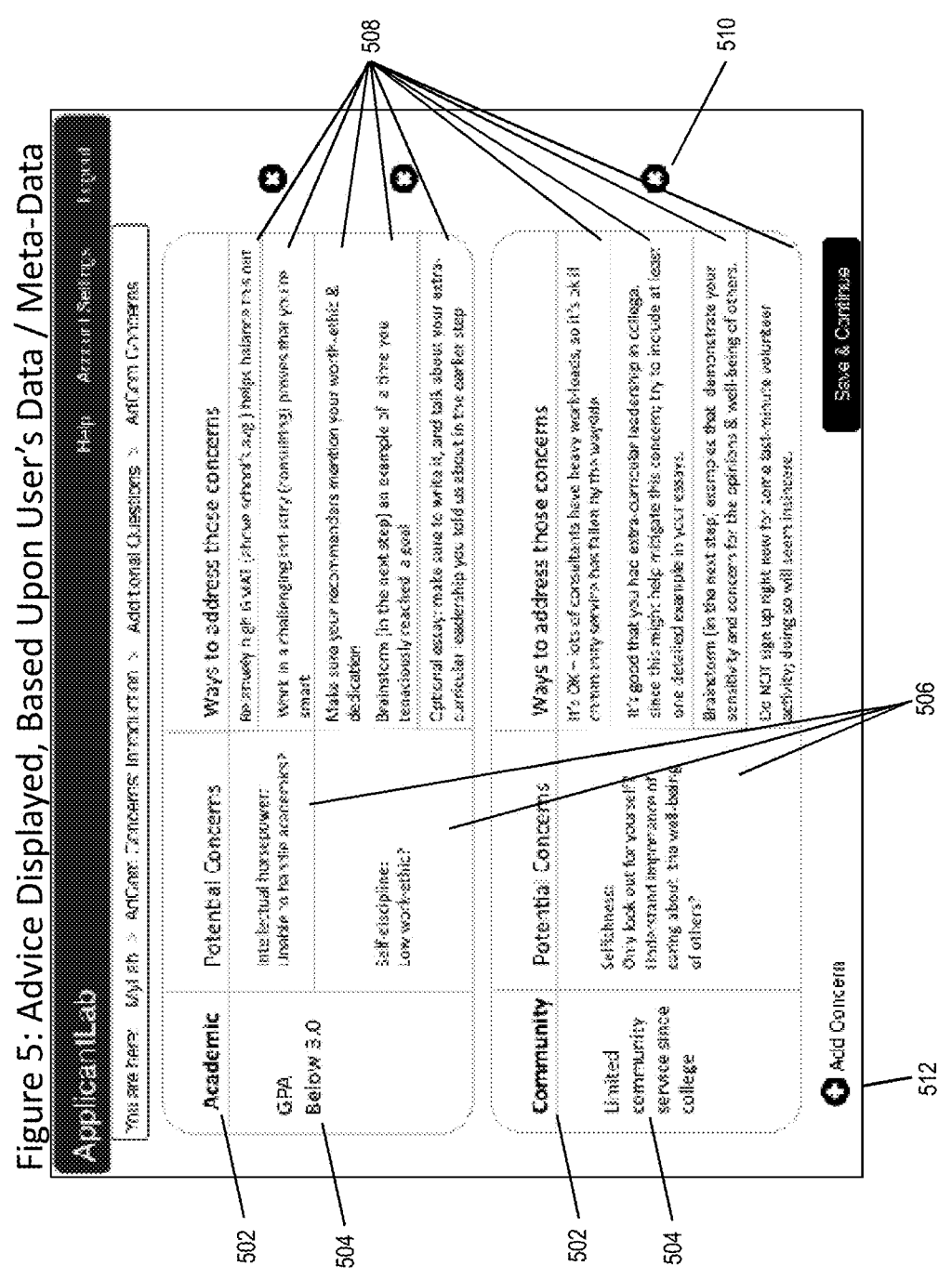

In an embodiment, at block 220, branding and brainstorming exercises may begin by utilization of the appropriate computer modules as by the computer system. In an embodiment, the process may prompt the user computer with options for working on brainstorming first, or working on branding first. In other embodiments, a different path may be prescribed. Specific brainstorming exercises are described further herein in connection with FIG. 5 and may be performed at block 224.

In an embodiment, if block 224 (i.e. the Brainstorming module) is performed first, then control may transfer to block 226 (i.e. the Brand Positioning module) afterwards to assign brand traits to the stories that the user created. Conversely, a user may wish to first think about their brand, and may instead develop a "brand positioning statement" first, or select their "top traits" first, and then go back and brainstorm stories that display those traits. Embodiments are configured to permit the user computer to perform several iterative cycles of these exercises.

In an embodiment, an optional "career vision exercise" may be provided at block 222.

The user computer may then move on to create their "maps" as seen at block 228 (i.e. the Mapping module), which represents mapping or matching the stories, anecdotes or traits to various elements of the application, as applicable, and may include iterating between individual and master maps.

In an embodiment, the user can choose to first work on a "master" map at block 232, or on individual maps for specific application elements such as essays or letters of recommendation at block 230. In an embodiment, the process is configured to permit iterative movement between defining a "master" map and individual element maps. Other embodiments may be configured to provide only a master map, or to skip the master map and to provide a map only for one or more individual elements.

In an embodiment, maps for individual elements may be broken out into separate processes. For example, one embodiment may be configured to receive a fee for the user to create unlimited maps for unlimited schools; an alternative embodiment may be configured to receive a fee that is charged per map, per school, or per application element; and, an alternative embodiment may be configured to receive a fee that is charged per company and organization the user has expressed an interest in; job titles; industries; geographic locations, etc. Payments may be charged at any point in the process and in any variation such as a subscription service, or a bulk fee for a group of users, such as students in a school system or clients of a career placement firm. Fees may also be waived, for example, for students being helped by a non-profit organization.

In an embodiment, at block 234 the process may be configured to analyze the data or meta-data associated with the user, the user's stories, and the essay questions to attempt to ascertain if the maps have been created optimally. In an embodiment, the process may generate a warning message to the user computer under specified conditions, for example, when a map uses the same example too many times, or if the brand traits associated with a story do not match the associated meta-data assigned to an essay question. The map check step of block 234 is optional in various embodiments.

In an embodiment, the process may be configured to perform one or more prewriting exercises at block 236. FIG. 16 illustrates an example of a prewriting exercise.

In an embodiment, the process may be configured to generate and cause displaying a screen for completing the final draft at block 240, in which the information entered by the user at the rough draft step of block 238 is displayed for the user to work from. An optional draft revision tool may be provided at block 242 and block 244 represents a callback, return, termination or other end.

In an embodiment, at block 250 the process may cause generating and displaying a graphical representation of a task list in the format of a calendar, and certain steps of FIG. 2 may be incorporated into the calendar; a specific example is described further in other sections herein.

In any of these embodiments, the process may be configured to provide an option for users to receive more extensive advice if the user responds to a wider selection of questions, as more data collected will allow the process to develop more specific recommendations. In another embodiment, the process may be configured to provide the user with alternative "paths" through the process of FIG. 2.

In some embodiments, the process may request a variety of data from users in all or some offered options, and then tailor the presentation of steps or blocks based upon the data that is received. Referring again to block 214, when a user is applying to a school or a company or a particular employment position, in an embodiment the process is configured to prompt the user to specify which schools or companies they are applying to, which programs or job titles within those schools or companies, and the deadline for submission of applications rounds. FIG. 3, steps 304 through 310, illustrate an example of collecting school data for block 214. As an example, the school's information may consist of deadline dates, application requirements, essay questions, letter of recommendation questions, information on forms to be filled out, and interview questions and may be stored in the database as seen in FIG. 18, step 1812. Alternatively, the process may be configured to pull this information from a third-party, such as an external database 1816 that stores school information. As shown in FIG. 3, block 306, if a user's desired school is not currently offered, then the process may be configured to enable the user to add their desired school's information to the system 308. In an embodiment, when a user is applying to a job, the process may be configured to receive data to specify the online job posting that the user is are applying to, or may be configured to permit the user to manually upload information about the job or to prepare their information for potential future job postings.

Referring again to FIG. 2, block 216, some embodiments may collect data from the user about their background, for example, their demographic, academic, professional, and/or extracurricular profile. The information may include but is not limited to age, nationality, race/ethnicity, number of years of schooling completed, grades or academic performance, grade point average ("G.P.A.") both overall and in specific subjects, performance on tests such as standardized test(s), such as the SAT, Advanced Placement ("AP"), GMAT, LSAT, GRE, or MCAT, work experience [such as number of years, industry, function, type of company], extra-curricular activities [such as type of activity; time commitment; leadership role y/n?; "Do you have significant international experience? y/n"], volunteer work, hobbies formal management experience [y/n].

In an embodiment, some information may be entered in manually; either by the user, or some third party such as a teacher, coach, parent, boss, friend, or career counselor. Information about the user may be entered via any messaging medium, or using a user computer and a browser to connect to a website provided by the server computer, for example, via text, drop-down lists, radio buttons, and video uploads. Some information may be imported from an external source 1816, such as a school's database, a "Student Information System" (SIS), a social network, or an online employment information tool such as LinkedIn. In an embodiment, the process user may attach or upload a document such as a résumé or a "brag sheet" from which the process may scan and cull out relevant information automatically.

In some embodiments, the data and meta-data requested may depend on which type of program the applicant is applying to, the specific admissions guidelines for a specific school, or other factors. In an embodiment, the process may generate messages to the user computer to request that a user preparing a job application supply a list of prior employment positions, responsibilities required in those positions, functions performed, accomplishments, as well as whether or not they formally managed others, received good performance reviews, received a promotion. In an embodiment, the process may request that a user preparing an application to an undergraduate college supply academic history, extracurricular history, and/or employment history data. The process may generate messages that prompt the user computer only to provide high-level variables, such as which industry the user works in, or which academic field they plan to major in. In an embodiment, the process may prompt the user computer for additional values, such as detailed dates that the user held the job, what function(s) they performed in that job, whether or not they held a leadership role, whether or not they managed others. In an embodiment, the process may be configured to prompt the user to enter in to the system additional metadata for each activity, such as the date(s) or time periods in which a certain activity was performed, in which context it was performed.

The data may be collected all in one step, for example at the beginning of the process, or may be interspersed or divided into various steps. The more information is collected from the user, the more tailored the system's experience and advice may be, as the values of the variables or combinations of variables and their associated metadata may return different advice or guide the user through a different path within the system. In an embodiment, an administrative user having a computer coupled to the server computer can view a user's information and the input/output of the system and then use that information to create their own guidance for the user.

In an embodiment, if certain data entered has a specific value, that is, if it is within a specified range of values, falls beneath a threshold value, the process is configured to generate data with additional questions to collect useful associated metadata. For example, if a user has a Grade Point Average ("G.P.A.") below a certain threshold value, the process may generate messages to the user computer to prompt the user to enter in additional data, such as whether the user had to overcome a personal hardship, had to work full-time to finance their education, majored in something unusually challenging, was the first in their family to attend college. This meta-data could change the information and guidance presented to a user in other parts of the process, thus "personalizing" the experience. In an embodiment, if a user has a G.P.A. of <3.0, but had to work full-time to finance their education, then that user may be prompted to mention this potentially important detail in the application data.

It may be beneficial for an applicant to know how certain data about themselves in their application may be perceived by decision-makers at institutions to which the application is submitted. In an embodiment, at block 218 the process may determine that a user's data contains one or more potential weaknesses or problems. These problems may be determined from the data values input by the user. If the user's values for certain variables, or combinations of variables, are present, then the process may determine that a problem potentially exists. The system may also determine the perceived severity of the problem, depending upon the magnitude or range of the user's variables and the combinations of variables in that user's profile. As an example, a G.P.A. of 2.9, while potentially negative, may be analyzed as the system as negative, but not as negative as a G.P.A. of 2.0. Or a G.P.A. of 2.9 may not be viewed as negatively if it occurred for a user who majored in a challenging major such as Computer Science and also worked part-time to finance their degree. The user then may be advised of the problems and potential steps to address the problems.

In an embodiment, the process may be configured to permit the user to select one or more problems or one or more strengths to see corresponding advice. For example, the user may feel that they do not have "enough" extra-curricular leadership and could wish to see what actions the process recommends taking in response to identifying this problem. In an embodiment, the process may be configured to permit the user to manually select whichever problems or strengths they feel may apply to them. In an embodiment, the process is configured to facilitate the user soliciting feedback from others on their strengths and weaknesses, for example a teacher, coach, counselor, boss, parent, or friend. Conversely, a user may disagree with the assessment of the process and may opt to "ignore" or "delete" certain advice that is displayed.

In an embodiment, a rules engine may be configured to analyze the data and meta-data input. The logic for determining problems and related advice may be comprised of a nesting logic, or Boolean logic, or other types of algorithms. As an example, certain variables that lead to determining a problem may cancel each other out. For example, a poor performance on a standardized admissions test may be counter-balanced by a strong grade point average or heavy involvement in extra-curricular activities.

As one example, if the user applying to a graduate business program has (G.P.A<3.0), then a warning may be displayed. If the user has a (G.P.A.<3.0) && (GMAT>750), then a different message may be displayed, since the high GMAT score counter-balances the low G.P.A., whereas a user with (G.P.A.<3.0) && (college major="Humanities") may be given yet another advice message, regardless of their GMAT score, since a low G.P.A. in the humanities is more difficult to overcome and may require the writing of an additional explanatory essay, a different strategy in collecting the letters of recommendation. As another example, if the user has the data point ("industry"="investment banking"), certain guidance may be displayed; if the user has ("industry"="investment banking") && (G.P.A.>3.9), the user may be cautioned to not appear arrogant in their essays; a user with ("industry"="investment banking") && (G.P.A.>3.9) && (community service="significant") may have different advice displayed, since their significant dedication to community service may mitigate their potential perceived arrogance. Any logical operator or operators can be applied to the user's data, meta-data, or combinations therein to provide warnings and/or related guidance.

As another example, certain variables may be weighted in determining a problem. For example, the process may be configured to give certain variables more weighting or less weighting in the determination of which advice to present to the user. In an example, certain variables may take precedence in the form of a data hierarchy. The rules engine may be configured to select which specific pieces of content are displayed to the user. The content may be stored in one or more database tables. An alternate embodiment may allow a user to manually access such content, regardless of whether or not the rules engine is being used. This embodiment would allow users to manually elect to see content if they do not wish to solely rely upon a rules engine. It would also account for an alternate embodiment where the advice is provided, even if the rules engine is not incorporated into that specific embodiment.

In other embodiments, the process can also highlight a user's potential strengths and suggest ways to the user to capitalize on those strengths. For example, the process may be configured to calculate and then display any positive aspects of a user's data set, using the same data also collected and analyzed for the problems. As an example, the user may have a favorable professional background, such as military service, or may speak a useful foreign language. The process for identifying strengths may be configured similar to the process for identifying weaknesses; the variables and associated meta-data may be analyzed, and in some embodiments, subject to calculations, and a message or series of messages may be displayed. In an embodiment, a rules engine which analyses a user's data or meta-data may serve different aims; examples include identifying weaknesses in an applicant's profile, or strengths, or both. One embodiment may show the user their strengths first, so as to encourage them, and then show the problems. Alternate embodiments may show either the strengths or the problems, or may show both the strengths and the problems simultaneously.

In an embodiment, the process is configured to display advice on how to address the problems or highlight the strengths in the user's application. For example, the process may be configured to suggest that a user with a low score on a standardized test should prepare stories and/or examples that compensate by demonstrating traits such as discipline or intellect, or a user with limited community service involvement may be advised to include stories in their application about their compassion. The user may be advised about the format to use in addressing the potential strengths or weaknesses, or in which part or parts of the application to address them, for example, whether or not a problem should be addressed using an essay, a letter of recommendation, as a topic to mention during an interview, or in several elements of the application.

The advice or guidance in this section and in any other section of the process may be presented in any number of media: text, video, audio, or via any messaging service.

In an embodiment, determining potential user weaknesses or strengths, and the related display of advice messages, may be implemented as a discrete step, or it may be distributed among other steps in the process. In an embodiment, the process may have a separate problems area for the user to examine on its own; in other embodiments, such problems and related guidance may instead be more subtly interspersed in other steps in the system. Or the "problems" or "strengths" and related advice may be updated as more information is collected about the user in other steps. For example, a sample embodiment may first have the user complete one or more of the branding exercises described below, and then incorporate that data about the user into the advice calculation before showing them their potential problems or strengths. As described in more detail herein, embodiments may provide specific and personalized guidance at other steps in the process depending upon data or combinations of data collected about the user.

FIG. 5 illustrates an example screen for a graphical user interface that may be generated for a user computer in connection with identification and advice relating to potential concerns or problems. In an embodiment, category of the concern may be displayed at region 502. In this example, the concerns are "Academic" and "Community". The specific "trigger" for the concern may be displayed at region 504 in association with region 502. In this example, the two triggers are a "GPA below 3.0" as well as "Limited Community Service since college".

In an embodiment, the process may be configured to display at regions 506 one or more elements of an explanation about why the triggers of regions 504 may concern an admissions committee. For example, a low G.P.A. may cause an admissions committee to worry that the candidate lacks intellectual horsepower, or perhaps is highly intelligent but lacks self-discipline, or perhaps lacks both of these traits. Limited community service activities may cause an admissions committee to determine that the candidate is too self-centered, a personality trait they may not value.

In an embodiment, advice to the candidate may be displayed at region 508. In this example, other data about the user is analyzed using a rules engine to determine which advice to display. This example user may have a "low" G.P.A.<3.0, but in step 216 he had also entered that he has (GMAT score=760) and worked in the (industry="management consulting"). Therefore, the advice displayed at region 508 tells the user not to worry excessively about his "low" G.P.A. since his intellect has been proven via these other data points. It also provides advice on things his recommenders can write in their letters of recommendation. Similarly, for his limited community service since college, the process may recommend that he write about some volunteering he did in college, using information that would have also been collected at block 216 (FIG. 2), and provides advice on possible essay topics to focus on. In an embodiment, a user has an option to delete advice displayed at regions 508, using deletion controls 510, or to add a concern and see the associated advice using Add Concern control 512. In an embodiment, user selection of the controls 510, 512 causes the process to execute the operations described above for the selected control. By creating a data-driven system to analyze variables about a user and display related advice, this system replicates one of the key strategic services provided by Admissions Consultants, in a way that is not currently done by any software currently available. In an alternate embodiment, the user may manually select to see the advice stored in the system, either in a case where they wish to manually override the rules engine, or in an embodiment of the system that does not contain a rules engine.

In an embodiment, the process may be configured for determining the user's "brand", or key positioning, to the admissions committee. Due to the high volume of applicants that an institution may receive, the decision-makers may spend only a few minutes reading an application before making an initial assessment. For example, some admissions members of top business schools have stated in interviews that they sometimes can only spend ten minutes on their first reading of an application. Therefore, there can be value in guiding the user to create a concise "brand" or "positioning statement", which will help the admissions officer to rapidly generally understand the applicant, and/or what they will contribute to the campus community and beyond. The development of a "positioning statement" or the selection of top personality or "brand" traits may also help the user "tighten their story" or "stay on message" by helping them to focus the content of their application. This step may be performed at various places within the processes described herein, may be interspersed throughout other steps, or may be omitted altogether. As described in more detail herein, the "positioning statement" or "brand" may also be useful in various embodiments in guiding a user to select certain stories or anecdotes to use in their application.

One embodiment may be configured to facilitate a user entering data representing one or more brand traits that apply to them, or selecting brand traits from a list. FIG. 7 illustrates an example screen display that may be generated for a user computer in one embodiment and showing example brand trait selection controls. The list of brand traits 702 may be pre-populated or may be entered by the user or a third party such as a teacher, coach, parent, or friend using add control 704. In an embodiment, each of the brand traits 702 comprises a selectable control which, when selected through user, is redisplayed in highlighted or emphasized form to suggest selection; selecting an Add control 704 causes adding the selected brand traits to a database record associated with the user account.

Sample brand traits may include "Analytical", "Empathetic", "Mature", though the example list in FIG. 7 is by no means exhaustive, and applicants to a specific program may be presented with different options. That is, a high school student applying to college may be presented with a different list than an applicant for a specific job opening, and an applicant to a military academy may be presented with a version of this exercise which differs from that of an applicant to an arts school. The list may be presented in a variety of ways, for example a simple display or words, or via some alternative visual display, for example using colors, icons, pictures. A different embodiment using icons can be seen in FIG. 10, which will be described below. Another embodiment may allow the user to solicit feedback about their brand from a third party using query control 708—for example a teacher, coach, boss, parent, friend, or co-worker. As an example, the process may be configured to send an e-mail to the third party requesting input, or the process may be configured to provide log-in credentials to the third-party to allow them to enter in the data directly into the server computer. In any of these embodiments, the process may be configured to send a message to the third-party having content such as "What do you feel are this applicant's strongest personality traits?" and may in a further embodiment accumulate and store responses and cause displaying them to the user.

One embodiment of the branding step may comprise creation of a potential "brand statement" or "positioning statement". As an example, a sample brand statement for someone applying to college may be "The analytical future engineering major who loves robotics", or "The funny future theater major who will be a star a-cappella singer". One embodiment may provide a series of adjectives, academic subjects, or activities that the user may select to populate their "brand statement". Any number of traits may be provided. Alternatively, the number of traits chosen may be limited, to focus the user.

The process may be configured to enable selection of brand traits using any of several visual formats. FIG. 6 illustrates an example graphical user interface that may be generated in an embodiment to facilitate selection of brand traits. In this example embodiment, the process is configured to cause displaying a plurality of scrolling list widgets showing adjectives 602, greatest academic strength 604, an extra-curricular activity 606, and potential ways to contribute to the college campus 608. In response to user input indicating moving or scrolling one or more of the widgets, the process may cause redisplaying one or more of the widgets to highlight or emphasize a different value. A brand statement may comprise a concatenation of the values that are highlighted or emphasized in all the widgets in combination, with linking language. Taken together, in the example of FIG. 6, the full brand statement reads: "I am a studious history buff, whose favorite extra-curricular activity is travel, and who will most notably contribute to the college campus via academic research."

Any of the items 602 through 608 may be presented more than once; that is, a user may select from several adjectives, areas of study. Also, other fields may be collected from the user as well. Finally, the exact wording of the Brand Statement may vary considerably. There may be further interactive exercises and lessons associated with this step to further guide the user. For example, each element of the Brand Positioning statement may require self-reflection, or feedback from third-parties.

The data that comprises a user's top brands, a "branding statement", or a "positioning statement" may affect which advice is displayed to the user at further steps in the process. As an example, the process may be configured to guide the user to select different essay topics, or to request that the writers of their recommendation letters should focus on different anecdotes, or that they highlight different examples in their interview based upon which data and meta-data is associated with them, for example, which "brand traits" are associated with them. That is, the user may utilize their "brand statement" to help guide consistency across all elements of the application. For example, if "international perspective" is a key part of an applicant's positioning statement, their recommendation letter writers may be prompted to focus on highlighting that aspect of the applicant.

A further embodiment may be configured to check the values chosen in the brand statement for possible contradictions in the user's data and meta-data. The logic for determining this may involve associating certain threshold values for an applicant's data or meta-data with certain positioning traits that have been selected. As an example, if the user selects "History" as the subject they intend to major in during college, but the user's G.P.A. in History subjects in high school is less than a certain value, for example, less than 3.5, or if the user's performance on a History-related Advanced Placement exam falls below a certain threshold, for example a score of "3" or below, the system may advise the user to consider modifying their brand, as the user's data does not support a strength in this area.

As another example, if an applicant to Law School states that they intend to study public interest law to help victims of domestic violence, but they have not entered any data that matches this goal (for example they have limited community service and up until now have been a paralegal working at a corporate, not public interest, law firm), the process may be configured to advise the user to re-consider their intended field, or to be aware of the skepticism they may face from the Admissions Committee. This is because the Admissions Committee or other decision makers may look less favorably upon applicants whose actual backgrounds may not match their stated goals. The process may also provide advice on how to counter that potential skepticism via various application elements.

In another embodiment, the process may be configured to suggest potential brand traits or a brand positioning statement based upon the data and meta-data collected about the user. For example, if the user has entered in data about themselves related to spending significant time abroad, the process may suggest that the user consider "international" as one of their brand traits, or "travel" as an activity they are passionate about, or may suggest "international relations" as a potential college major to consider. Similarly, if the user has entered in exceptional scores on English Language Advanced Placement or S.A.T. subject tests, the process may suggest that the user consider incorporating "literary" or "literature" into their brand. The data related to a user may be analyzed using a rules engine which selects which advice to serve or display to a user, based upon the value(s) of that data. By providing an online exercise for a user to select their brand traits or create a positioning statement, and by utilizing data about the application to guide the user, this process provides a service currently only provided by human Admissions Consultants that is not currently provided by any presently-known software-based systems.

In an embodiment, the process may be configured to move the brand development exercises to another step in the system. As an example, in a sub-method described in more detail below, the process may be configured to request a user to first brainstorm stories or anecdotes about themselves before they select their brand. The brand traits may be linked to individual stories rather than to the user, or may be linked to both.

FIG. 14 illustrates an example process for using brand traits to complete a map. In an embodiment, the process is configured to request a user to select one or more personality traits 702 they would like to convey in answering a specific essay or interview question 1202. The process may be configured to select, using widgets 706, which trait(s) they would like to convey in response to a question 1202 and then proceed with other sub-steps, such as brainstorming as further described herein. Another embodiment may intersperse these steps throughout other areas of the process. Another embodiment may omit the branding or brand positioning statement steps.

In an embodiment, the process is configured to provide a series of interactive exercises to help the user brainstorm which anecdotes, or "stories" they will use as the foundation of their application. Many competitive processes prefer to learn about candidates through stories that demonstrate certain behaviors, thought processes. For example, job interviews frequently require an applicant to respond to questions such as "Tell me about a time you led a project"; writers of recommendation letters may be asked questions such as "Describe a time the candidate overcame a challenge"; or applications to college or graduate school often require one or several essays, a statement of purpose, many of which ask for users to convey information about themselves. Providing this information typically happens using a written essay or letter of recommendation, but other media may be used as well, such as multi-media presentations, or video interviews. However, for a candidate to convey everything about themselves, or every experience they have had, through the application may be impractical. Consequently, the candidate is usually required to select a few key examples. There is value, therefore, in helping an applicant think about which stories they will use in their application.

Figure 8:
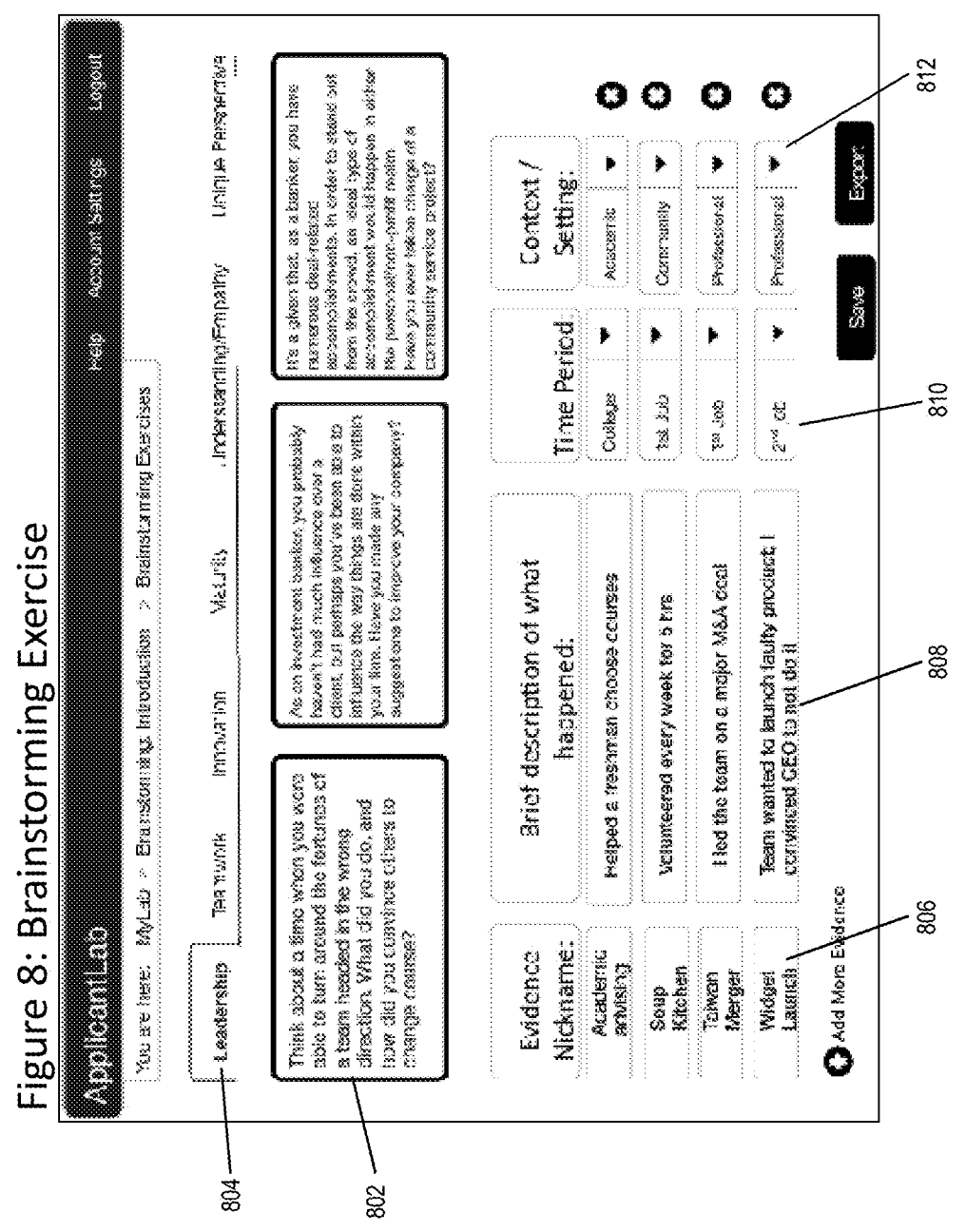

FIG. 8 illustrates an example embodiment of a graphical user interface that may be used to implement the brainstorming step. In this step, thought-provoking brainstorming "prompts" 802 are presented to the user. A "prompt" may be in any medium, for example text, video, message. The prompt may consist of a thought-provoking question that helps the user think of stories that would be useful in their application. For example, a prompt might display: "What are you most proud of in your life?" or "Have you ever had to stand up to someone you disagreed with?" or "Have you ever turned around the fortunes of a team headed in the wrong direction?"

In an embodiment, the process may be configured to prompt users to think about stories or any other information about themselves that they might like to tell via their application. Alternatively, the process may be configured to request a third party other than the user to input stories about the user. As an example, an extra-curricular adviser may enter in a story about a time that the user displayed exceptional leadership in an after-school activity. In another embodiment, the process may be configured to cause displaying to the user a generic set of brainstorming prompts, such that all users are shown the same prompts. An alternate embodiment may group the prompts into different categories at tabs 804. As an example, some of the brainstorming categories may be "Leadership", "Team-work", and "Compassion".

In an embodiment, the brainstorming prompts may be tailored by the specific program(s) to which a user is applying. In an example, a user may be applying to eight different business schools, which may have essay questions that ask about times a user has displayed leadership and team-work, but they may not request any examples of compassion. In an embodiment, the process may be configured to obtain meta-data associated with each school's application requirements, such as essay questions, letter of recommendation questions, and interview questions. Different categories of brainstorming prompts may be correlated to the meta-data associated with each school's application requirements. In response, the process may be configured to display to the user only brainstorming prompts for examples that would be useful to the specific programs that the user is applying to.

Another embodiment may display different prompts to different users, depending upon the data and meta-data that have been entered about them. In an example, if a user applying to college has entered data specifying that they plan to major in Literature, or if they have shown particular skill in Literary subjects (for example via the metadata of "G.P.A. in Literature classes">=3.6; or perhaps via "Advanced Placement score in English Literature">=4) the process may be configured to focus the brainstorming questions accordingly. In this example, the brainstorming questions displayed to the user may ask them to "Reflect upon your favorite poem. What about it inspires you?" or "Which author's 'voice' most resonates with you, and why?" The process also may be configured to modify the specific wording of a prompt that is displayed to a user, even if the topic of the prompt is the same. In a non-limiting example, a banker may be asked to think about a time they " . . . had to manage a difficult partner in the firm", whereas a teacher may be prompted to think about a time they " . . . had to manage a difficult school administrator". In another non-limiting example, a user applying to certain programs may only be shown prompts that solicit the types of stories or data that are relevant to that specific program. Presently-known software-based systems do not provide brainstorming prompts tailored to individual users or individual programs being applied to.

A further embodiment may be configured to import information about the user that has been compiled elsewhere, for example via a high school's data system or via an online job history web site such as LinkedIn®. The data provided by these external sources may provide a basis for brainstorming. As a non-limiting example, if a user has listed several jobs in their LinkedIn® profile, the system may ask brainstorming prompts related to each job. The benefit of personalizing the brainstorming prompts is that may increase the likelihood that a prompt will resonate with a user and therefore is more likely to spark ideas.

In an embodiment, a rules engine at the server computer is configured to select which specific brainstorming prompts to display to the user. The prompts may be stored in one or more database tables accessible to the rules engine.

In other embodiments, the interface of FIG. 8 may be presented as a "mind map". The particular structure or format of the interface is not critical and may be arranged for giving the user a place to think about and enter in their "stories" that will create a basis for other processing steps.

In a further embodiment that includes the analysis of a user's data to determine "problems" and/or "strengths", the brainstorming prompts may be displayed based upon correlations or logical rules pertaining to that data. As an example, if a user applying to a graduate business program has the data (college major="finance")+(current industry="investment banking") and (community service="zero"), then in a previously-discussed step, the process may be configured to determine that the user has a "problem" of "Being perceived as selfish or greedy by the admissions committee." The related advice displayed at that step may include "Be sure your application includes examples of times when you have shown compassion to others." In an embodiment, at the brainstorming step, the process may be configured to display prompts with the meta-tag of "compassion" to the user, for example, "Have you ever helped out a struggling colleague?", since stories with this specific theme would be particularly valuable to this specific user. Conversely, using the same logic, certain brainstorming prompts may not be displayed to a specific user. For example, an investment banker may not be shown any brainstorming prompts with the meta-tag "analytical skill", since most investment bankers, due to the highly-analytical nature of their jobs, do not need to prove to the admissions committee that they excel in this particular skill.

In an embodiment, the interactive brainstorming step may be configured for the user to directly enter in information about their stories or the other information about themselves they may wish to convey in the application. For example, the user may enter in information pertaining to their stories, and that information will be stored in the database. In an embodiment, the process may be configured to cause displaying an open text box in which the user can write text pertaining to the story, for example a description or explanation. Additional embodiments may include a story "nickname" field 806 which, when entered by the user, forms a shorthand way to refer to a specific story throughout other sections of the process.

In an embodiment, the process optionally may be configured to allow the user to associate objective or subjective meta-data with a story. As an example, the user may specify description 808 relating to the evidence, a "time period" 810 during which a story took place, or they may specify a "context" 812 in which the story took place. "Time periods" associated with a story could include specific ages, seasons, academic years (for example, "junior year"), college, post-college, "first job", "current job". "Contexts" associated with a story could include "Academic", "Professional", "Extra-curricular", "Community", "Hobby", "Personal".

The subjective meta-data that may be associated with a story could be related to emotions the user felt related to the story, for example "ecstatic", "deflated", or "determined".

The subjective meta-data may also be the "brand traits" referred to in a previous step. That is, a user may wish to think about which "brand traits" a particular story demonstrates in them. In this embodiment, instead of first thinking of their brand traits or brand positioning statement, a user could first think of potential stories that they may use in an application. Optionally the process may be configured to prompt the user to associate specific brand traits with each story or piece of information the user wishes to convey to the decision-makers.

Figure 9:
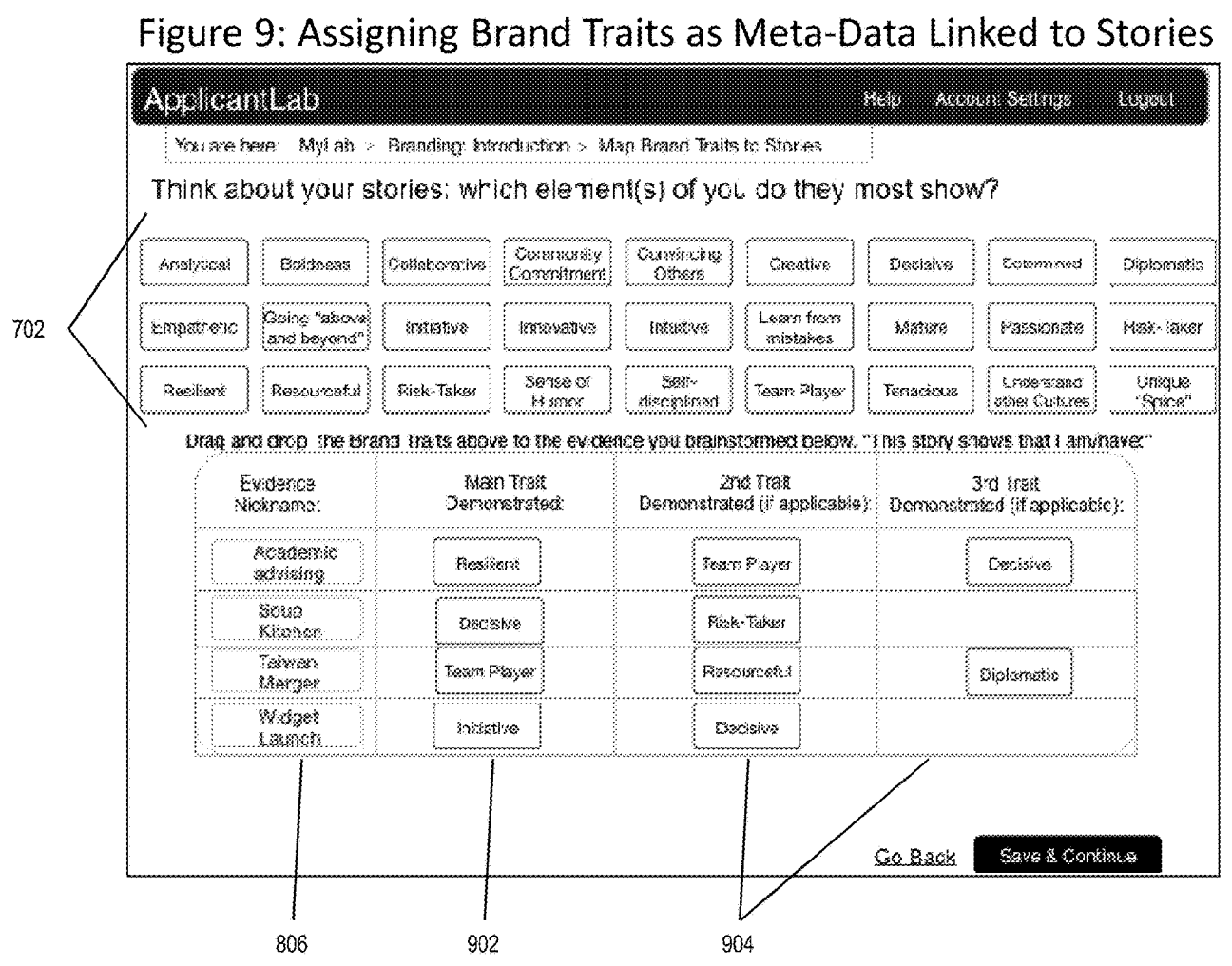

FIG. 9 illustrates an example graphical user interface that may be displayed for assigning brand traits as metadata linked to stories. In an embodiment, one or more brand traits 702 are displayed. The "nicknames" 806 for the stories brainstormed in a prior step may be displayed. In this example embodiment, the user may select which traits 702 to associate with a story 806. For example, a user may feel that their story with the nickname "Taiwan Merger" conveys that the user was demonstrating that they are a "Team Player", who is "Resourceful" and "Diplomatic". In one embodiment, if the user assigns more than one "brand trait" to a story, the user may rank which "brand trait" is most or least important, or may designate one trait as the "primary" trait 902 associated with the story, and the other brand traits are designated as less-important as seen in regions 904. The brand traits also may not be "ranked". The user may be limited in how many traits they assign to a story, or they may be able to assign as many as they would like.

The brand traits may be displayed in a variety of ways, such as via text, or colors, or via graphical icons. FIG. 10 illustrates an example graphical user interface providing brand traits using icons. In this embodiment the brand traits 702 may also be represented by graphical icons 1002, which are then associated with the user's stories 806 at icons 1004 and 1006. The separate step of icon 1006 would only be necessary if the embodiment requested that the user choose a "primary" trait of icon 1004 that the story conveys. In that example, icon 1006 represents the "secondary" or "supporting" traits. The benefit of this potential embodiment is that users with certain learning styles may respond better to different visual approaches.

Regardless of the visual format, embodiments may be configured to determine which personality traits are conveyed via which stories. In some embodiments this step may be omitted, or embodiments may request the user to enter brand traits first, such as in FIG. 7, FIG. 14, or FIG. 15. The brand traits may also be assigned by a third party, for example a teacher, parent, coach, boss, friend, or co-worker who is able to see the stories in question and enter in which subjective meta-data to associate with a story. A further embodiment may suggest brand traits, for example if a story was thought of via a brainstorming prompt "Compassion", or if a story is assigned the meta-data of "Community Service", then the process may be configured to recommend that the story in question may be representative of the brand traits of "Empathy", "Maturity", "Selflessness".

In an embodiment, the visual display of the brand trait is persistent with the display of the story. That is, the trait(s) associated with a story may be displayed in a certain visual way, for example, perhaps via a combination of colors, icons, shapes. If the story is referred to or is used in another part of the process, then this visual representation may be persistently visible in the other parts also. As an example, a user selects the brand trait of "compassion" to be associated with the story that has the "Nickname" of "Homeless Shelter Volunteering." In one embodiment, the brand-trait of "Compassion" may be represented by a pink color in the graphical user interfaces; by associating that brand trait with that story, the story with the "Nickname" of "Homeless Shelter Volunteering" could then be displayed in a pink color, and it may continue to be displayed with that pink color throughout the rest of the interfaces. Alternatively, if a graphical icon of a heart represents the trait "Compassion", then that graphical icon may be displayed in a persistent manner as associated with this particular story. In another embodiment, the trait of "Compassion" may simply be noted in a text-based form, and may be displayed as meta-data associated with a story. When the Nickname is the primary way that the story is displayed, any other meta-data associated with the story—for example time period, context, description, emotions felt, or traits represented—could also be displayed, either persistently, or temporarily, for example via a pop-up.

The traits may be assigned by the user or by a third party in a variety of ways, including but not limited to using a "drop down" list, via clicking on the trait to associate it with a story, via radio buttons, entered directly into a text box, or via a "drag and drop" interface. The process may include assigning a trait to a story, or vice-versa, assigning a story to a trait. A benefit of associating (a) brand trait(s) to a story is that it helps the user select which stories are the most promising; that is, which stories they feel demonstrate the qualities they would like the decision makers or admissions committees to see. Conversely, a benefit of first thinking of which traits to convey, and then brainstorming stories that display those traits in action, is that it narrows down the scope of brainstorming that the user has to do and may focus their time more effectively.

In a further embodiment, the brand trait assignment may trigger an iterative process, such that the user is prompted to go to another step, such as to the brainstorming stories step. As an example, if a "problems" engine in the process has determined that a user who has the (career="Investment Banker") needs to include at least one story demonstrating the (brand trait="Compassion"), and that user does not in fact assign that brand trait meta-tag to any stories, the process may be configured to display a message to that user urging them to go back to the brainstorming step to input an example from their life that illustrates this trait.

There may be various visual interfaces to display the stories, in particular, they can be displayed via any meta-data associated with them. As an example, the user may choose to view all stories in chronological order. Or the user may choose to display all stories with the meta-data of "Extra-curricular" associated with it, or all stories with the brand-trait "Teamwork" associated with it. The display may include combinations of meta-data, for example a user may choose to view all stories with the (time period="College")+ (context="Extra-Curricular")+ (emotion_felt="Determination"). Alternate embodiments may display the stories in a variety of graphical ways, such as but not limited to grouping in a Venn diagram, displaying in a "word cloud", stacking in a bar graph. The processes of displaying or ranking stories are not dependent upon the form of the display(s).

In a case where a user's stories may contain many types of meta-data, for example, many traits associated with them, it may be beneficial for the user to identify their "top traits" to condense or focus their application. In one embodiment, the user may select which traits they believe to be their strongest "top" traits. In an alternative embodiment, the "top traits" may be based upon input from third parties, such as teachers, or from data from an external data source, such as a student's grades in certain subjects or performance on certain tests such as AP exams.

In a further embodiment, the process may be configured to calculate and also display which brand traits are the user's strongest or their "top" traits. This calculation may comprise summing the number of times a specific brand trait has been assigned across a user's stories, such that traits used most often are considered to be "stronger". The calculation may also take into account whether or not a user has ranked a specific trait more highly, or has designated a certain trait as being the "primary" trait associated with a story or not. For example, traits that are ranked as more important or as "primary" may be given more weight in the calculation of which traits are the user's "strongest". The calculation of top traits may also take into account other data that has been collected on the user. The calculation of the user's "strongest" traits may be particularly useful in an embodiment where the user first thinks of their stories, before they determine their brand or "positioning", as their "strongest traits" could aid in the determination of what their brand or positioning statement should be.

In an embodiment where a brand or positioning statement is considered first, the process may be configured to perform a "sanity check", comparing the user's stated brand traits against which traits they have assigned to their stories. As an example, a user completing the brand exercise first may determine that "Sense of Humor" is a trait she would most like the decision-makers to know about her. However, if subsequent stories that she brainstorms are not associated with the "Sense of Humor" trait, then the process may be configured to advise the user to consider revising their brand or positioning statement to one that their stories better support. As another example, if a user considers "Sense of Humor" to be one of her top traits, but she later does not use any stories containing that trait in her essays or letters of recommendation, the process may be configured to recommend that she consider revising which stories she is choosing to write about. Similarly, if a user selects "Analytical skill" as a top brand trait, but some of the user's data points fall beneath certain value thresholds—for example if their (grade point average in math classes <3.5) and or (S.A.T. MATH score <=550), then the process may be configured to generate and send a message to the user to re-consider selection of this trait.

The "top" traits may be displayed in a variety of ways, including but not limited to a list, a list with different colors associated with each trait, icons associated with top traits, a graph showing the relative strengths of each trait, a "word cloud" displaying the top traits, a Venn diagram of the traits. Creating a visual way to discern different meta-data associated with each story, including but not limited to the brand traits, may be useful when the user begins to create outlines based upon these stories and their meta-data, as discussed further herein.

FIG. 11 illustrates an example of one embodiment of a graphical user interface that may be generated to display top or strongest brand traits. In FIG. 11, the user's stories 806 are organized by the brand traits that have been calculated to be their "top traits" 1102. In this particular embodiment, the stories 806 containing a top trait 1102 are organized into a plurality of different color-coded columns 1104. In this example, each color-coded column 1104 has a different top trait 1102 associated with it, and a different color for each top trait 1102. In this example, "Initiative" is displayed in blue, "Team Player" is displayed in orange. The stories 806 containing these top traits 1102 may be displayed with the associated color, thus matching the story's color with the color that has been assigned to the particular meta-data associated with the story such as top traits.

In the example of FIG. 11, the story "Ecuador Volunteer Trip" has the meta-data traits of "International" and "Compassionate" associated with it. Since "International" and "Compassionate" have been calculated as top traits, they are displayed in FIG. 11. Since "International" has been assigned the color yellow, and "Compassionate" has been assigned the color purple, in the example of FIG. 11 that story now appears with both yellow and purple colors. In the example of FIG. 11, it appears twice, with a different color each time. An alternative embodiment may display multiple colors or icons within one "nickname box", or may only display the story with the visual representation of its "primary" trait. Alternative visual formats may also be used.

In an embodiment, as a stand-alone step or combined with other steps, to the process comprises a sub-process for "mapping", or matching a user's stories to the various elements of an application. A user's application will be strengthened if they thoughtfully allocate information about themselves in an optimized way across the various application elements. Applicants are frequently unsure how to allocate their stories in an efficient and impactful way. Appropriate story allocation is considered to be one of the most useful services provided by Admissions Consultants, but presently known software-based systems cannot provide this service.

In this disclosure, a "mapping" sub-process may be configured to optimize how a user allocates various data-points about themselves throughout the elements of an application. As an example, an application to a graduate business program may require that a user submit an information sheet with brief descriptions of their jobs and activities; a résumé; a cover letter; responses to one or more essay questions; letter(s) of recommendation; an interview; and/or a video recording. The applicant determines which pieces of information should be "mapped" to individual sections of the application. This determination may be made with guidance provided by the system. One strategy may advise a user that their key stories should be emphasized, and yet repetition should be kept at a minimum. A major accomplishment cited in an essay may benefit from also being mentioned in a Letter of Recommendation. In another example, one story might be mapped to "Essay #2 of School X" but "Essay #1 of School Y", and another story or stories might be mapped to the resume, and yet another story, stories, or "brand traits", or other user data, might be mapped to the Letter of Recommendation.

In an embodiment, the sub-process for "mapping" may be configured to operate on any part of an application process that a user might need to prepare. In various embodiments, stories may be mapped, or any data associated with a user may be mapped. User information to be "mapped" may include any or all of the following: demographic information; factual information pertaining to job history, extra-curricular, and community involvement; the user's "brand traits" or "positioning statement; the user's "stories"; or the data and meta-data associated with each story. That is, any data, or combinations of data, about the user may be "mapped" to a portion of the application.

In an embodiment, the process is configured to display the various elements a user needs to complete in an application, either all at once or individually, as well as various data that the user has filled in about themselves, and provides an interactive way for the user to "map" or allocate their data points across the various elements. The visual representation of a map may comprise text and may be configured to facilitate structuring an applicant's thinking. This structure may be useful for the user to have in place before they begin to write, lest they discover near the end of the process that they have failed to mention something important, or have wasted an opportunity by repeating the same story twice. In an embodiment, the map method may comprise graphical interfaces, for example using "drag and drop" to move a piece of data into an application element.

In an embodiment, one type of "map" may represent all application elements together as a "macro", or high-level map. An example of a "macro" map may include: things that need to be filled out on the application data form, all of a school's essays, all of the requested letters of recommendation, the resume, or the interview. Another type of map may be provided for very specific application elements; that is, a "piece" of the broader application might get its own map. A user may have several maps.

In an embodiment, a generic "map" is presented that is not specifically tailored to an individual school, program, or job being applied to. Instead, the "generic map" may consist of the most common types of questions a user might encounter based upon the type of application. The benefit of such an embodiment is that a user can start to do the "groundwork" for building an application, even before they know which specific schools or jobs to which they are applying.

In an embodiment the maps may support the user matching their data to the application elements of a specific school. In an embodiment, the process is configured to provide an interactive interface where the user may allocate their "stories", data points, or "brand traits" across the various essay questions asked by a school.

FIG. 12 illustrates an example graphical user interface providing a map screen. In FIG. 12, essay questions 1202 for a school are displayed in association with links which when selected cause accessing a lesson relating to the question. Some schools may have overlapping essay questions, or may have unique essay questions. Also, some "essay questions" may not ask for essays at all but rather some sort of creative expression conveyed in an alternate way (for example a video, a collage, a presentation, a song). These questions may be stored in a database accessible to the server computer, or may be imported from a third-party data source. In an embodiment, the "lessons" accessible using links 1204 associated with questions 1202 may provide explanations and guidance on specific questions, for example, lessons that explain what a question is really asking, and/or providing advice on how to tackle this question.

In addition, questions 1202 also may indicate data or meta-data associated with the question. For example, this data may include a category or type of question that the essay question is. For example, a question that asks, "Talk about a time that you convinced a team to take a new direction" is a combination of a "Team-work" and "Persuasion" essay, and thus those traits, or advice to use stories that contain those traits, may be advised in association with questions 1202.

In an embodiment, the user's stories or pieces of evidence 806 are also displayed in the screen display of FIG. 12. Evidence 806 may or may not be grouped by any meta-data associated with the story, such as, for example, the top brand traits 1102 associated with them. In an embodiment, the same story may be displayed as associated with more than one brand trait, for example, when a user wants to emphasize different aspects of themselves via the same story. An alternate embodiment may display the stories according to only the primary trait the story exhibits. That is, there may be many different ways in which the stories 806 are displayed ion the display of FIG. 12.

The brand traits or other associated meta-data for a story may be conveyed in a variety of ways, for example words, colors, icons, or may not be conveyed explicitly at all. The benefit to making a visual distinction between stories is to provide the user with an "at a glance" view of how they are distributing their stories. As an example, in the version where each brand trait has its own color, a user may more quickly ascertain if their map is conveying an adequate distribution of traits by simply glancing at the screen and seeing how the colors are distributed. In an embodiment the process may be configured to guide the user on which stories to choose, or on ascertaining the strength of their story allocation. In an embodiment, all of the user's stories are displayed.

In an embodiment, a display of the stories 806 may comprise a "nickname" or another abbreviation for the story. In an embodiment, the process is configured to display all of the meta-data associated with a story when the user provides input indicating selection. The meta-data may include a more detailed description, the time period, the context, or the brand traits to help jog the user's memory as they craft their overall message.

FIG. 12 comprises a plurality of evidence maps 1206, 1208. Each map 1206, 1208 may include the optional concept of "primary" evidence 1210 and "supporting" evidence 1212. "Primary" stories may be the ones that will form part of the main narrative. "Supporting" stories may be those which would be mentioned in passing to strengthen the applicant's claims about themselves. The most common use of a supporting story is to demonstrate either 1) some sort of personal growth, perhaps over time or 2) reinforcement of a theme. A supporting story may have happened before, or after, one of the main primary stories. The user may be able to complete only one map 1206, 1208 per application element, or may be able to create additional maps, in order to compare two different strategies side-by-side.

In an embodiment the process is configured to break out "supporting" evidence into different time periods, such as "before" and "after" the main story or stories being told. For example, the process may be configured to enable the user to designate if the supporting story happened prior to, or following, the primary story. This may have relevance at a later step, since it may affect the way in which the user is instructed to write about the supporting story.

The user may allocate their stories 806 among the different essay questions 1202. In an embodiment, the stories 806 may be allocated to primary evidence 1210 or supporting evidence 1212 using a "drag and drop" mechanism. The primary evidence 1210 associated with a question 1202 is the story 806 that has now been dragged into the map 1206 under the "Primary" category 1210. Thus "mapped" primary stories are the stories at 1214. Similarly, mapped supporting stories are exemplified at 1216. In an embodiment, visual differentiation of stories is provided, for example different colors representing different traits may be used. A user may then, for example, see at a glance what overall narrative about themselves and their strengths is presented via the responses to the various essays.

In an embodiment, the process is configured to display for the user which stories might be best suited to answering a specific section of the application, such as a specific essay question. Continuing the example above, where an essay question has associated category data of "team-work" and "persuasion", the process may suggest to the user to use any stories that have been designated as demonstrating one or both of those traits. The rules engine of the server computer may implement logic that compares data associated with a story with data associated with an essay question to determine a "match". The stories' suggested suitability might be ranked; that is, certain data or traits may be weighted more heavily or given more hierarchical importance, such that some stories are designated by the process as being more suitable than others. The suggestion of which story or stories to use may be done in a variety of graphical interfaces, including but not limited to visually highlighting the recommended stories, displaying the recommended stories already within the map. FIG. 12 conveys the key elements of a "map", but the "map" itself may consist of additional elements, for example, an open text box where the user may enter notes.

In an embodiment the process may be configured to "warn" a user that certain stories are probably not a good match. As an example, a graduate business program may ask a user to write about a leadership example that occurred within the past three years. If the (current year=2013), then any stories with "year" meta-data from 2009 or before would not be suitable. Alternatively, if the user's (year of birth=1983) and a story has the time meta-data of (time-period="college"), then that story may not be suitable, since a 30-year old user probably attended college more than 3 years ago and therefore any story with that tag may not be suitable.

A similar advice or warning logic may be applied to maps that have already been completed. The process may analyze various pieces of data associated with the stories and/or with the specific application element to see if certain conditions are met: for example, is the same story used more than once as a "primary" story? If so, then a warning message may be displayed. In an embodiment that contains the brand traits exercise, are a good mix of the brand traits, or all of the "top" brand traits represented? If one brand trait is represented in, for example, >75% of the stories used, the user may be warned of providing a possibly lop-sided view of themselves. If applicable, do the stories represent a variety of time periods and/or contexts? If not, then a warning message may be displayed advising the user to incorporate more variety into their story or brand trait selection. In an alternate embodiment, the user may simply be told to consider what makes for an optimal mix of stories, and may change or re-allocate their stories manually.

In an embodiment the process is configured to consider the information that has already been entered by the user, for example, their "problem" background or the concerns that were displayed in step illustrated in FIG. 5. For example, if an applicant from the investment banking industry with no history of community service fails to include a story that demonstrates the trait of "Compassion", which was determined elsewhere as being a positive trait to emphasize, the process may prompt that user to use such a story. Conversely, positive or encouraging message may be provided as well. In an example, if a user has after one or more iterations of creating their map, has a map that has conveyed every major brand trait at least once, then a complimentary message may be displayed, and if not, then a warning message may be displayed. The positive and negative conditions cited above are merely examples and other variations may exist on different data points, different combinations or "rules engines" associated with those data points.

One embodiment comprises mapping a user's stories to different application elements, but any piece of data about the user may also be mapped. As an example, an alternative embodiment may be configured to cause the user to map which brand traits they would like to convey as an answer to a specific essay question, as shown in FIG. 14. FIG. 14 illustrates an example graphical screen display that may be generated to facilitate a user completing a map. In this embodiment, a brand "map" 1402 may comprise one or more brand traits 706; in an embodiment a list of the available traits 702 may be displayed and then the user would select which traits to map 706 to the essay questions 1202. The process may then prompt a user to brainstorm stories that specifically address this brand trait. In other words, the step of mapping may be done in an embodiment where the stories have not yet been brainstormed, or where the stories have been brainstormed but have not have "brand traits" associated with them. "Maps" may be created using any combination of stories, traits, data, or meta-data associated with the user. For example, if the user could like to let the Admissions Committee know that they have an older sibling who attended the same institution, this data piece may be mapped to an element of the application, such as a letter of recommendation, even though this data point is not a "trait" or "story" per se.

FIG. 15 illustrates an example graphical user interface for another embodiment of a process for completing a map. In this example, the process is configured to enable the user to select which brand trait(s) 702 to convey in response to an essay question 1202. The system would then only display stories 806 that contain the selected brand trait 702, and thus create the map 1203 that way. By narrowing down which stories are displayed, a user may find it easier to determine which stories to use.

FIG. 13 illustrates an example graphical user interface for another embodiment of a process for preparing a map for a letter of recommendation. While the end-user will probably not write their letter of recommendation, it can be extremely useful to provide suggested themes and stories to the recommender. This helps make the recommender's job easier, and also helps ensure that the recommendation letter contains appropriate content and supports the overall application strategy.

In an embodiment, the process is configured to enable the user to create a "map" 1310 for each of the recommenders. Information that may be "mapped" about a user may be displayed here; in this embodiment, stories 806 are displayed, and are divided into a first group 1302 of stories that have already been mapped to an essay or some other application element, and a second group 1304 of stories that have yet to be used in the application. An alternate embodiment may allow a user to "map" several application elements simultaneously on one screen, for example, creating a map for two or more recommendation writers simultaneously. This embodiment would have the advantage of allowing the user to compare potential recommenders side-by-side, which may assist the user in selecting their recommender.

While not illustrated here, these stories may also be displayed in the manner of FIG. 12 as primary stories 1214 that have been mapped or supporting stories 1216 that have been mapped elsewhere. This is because a strong letter of recommendation may be one that lends credence to a story that the user is referring to elsewhere. For example, if the user is going to write a college application essay about volunteering with foster children, there may be merit in having a teacher mention this project and the positive impact it had. Conversely, in a recommendation letter using a story that has not yet been used elsewhere, such as a story from the second group 1304, creates a strategic opportunity to convey more about the user via the letter of recommendation. For example, the user may have an interesting story that they would like the admissions committee to know about them, but that perhaps did not "fit" elsewhere, for example in an essay map.

In an embodiment, FIG. 13 is configured to enable the user to drag and drop an already-used story from the first group 1302 to a map 1310 for a particular recommender, at either location indicated at 1306. FIG. 13 also may comprise one or more written exercises for the user to complete. For example, many business schools specifically ask recommenders to write letters describing a time the applicant demonstrated strong ethical behavior. In an embodiment, FIG. 13 comprises one or more text boxes 1312 that are configured to receive text composed by the user as a suggestion to their letter writer of an example to cite in response to the question 1308. The text entered in boxes 1312 may be exported in response to user selection of an Export control 1314. As with other steps in the system, the data may be exported in a template document that the user may share with their recommendation letter writer. In an advanced embodiment, as with other maps, the system may recommend that certain stories are more suitable for inclusion in a letter of recommendation, depending upon the data or meta-data involved. In an alternate embodiment where the user is trying to decide which recommender to use out of several potential recommenders, the system may suggest which recommenders are the strongest, based upon the data or meta-data associated with the stories that an individual recommender may be able to corroborate. As a non-limiting example, this may be done to ensure that the recommenders portray an optimal balance of brand traits. In another non-limiting example, certain recommenders may be more suitable to use, based upon an analysis done of the stories a recommender may write about when compared to the stories that the user has mapped to other application elements, such as the essays. In an embodiment, an Add Recommender control 1316 is configured to open a dialog to permit adding another recommender for creating other maps 1310.

In an embodiment, while the example map of FIG. 12 does not show text boxes for a user to fill in, a "map" for other application elements may also contain them or other fields to be filled in, selected. The concept of using a "map" as a way to allocate data about the user to elements of the application can be conveyed in any number of formats, and should not be limited to the sample embodiments included here. For example, a map may be created using other visual media and formats, such as a chart, check boxes or a checklist, a graph, a table, a "see-saw" to connote "balance", etc. In an embodiment, while FIG. 13 illustrates a letter of recommendation map that is filled out by the user, in another embodiment may be sent directly to a third party, such as to the recommendation letter writer and the writer of the letter of recommendation may construct the map. Similarly, the maps in FIG. 12, FIG. 13 and/or the master maps described above may also be sent to someone else for input and guidance. For example, a user may wish to get feedback from parents, friends, family, or bosses on how to allocate their stories, which brand traits to convey, or which stories they should tell about themselves. This could involve a third party simply viewing the user's maps and providing feedback, or it may include an interface where the third party can create a map on behalf of a user.

In other embodiments, "maps" may also be provided for resumes, or preparation for interview questions. As an example, the "maps" for an interview may also provide a method where the user practices recording audio or video replies to possible interview questions. That is, the "map" to prepare for interviews may allow the user to allocate certain stories to common interview questions, and may also provide a place on the screen for the user to record themselves replying to the sample interview question. The value of this is that sometimes, one thinks that a specific answer to an interview question is a good one, but once one begins to hear oneself explaining the situation, one realizes that perhaps the example is not that strong after all. With this method, the user may record or play back their practice response to the interview question, and may perhaps realize that other stories should be mapped to that interview question instead.

In an embodiment, the process implemented using the server computer and rules engine implements one or more pre-writing exercises, which provide an interface that breaks out a major question into relevant "sub-questions". Each question that the user may encounter, such as an essay question, letter of recommendation, or interview question may have "sub-questions" stored in the database in association with the question. With this approach, a user can determine which key points and details they need to describe to adequately answer a question; it may also be helpful for users who may suffer from "writer's block", by providing them with "sub-questions" to start with. This provides a computerized way to guide a user through the writing process, thus using software to provide the sort of guidance usually provided by an Admissions Consultant.

FIG. 16 illustrates one embodiment of a graphical user interface that the process may generate to facilitate a pre-writing exercise. In an embodiment, FIG. 16 comprises a question 1202. The essay question 1202 may be one of several questions asked by a school. The sample question 1202 may be "Tell us about a time that you put knowledge into action." The sub-questions are then displayed in a primary evidence region 1604, and the user may enter responses using text boxes 1608, 1610, and may further comprise brief notes. In this example, sub-questions related to "Tell us about a time you put knowledge into action" may be: "Let's distill: what was the knowledge or skill in question?"; "Which specific actions did you take?" "Did you learn anything from this episode? How did you grow?" Sub-questions may be personalized for each user; for example users from different backgrounds or with different brand traits may be guided to focus on different details.

The screen display of FIG. 16 also may display the user's stories, for example, divided into primary evidence 1214 and supporting evidence 1216 that may have been mapped to that question in a prior step. The sub-questions may differ for "primary" story questions 1604 and "supporting" story questions 1606. The sub-questions might also differ by the meta-data associated with a story that the user is thinking of using in the question. As an example, if a user is considering using a story with the brand trait of "maturity" to answer the sample essay question above, the system may provide a related sub-question, such as "What do you feel was especially mature in how you handled the situation?"

Responses to the sub-questions in text boxes 1608, 1610 may be re-used across questions that are similar from school to school. That is, if the meta-data associated with a question or sub-question is similar from one school to another, for example, if the type of question is very similar from one school to another, then the process may generate one or more notifications or alerts so that the user does not need to repeat work. In an embodiment, data entered using FIG. 16 may be exported so that the user can continue to work with the data outside of the process, for example in a third-party word processing system, or provide access to third parties for feedback.

In an embodiment, the "pre-writing" exercises need not apply only to "written" exercises but may be used in other instances involving breaking down a question into its key elements. A variation of the "pre-writing" exercise may be configured to enable the user to record audio or video, for example, to allow a user to prepare for an interview. Similarly, one or more elements of the advice or guidance described herein may be conveyed to the end user in a variety of ways and through a variety of media, including but not limited to text, video, audio, images, or messages.

In an embodiment, the process is configured to assist a user in preparing rough drafts. FIG. 17 illustrates an example graphical user interface that may be used to facilitate writing a rough draft. In this step, what the user wrote in the pre-writing exercises and entered in text boxes 1608, 1610, or a combination of what they wrote and other text, and associated with their stories to answer the question, may be displayed in association with text box 1702 in which the user can enter text for a rough draft of the essays. To help the user remember the topic of the draft, other information may be available in the screen display of FIG. 17, such as the text of the essay question 1202, the primary evidence 1214 that has been mapped to this question, and the supporting evidence 1216 mapped to this section. In an embodiment, the process is configured to request the user to keep the pre-writing exercises open in one screen while they begin writing their rough draft in another window, for example, using a separate word processing program. In an embodiment, the data entered in the screen display of FIG. 17 can be exported so that the user can continue to work with them outside of the process, for example in a third-party word processing system, or provide access to third parties for feedback.

Referring again to FIG. 2, in an embodiment, the process may implement a draft revision tool 242 that is configured to allow the user to receive feedback and editing guidance from others in an ethical way. In an embodiment, draft revision tool 242 is configured to enable receiving useful feedback in a way that does not permit another person to rewrite the essay, which may be an ethical violation. The draft revision tool 242 may be useful for teachers who want to help their students improve their writing in a way that helps the student learn to write for himself or herself.

In one embodiment, a person other than the user, such as a parent, guidance counselor, teacher, or peer receives login credentials for the server computer and logs into the server computer to access processes to read over a user's draft response. Should that outside user spot some corrections to be made, or changes that they would recommend, they may highlight the part(s) of the essay that they would like to comment on. The outside user may then either describe or select which type of error they have spotted from a list of possible errors or weaknesses (for example "Grammar: lack of parallel structure"; "Style: passive voice"; "Run-on sentence"; etc.). The process also may be configured to generate a text box in which the outside user may enter comments (for example "Try to explain this part more clearly", "Watch your verb tense here", "Be careful to not sound whiny here".).

In this way, the user may receive useful feedback from others, but in a way that avoids the other person writing or re-writing the essay for them. In one embodiment, the process is configured to permit several outside users to comment on one draft, such that the user may see feedback from various people in one place. In an embodiment, different colors are associated with each of the major error types (for example types of grammatical errors; style errors, etc.), so that the user may easily see and classify the feedback that has been provided. The user may see additional details relating to the feedback by selecting the highlighted portion of the text, or in having the feedback summarized elsewhere on the page. In an embodiment, the techniques described herein for FIG. 17 may be used in other processes, systems or applications in any context in which one person is correcting another person's writing.

Embodiments of the processes of FIG. 1, FIG. 2 and the other techniques herein may be adapted and used in other contexts, for example, for a job applicant. In an embodiment, the process may be configured to enable a job seeker to brainstorm examples from their previous experience, optionally provide data indicating which strengths each story may demonstrate, and then "map" those stories to various parts of a job application. Job postings will frequently list out the types of experiences and attributes the ideal candidate possesses. A job applicant may wish to write a cover letter or resume that specifically addresses what the employer is seeking, and a job-seeker may tailor the cover letter and resume for each job applied to.

As an example, a job posting for a product manager for a multi-national firm may request certain types of experience such as "product development", "wire-framing" and "customer development", as well as certain personality traits such as "team-player", "multi-tasking", "detail-oriented", and "creative". In an embodiment, the process is configured to lead the job seeker through the steps previously described to "brainstorm" their prior experiences and "map" their examples to what the job posting is asking for. As with FIG. 12, there may be primary maps and supporting maps. In an embodiment, the user may use a variation of the "pre-writing" exercise to create detailed descriptions of their previous experience, which could then be used for a cover letter or to prepare as a response to an interview question. In an embodiment, the user may drag and drop their examples into a map that is a template for a cover letter. Depending upon the purpose for the "maps", different lessons may be available with specific advice pertaining to cover letters, or resumes. In an embodiment, the job applicant may type in traits that are desired from the job posting. A preferred embodiment may automatically extract the key words and phrases of a job posting and display them. An embodiment could then display for the user all of their "stories" that have been tagged with the brand-trait or other meta-data that matches what is being requested in the job description. An embodiment could also utilize a "problems" or "strengths" analysis, for example pointing out to a user that "This job description asks for five years of experience in product management, and you only have three. Here are some ways to address this gap:" and then provide advice for mitigating weaknesses or emphasizing strengths.

Another embodiment may be used in other contexts where someone is trying to write something that contains a variety of points to be addressed, such as a press release being written about a new product. The new product's attributes may be mapped by members of the marketing or public relations team to different marketing media, such as press releases or web pages. An embodiment could provide proactive advice about which examples to use, how to structure the press release/publicity campaign, etc. In an embodiment, it could check to see that all of the top attributes of the new product are indeed addressed in the press release, or it could suggest a series of corporate blog posts, each one focusing on a different brand attribute of the product. Much like the system aims to guide a user and keep them "on message" for college essays, the same fundamental principles could be applied here.

Another embodiment may be used by someone trying to write a strong description of themselves for an online service, such as a professional network or even an online dating service; for example, an embodiment may be configured to help the user identify their most appealing personality traits and then "map" those traits to different parts of their online profile. In an embodiment, a user could solicit feedback from third parties, such a friends, on their best personality traits. An embodiment could lead users through a series of brainstorming, trait-assignment, and mapping exercises to help them determine how to best portray themselves online. As an example, a user writing an online dating profile could solicit feedback from friends on their top personality traits. The brainstorming exercises described above could be modified to also include prompts about previous dating or relationship situations (example "What have been the best dates you've ever been on?"; "Fill in the blank: My friends always turn to me for _____"); "Do you have any 'weaknesses' in your profile you're worried about? Maybe joking about them could be an endearing strength!"), as well as personal interests or interesting anecdotes. An embodiment could analyze another poster's posting for certain keywords, and analyze how the user's stories and brand traits compare—utilizing the "rules engine" described above in a different context. For example, "This other user mentions that 'Sense of Humor' is the most important thing they are looking for. 'Sense of Humor' is one of your top brand traits, and is used in the following five stories, so you may wish to 1) reach out to this user, since you have one of the things they're looking for and 2) use of one these stories in your first message to them."

Referring again to FIG. 2, certain embodiments, for example, for an MBA candidate or job seeker, may also contain a "career vision exercise" 222. To gain acceptance to a graduate program or job, it can be helpful to show how it will fit the applicant's broader career goals. The career vision exercise, in an embodiment, may be a series of brainstorming exercises to induce the user to think about where they want to be in several years' time. Other embodiments may tailor this advice based upon the user's professional history, which may have been entered at block 216.

In an embodiment, the career vision exercise 222 may implement a "gap" analysis, where the user is encouraged to look at their previous background, and then their future intended career goals, and identify "gaps" in skills they may still need. A more advanced embodiment of this could analyze data about the user and compare it against the intended career goal. As an example, if a user has the (current job title="Product Manager") and or skills such as "Product Development" and "Managing Timelines", the rules engine may analyze which skills, experiences, or attributes, the user is missing in order to be qualified for their proposed career goal of "Chief Technology Officer". Another embodiment may comprise the display of several benefits that one may gain from attending an MBA program, and prompting the user to select a few key benefits to write about in the near ubiquitous "Why do you want an MBA?" essay or interview question.

The career vision exercise 222 may also provide a user with a "sanity check" statement, in which the proposed career goals, previous experiences, and other information is presented in the form of a sentence so that the user can check if their intended goals make sense. In an embodiment, career vision exercise 222 may provide a "sanity check" for other elements. For example, if a user's current data points include (industry="Investment Banking"), (community service="limited"), but the user's intended future post-MBA industry is (industry="non-profit"), the process may be configured to provide a warning to the user that their proposed career goal may not flow logically from their previous experience, and that they should either re-consider their stated career goal, or they should follow some guidance then provided by the process on how to create a convincing argument for this career change via their "Career goals or Why do you want an MBA?" essay.

In an embodiment, the process provides a calendar service to provide reminders and progress tracking for a user as an application is in process. Unlike prior approaches, the process herein adapts to the amount of time that each individual user has available. Unlike "time-lines", "check-lists", "calendars" and "messaging systems" that aim to provide applicants with advice related to which tasks need to be completed, but do so in a static, uniform way for all users, the approach herein modifies and adapts its guidance based upon the amount of time that a student has available. As an example, some students may not have 12 weeks left until a college deadline; others, on the other hand, may have several months left. In an embodiment, the process may provide a dynamic calendar that tailors the timing of its recommendations for each specific user, based upon several calculations related to the user.

FIG. 3 illustrates an example embodiment of a calendar process. The process starts at block 302, which may involve a sign-up process for users. In an embodiment, for the calendar to be useful, a value for at least one "deadline date" is received. In an embodiment, at block 304 the process is configured to request the user to specify which programs they are applying to, and a deadline date may be obtained automatically from external data relating to the programs or from user input. If the user does not yet know which program is the subject of an application, a "generic" deadline may be used, since many schools have deadlines roughly around the same time, for example early January, or the user can simply enter in "January 1" as a target date by which to complete application tasks.

The process also may be configured to request the user to provide additional information, such as which "round" the user is applying in, as some schools accept applications during different "rounds", or if the user still has to take a major test between the sign up date and the deadlines. In an embodiment, the process is configured to use the additional information in the calculations for the calendar. In various embodiments, not all of this information may be requested, or additional information may be requested, or the information may not be asked at block 304 but rather throughout the calendar process.

If the user's requested schools are already in the database, as tested at block 306, the process is configured to query data about the schools and associated deadlines in the database at block 310. If the school is not in the database, then at block 308 the user can input a school directly or alert an administrator that a school is missing, and the administrator can manually enter in the date. Alternatively, the deadline dates may be imported from a third-party data source, for example from "The Common Application" system.

In an embodiment, at block 312 the calendar process may request the user if they have already completed certain tasks. Block 312 may be optional; that is, all users may be given the same default task list. In this embodiment, if at block 312 the user has already completed certain application tasks, such as "Identify your Recommendation Letter writers", then at block 314 the user can indicate which tasks have already been completed. If the user has yet to complete any tasks, they will be presented with a default task list at block 316.

At block 318, the process is configured to perform a series of calculations relating to dates and tasks. In an embodiment, the process is configured to dynamically determine the amount of time a user should spend on certain application tasks. That is, the process of FIG. 3 or other logic in the server computer is configured to calculate when certain tasks should be completed, depending upon how much time the user has available.

At block 318, the process is configured to add up all of the tasks a user needs to complete. As described further herein, each task is given either an absolute amount of time or a relative weighting. As an example, the weighting may be a percentage, or the absolute amount of time allocated to the task may be "four hours" or "one day". At a later step, the system will determine how much time a user has remaining, and will then divide out that time amongst the tasks, according to their relative weighting.

In an embodiment, at block 320 the process may be configured to request the user to specify if they need to include any "buffers" of time in their calendar. A "buffer" is time that will not be included in the task calendar; that is, that time or those days will be "blocked out" from the calendar and its calculations. As an example, a student may want a "buffer" of time of a few days for a planned vacation; or perhaps for a school trip to a competition; or if the user has a major exam coming up, such as the S.A.T., the user may want to "block out" a week or two prior to the test to only focus on studying for the test and not have other application tasks assigned during that time. As a result, the process acquires a more accurate view of how much time the user actually has available.

In an embodiment, data indicating "buffers" or "blocked time" may be provided if the user does not wish to work on their application on Sundays. Alternatively, the process may be configured to query the user about how much time they have available to devote to this process. The amount of time remaining may be requested in any unit of time, for example months, weeks, days, hours. As an example, a management consultant applying to business school may only have a few hours per week to devote to the application while they finish a major project at work, but then they may have a few weeks of "break" afterwards, during which they would have significantly more time available. As a result, the process acquires data to provide a realistic timeline to users that fits their actual schedules, as opposed to providing vague instructions or not accounting for their real-life time constraints.

At block 324, the process is configured to determine the "Remaining Time Available" to the user. In an embodiment, the remaining time available is calculated by determining a difference between the user's sign up date and the user's earliest approaching deadline, also accounting for any "blocked out" time as calculated at 322. That is, if some time is "blocked out", then the amount of Remaining Time will be decreased accordingly. For example, if a user begins their calendar six weeks before a school's deadline, but the user needs to "block out" one week to account for an upcoming science fair project, the "Remaining Time Available" is (6−1)=5 weeks, and no application tasks will be scheduled during the week that the user has blocked out; instead, all tasks that the user needs to complete are allocated only within the five weeks the user has available.

The approaching deadline(s) can be entered by the user, or can be obtained using queries to a database of records of schools' deadlines. Applicable deadlines may include the official deadline date, that is, the specific date designated by the college or school for when the application must be submitted. The system may also have a "Recommended Deadline Date", which may occur prior to the official deadline date. Using a recommended deadline date is useful to prevent a user from submitting on a day when the school's computers are overloaded, which may occur when numerous applications are submitted on the deadline date. Alternatively, the user may manually alter the recommended deadline date to account for their own personal schedules, for example a vacation. If the "Recommended Deadline Date" occurs before the official deadline date, the "Remaining Time Available" will be shortened accordingly.

At block 326, the "Remaining Time Available" is allocated among the tasks a user needs to complete. Each item in the task list may have an absolute amount of time, or a relative weighting. A task with an "absolute" amount of time is one that stays the same, regardless of the amount of Remaining Time Available. As an example, an "absolute" task may be something fixed, such as the date to take a standardized test. Alternatively, the process may be configured to estimate that a task such as "Filling out the application form" always requires at least two hours. In that case, whether a user signs up months in advance, or only a few days in advance, the user will need two hours to fill in the application forms, and this task is reflected in the calendar with a two-hour time segment. In an embodiment, a "relative" task is one in which the amount of time allocated to the task varies based upon the amount of Remaining Time Available.

In an embodiment, the calendar process determines how much time should be allocated to each step, by calculating: the total number of tasks a user needs to complete; the amount of time the user has available; how many absolute tasks need to be completed, and how much time is associated with each absolute task; how many relative tasks need to be completed, and the associated amount of time to be allocated to each relative task (determined, for example, by [total number of hours available] *[n %], where n % is the relative amount of time to be dedicated to completing task "n").

As an example, an "easy" task, such as "Setting up a time to meet with your recommender", may be designated in the database as requiring less time than another task, for example "Write the rough draft of your essay". The "relative time" to complete each task may be determined using a weighting system, or using a percentage. As an example, "Develop your Brand Statement" may be allocated 5% of the Remaining Time Available; "Brainstorm your Stories" may be 10%; and "Write your rough drafts" may be assigned 30% of the Remaining Time Available. In the case where a specific user has already completed a task, the weights will be recalculated proportional to their original weighting. As an example, if a user has already completed a task that was expected to take up 10% of the Remaining Time Available, then the other tasks will be re-weighted accordingly. Continuing this example, a task that previously was going to be allocated 4% of the time would now be re-weighted to account for (4%/90%)=4.44% of the time.

The process may be configured to generate a user interface that is configured to receive values for default times from a system administrator for storing in the database. In an embodiment, the process may dynamically update calendar data based upon user feedback. For example, if the initial hypothesis of the system administrator is that the task "Write your rough drafts" should take 30% of a user's time, but most users mark this task as complete after 27% of their time is used, the values in the database may be updated to reflect actual time usage by users.

In an embodiment, the amount of time allocated for a task may be tailored to an individual user. The modified allocation may be made by the user or by a third-party such as a guidance counselor. As an example, the process may be configured to provide a default of two weeks' of "blocked out" time for preparation for a standardized test, but if a student is a poor test-taker, this time allocation may be manually changed for the specific user to four weeks. Another embodiment may integrate with data about the user from a third-party data system, for example, a test-preparation program. In this embodiment, the process may re-allocate the amount of time assigned to a user to prepare for a test, depending upon the user's progress in the third-party program.

In an embodiment, certain tasks may be "generic", or may be specific to the program that is the subject of the application. That is, a user may need to complete an additional task if they are applying to a specific school. As an example, applicants to Yale Law School are required to write a 250-word essay that other schools do not require. In this example, this additional task may be added to the task list for all users of the system applying to Yale Law School. If a user has several schools' deadlines close together, say, with a few weeks of each other, the school-specific tasks may be "time shifted" or staggered out to account for some schools having slightly later deadlines. Conversely, for a user who does not yet know to which schools they will be applying, the process may provide a "generic" timeline, since many schools have their deadline dates at approximately the same time and often have similar required application elements. APPENDIX 1 provides an example of date calculations that may be implemented in an embodiment.

The user may alter the calendar by manually changing time allocations or recommended deadlines at block 332. If the user completes a task "early" or "late", the process may recalculate the time allocated to the remaining tasks with the updated Remaining Time Available. That is, if a certain task is estimated by the process as requiring five days to complete, but the user completes it in three, then the Remaining Time Available changes, and the remaining tasks are re-allocated among the updated Remaining Time Available.

New tasks may be added to the calendar at block 334, by the user or by another party such as a guidance counselor. These tasks may either have a fixed or a relative amount of time. Some of these tasks may fall into certain task categories, for example "informational interview", "school fair", "admissions interview".

Any changes to the calendar that affect either the tasks to be completed, or the Time Remaining, may cause the process to update or recalculate the calendar at block 338. Block 340 represents a callback, return, termination or other end for the process.

At block 328, the process displays the calendar to the user. In various embodiments, the calendar is displayed as a grid, as a "to do" list, as a Gantt chart, or exported and displayed using external calendar programs or software. In an embodiment, the process is configured to provide one or more filters with which the user may filter the display to only see certain types of tasks, for example, only tasks pertaining to a certain school. If the calendar is updated at block 338, then the display is updated at block 328.

In an embodiment, the process is configured at block 330 to send the user one or more messages 330 related to the calendar, such as reminders or alerts. These messages may be sent using any suitable digital electronic communications medium, for example e-mail, social media message, or text message. As an example, the messages may be related to an upcoming deadline, or if a task is not marked as "complete" by the date it was "supposed" to be completed. The calendar may also send a warning message if, for example, the user is trying to apply to too many schools in too little time, or if the number of days or hours that a user has entered as being available will not be sufficient to complete the tasks.

That is, certain tasks may have a "minimum" floor of time required. For example, writing the rough drafts may be allocated 20% of the time available, subject to a minimum of 20 hours of work. If a user had indicated that they only have 80 hours of Remaining Time Available to work on the application, then 20% of 80 hours equals 16 hours, and the system may display a message warning the user. The information in the calendar may also be displayed to third parties, such as guidance counselors, teachers, or parents. In some embodiments, an administrative user for an enterprise that owns or operates the server computer and thus controls the process may update the relative times, the tasks, or the messages that the process uses. In another embodiment, a third party such as a drama coach can change information in the calendar, for example, to account for an upcoming play rehearsal. The calendar's calculations and subsequent recommendations may also be displayed in any one of several visual formats, for example a checklist, a grid, a table, a bar chart, a pie graph of the percentage of tasks completed, etc. If the calendar is updated at block 338, then the timing for scheduled messages 330 may be updated also.

For user-created calendar items that fall under certain categories, the process may be configured to populate automated related tasks that will help the user. FIG. 4 illustrates an example calendar process for a user-added task. At block 336, the process starts when the user creates a new task. At block 404, the process is configured to receive relevant information about the task, such as the date(s) in or over which the task will occur, a name for the task, a description for the task, which category the task belongs to if applicable, a color or icon for the task if applicable.

At block 406, the process tests whether the user has requested a reminder, for example to be sent a reminder to complete the task the day before the task's due date. If the user requests a reminder, the reminder is scheduled into the calendar at block 408.

In an embodiment, certain tasks may be associated with certain "task categories". As an example, a user-designated task may be in the category of "Admissions Interview". Certain task categories may have reminder messages automatically associated with them at block 410. These related tasks may occur before or after the user-created calendar item. To continue the previous example, if the user creates a task in the category "Admissions Interview" at block 404 to occur on October 12, then at block 412 the process automatically may schedule the following additional tasks: "Do at least one mock interview" on October 5; "Review your Interview Map to prepare which stories you'll discuss if you're asked certain questions" on October 9; "Compile a list of questions to ask the interviewer" on October 10; "Go to bed early and get a good night's sleep. The best preparation at this point is to be relaxed and well-rested!" on October 11; "Send the interviewer a thank-you note that mentions one positive thing you learned from speaking with them" on October 13.

Additionally, certain tasks may require adding a buffer of time to the calendar. At block 414, the process may analyze the user-added task to determine if the task falls in a category requiring time to be blocked out. If the test of block 414 is true then at block 416 this buffer of time will be added to the calendar by subtracting from the remaining time available and the calendar re-calculates at block 418. If the new task does not require a buffer of time to be added, then the task and associated reminders are added to the calendar data at block 420. Any changes to the calendar are incorporated into the database at block 338.

In an embodiment, information entered in the database using the processes described herein may be viewable by an individual who has specified permissions. For example, a school's guidance counselor may be able to see everything that has been entered by his students. This individual may also set up alerts, that is, to be sent a message if one particular student falls far behind. An admissions consultant may even use this system to lighten her workload. In some embodiments, the process may be implemented with user interfaces that are customized for different school systems or companies such as "feeder firms" to business schools that offer admissions advice to employees. The process may be adapted for employees of a specific firm or clients of an admissions consultant. That is, the system may be "white labeled" such that other parties could incorporate their own content, their own version of the "rules engine", their own time-allocation for tasks, etc. and therefore customize it however they see fit.

In an embodiment, the rules engines of the server computer may self-update. The system may analyze admissions outcomes over the user base, and make adjustments accordingly. As an example, if the process is configured with a rule that a (G.P.A.<3.5)+(Major="Physics")+(GMAT score >750) is not a reason for concern, but then users with those statistics are routinely being denied admission, then the process may self-update the rules in the rules engine. As another example, if "Compassion" is thought to be a key brand trait to display to School X, but users focusing their stories on that trait are not being admitted, whereas users submitting applications that highlight the trait "Leadership" are being admitted, then the advice provided may be changed. As an example, if the original amount of time allocated in the calendar to a certain task is 10% of the Time Available, but most users end up not completing that task in time, then the time allocation may automatically update based upon actual user behavior.

FIG. 18 illustrates a networked computer system with which embodiments may be implemented. In an embodiment, a user can access the system using any computing device such as a computer 1802, a mobile phone 1804, or a tablet 1806. In one embodiment, the computing devices may be connected to an internetwork such as internet 1808.

In an embodiment, the computer system comprises one or more databases 1812 that store school data, the advice or guidance, and the user's work. A "rules engine" 1810 may be coupled to network 1808 and database 1812 and is configured to analyze data related to a user to ascertain if or which personalized advice to return to the user, in the manner described further herein. In an embodiment, example logic and rules are in APPENDIX 2. In an embodiment, the "rules engine" 1810 also implements logic for calculations for the user's personalized calendar, and an alternate embodiment may implement the calendar in a separate rules engine, or as a stand-alone system. The database 1812 also may be connected via a network 1814 to one or more external data sources 1816, such as a Student Information System, the Common Application, or test-preparation software.

Network 1814 and network 1808 may comprise a single network. Further, in an embodiment one or more of networks 1808, 1814 may comprise local area networks or wide area networks of school, institution or enterprise; for example, the processes herein may be implemented in local computers of a high school so that data does not use the public Internet.

Figure 19:
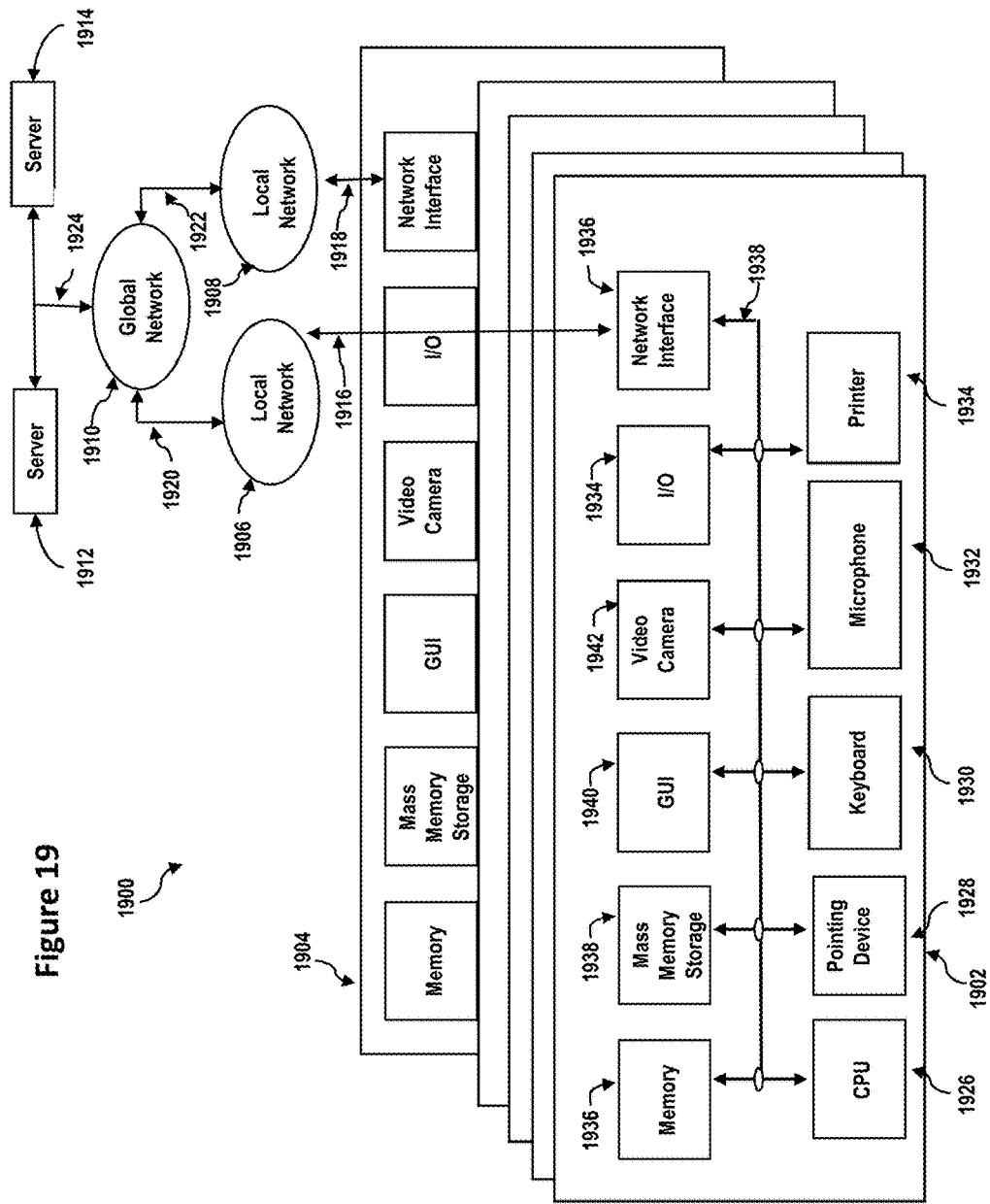
FIG. 19 is a block diagram depicting an example client/server system which may be used by an example web-enabled/networked embodiment.

FIG. 19 is a block diagram depicting an example client/server system which may be used by an example web-enabled/networked embodiment.

A communication system 1900 includes a multiplicity of clients with a sampling of clients denoted as a client 1902 and a client 1904, a multiplicity of local networks with a sampling of networks denoted as a local network 1906 and a local network 1908, a global network 1910 and a multiplicity of servers with a sampling of servers denoted as a server 1912 and a server 1914.

Client 1902 may communicate bi-directionally with local network 1906 via a communication channel 1916. Client 1904 may communicate bi-directionally with local network 1908 via a communication channel 1918. Local network 1906 may communicate bi-directionally with global network 1910 via a communication channel 1920. Local network 1908 may communicate bi-directionally with global network 1910 via a communication channel 1922. Global network 1910 may communicate bi-directionally with server 1912 and server 1914 via a communication channel 1924. Server 1912 and server 1914 may communicate bi-directionally with each other via communication channel 1924. Furthermore, clients 1902, 1904, local networks 1906, 1908, global network 1910 and servers 1912, 1914 may each communicate bi-directionally with each other.

In one embodiment, global network 1910 may operate as the Internet. It will be understood by those skilled in the art that communication system 1900 may take many different forms. Non-limiting examples of forms for communication system 1900 include local area networks (LANs), wide area networks (WANs), wired telephone networks, wireless networks, or any other network supporting data communication between respective entities.

Clients 1902 and 1904 may take many different forms. Non-limiting examples of clients 1902 and 1904 include personal computers, personal digital assistants (PDAs), cellular phones and smartphones.

Client 1902 includes a CPU 1926, a pointing device 1928, a keyboard 1930, a microphone 1932, a printer 1934, a memory 1936, a mass memory storage 1938, a GUI 1940, a video camera 1942, an input/output interface 1944 and a network interface 1946.

CPU 1926, pointing device 1928, keyboard 1930, microphone 1932, printer 1934, memory 1936, mass memory storage 1938, GUI 1940, video camera 1942, input/output interface 1944 and network interface 1946 may communicate in a unidirectional manner or a bi-directional manner with each other via a communication channel 1948. Communication channel 1948 may be configured as a single communication channel or a multiplicity of communication channels.

CPU 1926 may be comprised of a single processor or multiple processors. CPU 1926 may be of various types including micro-controllers (for example, with embedded RAM/ROM) and microprocessors such as programmable devices (for example, RISC or SISC based, or CPLDs and FPGAs) and devices not capable of being programmed such as gate array ASICs (Application Specific Integrated Circuits) or general purpose microprocessors.

As is well known in the art, memory 1936 is used typically to transfer data and instructions to CPU 1926 in a bi-directional manner. Memory 1936, as discussed previously, may include any suitable computer-readable media, intended for data storage, such as those described above excluding any wired or wireless transmissions unless specifically noted. Mass memory storage 1938 may also be coupled bi-directionally to CPU 1926 and provides additional data storage capacity and may include any of the computer-readable media described above. Mass memory storage 1938 may be used to store programs, data and the like and is typically a secondary storage medium such as a hard disk. It will be appreciated that the information retained within mass memory storage 1938, may, in appropriate cases, be incorporated in standard fashion as part of memory 1936 as virtual memory.

CPU 1926 may be coupled to GUI 1940. GUI 1940 enables a user to view the operation of computer operating system and software. CPU 1926 may be coupled to pointing device 1928. Non-limiting examples of pointing device 1928 include computer mouse, trackball and touchpad. Pointing device 1928 enables a user with the capability to maneuver a computer cursor about the viewing area of GUI 1940 and select areas or features in the viewing area of GUI 1940. CPU 1926 may be coupled to keyboard 1930. Keyboard 1930 enables a user with the capability to input alphanumeric textual information to CPU 1926. CPU 1926 may be coupled to microphone 1932. Microphone 1932 enables audio produced by a user to be recorded, processed and communicated by CPU 1926. CPU 1926 may be connected to printer 1934. Printer 1934 enables a user with the capability to print information to a sheet of paper. CPU 1926 may be connected to video camera 1942. Video camera 1942 enables video produced or captured by user to be recorded, processed and communicated by CPU 1926.

CPU 1926 may also be coupled to input/output interface 1944 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, C P U 1926 optionally may be coupled to network interface 1946 which enables communication with an external device such as a database or a computer or telecommunications or internet network using an external connection shown generally as communication channel 1916, which may be implemented as a hardwired or wireless communications link using suitable conventional technologies. With such a connection, CPU 1926 might receive information from the network, or might output information to a network in the course of performing the method steps described in the teachings of the present invention.

Figure 20:
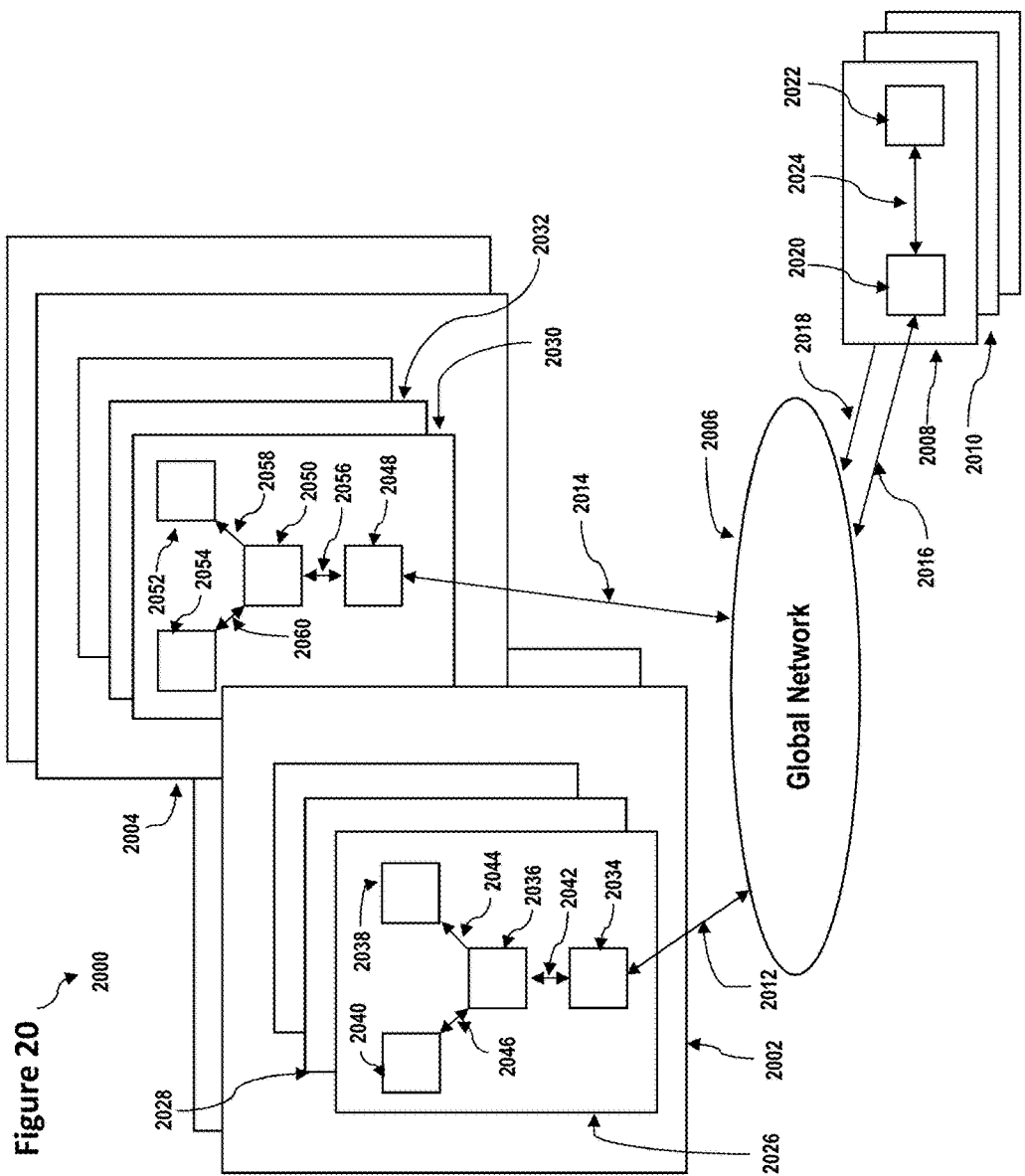
FIG. 20 illustrates a block diagram depicting an example client/server communication system.

FIG. 20 illustrates a block diagram depicting an example client/server communication system.

A communication system 2000 includes a multiplicity of networked regions with a sampling of regions denoted as a network region 2002 and a network region 2004, a global network 2006 and a multiplicity of servers with a sampling of servers denoted as a server device 2008 and a server device 2010.

Network region 2002 and network region 2004 may operate to represent a network contained within a geographical area or region. Non-limiting examples of representations for the geographical areas for the networked regions may include postal zip codes, telephone area codes, states, counties, cities and countries. Elements within network region 2002 and 2004 may operate to communicate with external elements within other networked regions or within elements contained within the same network region.

In some implementations, global network 2006 may operate as the Internet. It will be understood by those skilled in the art that communication system 2000 may take many different forms. Non-limiting examples of forms for communication system 2000 include local area networks (LANs), wide area networks (WANs), wired telephone networks, cellular telephone networks or any other network supporting data communication between respective entities via hardwired or wireless communication networks. Global network 2006 may operate to transfer information between the various networked elements.

Server device 2008 and server device 2010 may operate to execute software instructions, store information, support database operations and communicate with other networked elements. Non-limiting examples of software and scripting languages which may be executed on server device 2008 and server device 2010 include C, C++, C#, Java, Ruby, Ruby on Rails, AJAX, and JavaScript.

Network region 2002 may operate to communicate bi-directionally with global network 2006 via a communication channel 2012. Network region 2004 may operate to communicate bi-directionally with global network 2006 via a communication channel 2014. Server device 2008 may operate to communicate bi-directionally with global network 2006 via a communication channel 2016. Server device 2010 may operate to communicate bi-directionally with global network 2006 via a communication channel 2018. Network region 2002 and 2004, global network 2006 and server devices 2008 and 2010 may operate to communicate with each other and with every other networked device located within communication system 2000.

Server device 2008 includes a networking device 2020 and a server 2022. Networking device 2020 may operate to communicate bi-directionally with global network 2006 via communication channel 2016 and with server 2022 via a communication channel 2024. Server 2022 may operate to execute software instructions and store information.

Network region 2002 includes a multiplicity of clients with a sampling denoted as a client 2026 and a client 2028. Client 2026 includes a networking device 2034, a processor 2036, a GUI 2038 and an interface device 2040. Non-limiting examples of devices for GUI 2038 include monitors, televisions, cellular telephones, smartphones and PDAs (Personal Digital Assistants). Non-limiting examples of interface device 2040 include pointing device, mouse, trackball, scanner and printer. Networking device 2034 may communicate bi-directionally with global network 2006 via communication channel 2012 and with processor 2036 via a communication channel 2042. GUI 2038 may receive information from processor 2036 via a communication channel 2044 for presentation to a user for viewing. Interface device 2040 may operate to send control information to processor 2036 and to receive information from processor 2036 via a communication channel 2046. Network region 2004 includes a multiplicity of clients with a sampling denoted as a client 2030 and a client 2032. Client 2030 includes a networking device 2048, a processor 2050, a GUI 2052 and an interface device 2054. Non-limiting examples of devices for GUI 2038 include monitors, televisions, cellular telephones, smartphones and PDAs (Personal Digital Assistants). Non-limiting examples of interface device 2040 include pointing devices, mousse, trackballs, scanners and printers. Networking device 2048 may communicate bi-directionally with global network 2006 via communication channel 2014 and with processor 2050 via a communication channel 2056. GUI 2052 may receive information from processor 2050 via a communication channel 2058 for presentation to a user for viewing. Interface device 2054 may operate to send control information to processor 2050 and to receive information from processor 2050 via a communication channel 2060.

For example, consider the case where a user interfacing with client 2026 may want to execute a networked application. A user may enter the IP (Internet Protocol) address for the networked application using interface device 2040. The IP address information may be communicated to processor 2036 via communication channel 2046. Processor 2036 may then communicate the IP address information to networking device 2034 via communication channel 2042. Networking device 2034 may then communicate the IP address information to global network 2006 via communication channel 2012. Global network 2006 may then communicate the IP address information to networking device 2020 of server device 2008 via communication channel 2016. Networking device 2020 may then communicate the IP address information to server 2022 via communication channel 2024. Server 2022 may receive the IP address information and after processing the IP address information may communicate return information to networking device 2020 via communication channel 2024. Networking device 2020 may communicate the return information to global network 2006 via communication channel 2016. Global network 2006 may communicate the return information to networking device 2034 via communication channel 2012. Networking device 2034 may communicate the return information to processor 2036 via communication channel 2042. Processor 2046 may communicate the return information to GUI 2038 via communication channel 2044. User may then view the return information on GUI 2038.

Interview Preparation Module

FIG. 21 illustrates a sample process for a user to prepare for interviews which may be one of the qualitative elements of the application that they need to prepare. Many schools, jobs, etc. require one or more interviews before a candidate is chosen, and it is beneficial for them to prepare some answers they may give to various interview questions. The interview module could be a stand-alone service, or could be incorporated as a step within the broader method.

In the case where the module is offered as a stand-alone module, it executes the following steps: at 2102 a user will need to first generate "stories" (as in FIG. 8) that could be used as answers to potential interview questions. Once again, a user may brainstorm any possible information they feel might be relevant to share, e.g. fun trivia, previous experiences, a list of strengths and weaknesses, etc.—that is, the "stories" brainstormed do not necessarily have to be actual "stories" per se; rather this could refer to any piece of information a candidate would like to convey.

As described elsewhere, the user may begin with brainstorming "stories" first, or may begin with brainstorming their "brand traits" or "brand positioning statement" first, or may first brainstorm "stories" at 2102 and then proceed to assign brand traits to those stories at 2104, or vice-versa. The spirit of steps 2102 and 2104 is that the user first thinks of potential fodder to use as responses to interview questions.

In the event that the interview preparation is happening as part of the broader process, it's possible that steps 2102 and 2104 were already completed by the user previously.

At 2106, a user will be presented with a type of "map" to use to match/allocate their "stories" to different potential interview questions. This process is conceptually similar to other "maps" created elsewhere, e.g. in FIG. 12. An exemplary screen for step 2106 is provided in FIG. 22.

In one embodiment of the method, the user may wish to repeat one of the prior steps in order to have more fodder for the interview. In a non-limiting example, a user may see a sample interview question at 2106 and realize that they need to "come up with a teamwork story"; in that scenario, the user could go back to an earlier step—interview map preparation could be iterative. Alternatively, a user may simply use the interview map 2106 in FIG. 22 to prepare for the interview, and does any potential interview practice elsewhere, or on their own thus choosing to end this process/sub-process upon completing step 2106.

In an embodiment, the user may choose to proceed to step 2108, interview practice, an exemplary screen of which is provided in FIG. 23. The method may provide a user with the ability to practice an individual question or groups of questions, 2110 or to do a full-length "mock interview" 2112. At 2114, a user may end the process, or may go back to a previous step to continue refining their preparation/practice.

FIG. 22 illustrates an example graphical user interface for preparing for an interview. In this screen, the user's "stories" 874 are displayed, as are some sample interview questions 2202. The user will be able to allocate or "map" some of their "stories" 874 to the different sample interview questions 2202 provided. The "mapping" can occur through a variety of input methods, including but not limited to "drag and drop", "swiping" (if on a tablet), selecting stories from a drop-down list, etc. The concept is one of allocating, in advance, possible things to cite about themselves in the actual interview. In this way, the user can start to think about which pieces of information about themselves they might convey, should they be asked a certain question during the actual interview.

Even if the exact same question is not asked during the actual interview, the very act of practicing can make a candidate stronger. While it may be impossible to know for certain exactly which questions will be asked during an interview, in many cases, depending upon the type of program the candidate is applying to, there are certain questions that can be reasonably expected. That is, certain schools, firms, or jobs may be famous for asking certain types of questions. For example, "Walk me through your resume" is an extremely common job interview question, and one can reasonably expect that question, or some variation of it, to be asked during an interview. Similarly, many strategy consulting or technology firms may be famous for asking certain "brain-teaser" or "case interview" questions, many business schools may be famous for asking candidates questions about leadership, many medical schools ask candidates about their motivations for pursuing careers in medicine, etc. Therefore, a pool of sample interview questions 2202 can be provided to the user, and can be personalized to them, depending upon what they are applying to.

In one embodiment, the practice interview questions 2202 may have meta-data associated with them. This meta-data may or may not be visible to the user. The meta-data could relate to several aspects of an interview question. For example, the meta-data could relate to the type of interview question (e.g. "Behavioral"), the general topic being asked (e.g. "Teamwork", "Motivation"), or be related to specific school or employer (e.g. "Harvard"; "medical school"), since certain schools or employers have well-known interview questions/interview patterns which may be programmed in to the system. In an embodiment, a user may be allowed to choose which questions 2202 they would like to see displayed. As a non-limiting example, at 2210, a user may wish to only prepare questions related to "leadership", or they may wish to prepare questions that are commonly asked by one school but not another. Allowing the user to select which type(s) of question to prepare can be beneficial if a user has a limited amount of time and would like to focus their preparation. Another embodiment would display only one interview question 2202 at a time, in a sort of step by step "wizard", thus forcing the user to focus their attention on preparing only one question at a time.

In an embodiment, the questions 2202 are displayed, and the user can map/match/allocate their "stories" or data points 874 to each question. A "story" 874 could be allocated more than once to various questions; alternatively, an embodiment may exist where a user can only allocate each "story" 874 once. Similarly, more than one story 874 could be allocated to one interview question 2202; or an embodiment may exist that forces the user to focus their answer by only mapping one story to each interview question. In addition, in another embodiment, the concept of "primary" 1206 and "supporting" 1208 data (already discussed in FIG. 12) may be used to further guide the user.

In an embodiment, open text boxes 2206 may also be provided to help the user jot down their thoughts; that is, to start to think about what they would actually say/which points they would actually make in the interview. In an embodiment, the open text boxes 2206 are not provided. In an alternate embodiment, each text box 2206 displays some sort of guidance text, to further guide the user. The user would then enter in some notes into the text box 2206 to begin to think through their response to the interview question more fully. The benefit of this feature is to help ensure that the user fully answers what interviewers are typically "looking for" when asking a certain interview question. It also helps prevent the interview-preparation equivalence of "writer's block", by giving the user a place to start; a starting-point from which to begin to craft their response.

Also provided at 2204 is some advice/hints for how to address a question. In a non-limiting example, this advice 2204 may "pop up" or be displayed in some other way. The advice 2204 may be associated with a specific interview question 2202, a specific practice text box 2206, neither, or both. Additional help/guidance may be provided elsewhere as well.

In an advanced embodiment, the system may proactively recommend which stories 874 would be best to use to answer individual interview questions 2202, based upon the meta-data associated with each. As a non-limiting example, if the interview question, "Tell me about a time you were part of a team that was having trouble getting along" has the meta-tags of "team-work", and "conflict resolution", then the system could recommend to the user to consider using any stories 874 that have the meta-tags (or "branding" or associated "brand traits") of "team-work" and/or "conflict resolution" as possible responses to the question. This "indication" of recommended stories could take on any visual form, e.g. a pop-up text box advising the user which stories to select; visually highlighting the recommended stories, perhaps in a separate color; visually subduing the stories that do not contain the recommended tags, perhaps by graying them out, or by removing them from the screen.

In a further sample embodiment, if the interview question would be best answered by a story that has the brand trait of "conflict resolution" in it, but none of the user's current stories contain this meta-tag ("brand trait"), the system may prompt the user to go back to the brainstorming step and come up with examples of times that they have successfully managed conflict. In this way, the user could ideally have at least one story to use for any vital interview questions relevant to the program or job they are trying to be selected for. The benefit of this embodiment would be to help guide the user to choose a better story or stories to answer the question, if it is asked in the actual interview, as knowledge of "what makes for a good answer" may not be clear for many users.

To be clear, not all users may be given the same set of potential interview questions to prepare for, as e.g. a liberal arts college interview may differ considerably from an engineering job interview. Therefore, the very brainstorming prompts provided (and related "stories" the system attempt to evoke) may differ by user, as may the sample interview questions provided to prepare. A liberal arts college applicant may not encounter many interview questions that would be best answered by stories that contain the "analytical" or "JavaScript" or "SQL" brand trait, whereas an applicant for a software engineering position may indeed need to prepare different types of stories. In sum, the system is adaptable to different types of users.

FIG. 23 illustrates an example graphical user interface for how a user may wish to prepare for their interview 2106. A user will be provided with an option to either practice individual questions or groups of questions 2110, or to do a full mock interview 2112. While this decision is presented to the user on the screen at 2202, the decision on what to practice may be presented to the user on an earlier screen. Should the user select that they wish to do a full mock interview 2204, then they will be taken to a practice screen that is a variation of FIG. 24 to be described in more detail below.

Should a user choose instead to not do a full mock interview yet, that is, to practice individual question(s) or group(s) of questions 2110, then at 2306 they may select which types of questions they would like to practice. As described above, in one embodiment, the practice interview questions 2202 may have meta-data associated with them. At 2306, in an embodiment, a user may choose to only practice interview questions 2202 that have certain meta-data or "tags" associated with them. Allowing the user to select which type(s) of question to practice can help them save time by focusing on the questions that tend to "trip them up" most often, thus allowing them to strengthen their replies to certain questions they may be asked during the actual interview. As above, this can also be beneficial if the user has limited time to practice and would like to focus on a few specific questions.

Alternatively, a user may wish to select a very specific question or questions to answer. In one embodiment, the sample questions 2202 may be displayed and the user may select one or more of these questions to practice. In one embodiment, all sample interview questions are displayed; in an alternative embodiment, only interview questions that are relevant to a user or that contain a certain piece of meta-data may be displayed. That is, if at 2306 a user selects that they would like to practice questions with the meta-tag of "teamwork", in an embodiment, the program could then proceed to give them all of the practice questions that are tagged "teamwork". In an alternative embodiment, if at 2306 a user selects "teamwork", then the questions 2202 displayed would only be those that contain the selected meta-tag(s). At that point, the user could then select individual questions from within that pool that they would like to practice.

The user would then able to practice answering a sample interview question or questions. This could involve the user recording themselves on their webcam or some other alternative recording device, such as a microphone, or via an "app" on their smartphone or tablet. As a non-limiting example, the interview questions to be practiced would be displayed one at a time. In an alternative example, all of the questions to be asked could be displayed all at once. In one embodiment, the interview question might only be displayed for a limited time, e.g. for a few seconds, or until the user indicates that they are ready to answer. This could mirror an actual interview scenario, where the question is not usually displayed while the candidate is answering. In another alternative embodiment, instead of being textually displayed, the essay question may consist of a video of a person asking the interview question, thus aiming to emulate the actual interview experience as closely as possible.

In an embodiment that utilizes a web-cam, the user may be able to simultaneously see themselves giving the answer while they are recording it. That is, the output from their webcam may be displayed on the screen at the same time that they are practicing. This may mirror their actual interview experience, in the scenario where online interviews are a part of the application process. For example, some business schools have started requiring brief video interviews be submitted along with the other parts of the application. If the video interview platforms being used by the schools/employers/etc. in question do indeed let the user see what they are recording, while they are recording it, then one embodiment of this system may do the same, in order to minor that experience and thus be more useful for practicing. Conversely, in an embodiment, the output of the user's webcam may not be displayed on the screen, while the user is recording. This could be beneficial in preparing for an in-person interview, since in "real life" a candidate may not be able to actually see themselves when they are interviewing. In that scenario, it may be better to not allow the user to see themselves while they are practicing their answer, since this may most minor their actual experience and thus prepare them better. In an alternate embodiment, the user or an administrator can choose whether or not they wish to see themselves while they are recording their practice answer.

As the user is recording their response, in one embodiment, they may have the option to pause the recording. An alternate embodiment may not allow for the recording to be paused, since in real life a candidate cannot simply "pause" a live interview. In an alternate embodiment, the user or an administrator may be able to select whether or not they want pausing to be enabled.

In an embodiment, there may be a time limit associated with a question. This is because sometimes certain interviews, in particular online/pre-recorded interviews, have explicit time limits. In other cases, there may not be a strict time limit on an answer, but there may be generally-accepted best practices as to how long certain types of responses should take (e.g. "The response to the 'walk me through your resume' question should ideally take three, but no more than five, minutes."). In an embodiment, a timer may be displayed while the user is recording their practice answer. In an alternate embodiment, recording may stop at a given point, regardless of whether the user is finished or not. In an alternate embodiment, some sort of warning may be given to the user that they are approaching their time limit. As a non-limiting example, a visual or audio cue may be given when there are only 15 seconds remaining on a question that has a 2 minute time limit. In an alternate embodiment, the timer may or may not be displayed to the user; perhaps after the recording is finished, they will be told how much time their response took, but to the extent that it may be distracting, or a crutch, in some embodiments it may be best to not display the timer while the practice recording is occurring. In an alternate embodiment, the user or an administrator may be able to select whether or not they want a timer to be displayed.

In an embodiment, the user may indicate to the system when they are finished with their practice response. In a non-limiting example, the user may press a "Stop" button to stop the recording.

In an embodiment, the user may be able to view the response they recorded. The graphical interface for the user may display only one practice response at a time, or may show several recorded practice responses to view—that is, several recorded interview responses may be displayed. In an embodiment that shows many recorded responses at once, the responses may be organized in a certain way, e.g. by tag. As a non-limiting example, all of the user's recorded practice responses to "teamwork" interview questions may be grouped together on one section of the page, or on its own standalone page. Alternatively, the previously recorded practice interview responses may be displayed in chronological or reverse chronological order.

In an embodiment, the user may choose to watch their practice response video. In an embodiment, there may be more than one practice video associated with a practice question, i.e. in the scenario where a user wishes to practice a response to an interview question multiple times, and then view all of those practice attempts later. In an alternate embodiment, a user may only save one practice response for each question.

In an embodiment, a user may be given the option to re-record a practice response to a video question.

In an embodiment, a user may be able to jot down notes associated with their practice responses. For example, they may wish to make a note to "explain my motivation a bit better". The note may be a general one to themselves, e.g. "Slow down; don't say 'um' so much.", or specific notes may be associated with individual practice videos. In an embodiment, the notes may be time-stamped to the video in question. That is, the user may be able to specify "At 2:13, need to describe this project in a more positive way."

In an embodiment, the user may be able to solicit feedback on their recorded responses from third parties. These third parties may be a colleague, admissions consultant, career coach, teacher, mentor, recommender, friend, parent, etc. In an embodiment, the user could select to share specific practice videos with a third party or multiple third parties. In an alternate embodiment, the user may select to share all of their practice videos with one or more third parties. In an embodiment, the user may send the third party some sort of message inviting them to comment. The practice video(s) may be embedded in the message, or, alternatively, the message may simply provide a link for the third party to log in to the system, or a link for the third party to see the video directly. In an embodiment, the practice videos may have some level of privacy protection, e.g. a password, before a third party can view it. In an embodiment, the third party may be able to jot down notes and feedback on the practice video response, as described above.

At 2110, the user may practice an individual question, or a few questions at a time, depending upon which options they selected, e.g., in FIG. 23. At 2112, the user may also have the option of being given a "full mock interview"—an example of which is shown at 2302 and 2304 in FIG. 23. In the case where the user selects a "full mock interview", they will be able to practice several questions in sequence.

The aim of step 2112 is to emulate an actual interview as closely as possible. In an embodiment, the system may display a preselected number of interview questions at random. As a non-limiting example, the system may display six questions chosen at random from the total pool of relevant questions 2202. In this embodiment, the number of questions that constitutes a "mock" interview may be predetermined by a system administrator; in an alternate embodiment, the user may select how many questions they would like to include in their "mock" interview. In an alternative embodiment, the mock interview may be driven more by time than by number of questions. As a non-limiting example, the mock interview may continue asking questions of the user until a specific time has been reached, e.g. thirty or sixty minutes.

In an embodiment, the mock interview may ask questions in a discrete sequence; that is, the questions may be asked individually. In that embodiment, the user may indicate when their response to a question is complete, thus letting the system know that it is time to display the next question. This could yield a series of individual practice video responses, one for each question. An alternate embodiment may proceed in a "rolling" basis, such that the end result is a longer video, e.g. a half-hour video of the full mock interview. In one embodiment, the user could indicate that they are done with their response, and the system will display its next question, but without a pause in between questions. This could more closely emulate an actual interview scenario, where a candidate may not be able to ask for a break in between questions.

In one embodiment, the questions to be selected for the mock interview could be drawn at random from the pool of relevant questions 2202. In an alternate embodiment, certain questions could be "required" to be asked. For example, every mock interview for an MBA applicant might require that the question "Why do you want an MBA?" be asked in any mock interview given. In an embodiment, the "required" questions could be designated as such by an administrator, or by the user. In an embodiment, the required questions may be designated to be asked in a specific order. As a non-limiting example, "Why do you want an MBA?" may be a required question for a mock MBA interview, but it may be designated as the second question to be asked. In an embodiment, the mock interview may consist of both required and randomly-chosen questions. That is, the mock interview may contain three required questions, but the remaining questions may be chosen at random from the pool of remaining relevant questions. The "relevant questions" may be deemed such by the type of program the user is applying to (that is, an MBA candidate would not be asked an engineering brain-teaser), or may be narrowed by more specifically by the tags/meta-data associated with the questions. For example, if a certain school is "famous" for asking certain types of questions, the user may indicate that they wish to practice a "mock interview for school Y", and only questions tagged with "School Y" may be displayed.

Other equivalent or alternative methods of implementing provision of services according to the present invention will be apparent. Various aspects of the invention have been described above by way of illustration, and the specific embodiments disclosed are not intended to limit the invention to the particular forms disclosed. The particular implementation of the provision of services may vary depending upon the particular context or application. By way of example, and not limitation, the provision of services described in the foregoing were principally directed to electronic device implementations; however, similar techniques may instead be applied to in-person advising or hard-copy materials, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

What is claimed is:

1. A computer system for assisting an applicant to complete one or more essay and/or short answer questions on at least one academic application by assigning user autobiographical stories that demonstrate one or more-character traits that each selected academic institution desires, comprising:
   a. a processor with a data collection unit configured to receive user selection of one or more academic applications;
   b. the processor with a brainstorming unit configured to analyze and display by the computer one or more brainstorming categories, and one or more brainstorming prompts for each brainstorming category,
   i. wherein a brainstorming category may comprise a desirable user character trait, a branding trait, or a branding statement;
   ii. a brainstorming prompt comprises a question in text format for an evidence comprising an autobiographical story that demonstrates the user possessing the brainstorming category;
   iii. wherein the brainstorming unit is configured to receive and store input comprising a brief description of an autobiographical story from a user's personal and/or professional life that provides the evidence that the user possesses the character or branding trait desired by a selected academic institution the user is applying to;
   c. the processor with a branding unit configured to,
   i. display by the computer lists of a character or a brand trait(s) or a brand positioning statement(s) determined by the computer to be suitable for a selected academic application; and,
   ii. receive and store one or more user selected, or a third-party inputted, user character or brand traits or brand positioning statements that are user selected or inputted by a third party, wherein each autobiographical story comprises at least one of the user character or brand traits or brand statements comprising a plurality of the autobiographical stories input in the brainstorming unit;
   iii. wherein each autobiographical story is assigned a nickname and a color designation indicative of the brand trait(s) it demonstrates;
   d. the processor with a mapping unit configured to display a one or more computer application elements comprising at least one short answer or an essay question in each selected academic application, and to receive and display user input comprising primary and secondary evidence of at least one user autobiographical story demonstrating the user possessing a character or brand trait the selected academic institution desires, and to assign at least one autobiographical story via dragging and dropping to each question of each selected academic application;
   e. the processor configured to assign a meta-data to the application elements related to a type or a topic of the short answer and/or essay question, and correlating by the computer the meta-data with the brand traits and/or the brand statements;
   f. the processor configured to display a one or more recommendations for user autobiographical stories for the user to utilize in the user answering an application element short answer or essay question based upon the correlation of the question's meta-data to the character trait or the brand statement;
g. wherein the mapping unit notifies the user when autobiographical stories are over allocated, under allocated, or inapplicable when answering one or more short answer or essay questions on one academic application, or when completing multiple academic applications; and
h. wherein the user is able to write a complete response to the short answer or essay question(s) based upon a mapping unit results
g. wherein the mapping unit notifies the user when autobiographical stories are over allocated when the story is applied to a question more than a threshold number of times;
h. wherein the mapping unit notifies the user when autobiographical stories are inapplicable when the brand traits associated with a story do not match the associated meta-data assigned to the question; and
i. wherein the mapping unit notifies the user when autobiographical stories are under allocated when the brand trait desired by the selected academic institution has not been selected for any of the questions or has been selected below a desired threshold number of times for the questions.

2. The computer system of claim 1, wherein the brainstorming unit is configured to:
a. analyze certain biographical data by the computer to determine potential user weaknesses and/or strengths, wherein when the computer determines additional user data is required to complete the analysis, then displaying questions by the computer and receiving user input to the questions; and,
b. displaying the computed user's strengths and weaknesses, and advice for the user to overcome the weaknesses, or emphasize the strengths.

3. The computer system of claim 1, wherein the brainstorming unit is configured to receive input by the user, and/or a third party at the request of the user, and/or imported from a third-party database.

4. The computer system of claim 1, further comprising the processor configured to:
a. when the branding unit determines that the user selected character or brand trait(s) or branding statement conflicts with the biographic data, then displaying a message indicating the conflict and repeating the preceding step; or,
b. wherein when the branding unit determines that the user biographic data correlates to certain character trait(s), then displaying a message recommending the usage of said traits; and/or
c. wherein when the branding unit determines that a selected application seeks specific brand traits, then the branding unit displays a message recommending the brainstorming of stories to demonstrate that the user possesses that trait.

5. The computer system of claim 1, further comprising an answer drafting unit configured to:
a. display by the computer one or more application short answer and essay questions and brand traits to assist the user in responding to the application questions;
b. receive and display a user input to the short answer and essay questions as one or more of a pre-writing outline, or a rough draft; and,
c. wherein the user input is in text format.

6. The computer system of claim 5, wherein a third-party logs into the computer, and/or receives and transmits an electronic message or a video to the user comprising a feedback on any data uploaded into the system, the data comprising one or more of a brainstorming data, a branding data, a map(s), and/or a draft(s).

7. A data processing method to assist an applicant to prepare answers for essay and/or short answer questions on at least one academic application, complete one or more essay and/or short answer questions on at least one academic application by assigning user autobiographical stories that demonstrate one or more-character traits that each selected academic institution desires, comprising:
a. receiving data by the computer identifying one or more user selected academic applications from a list of a plurality of academic applications a data collection unit receiving user selection of one or more academic applications, and user biographical data;
b. collecting by the computer biographical data about the user;
c. receiving and storing by the computer user input comprising brainstorming user biographical stories disclosing interesting and relevant information about the user appropriate for an academic application;
d. displaying by the computer, one or more essay and/or short answer questions general to the type of program or to a specific program the user is applying for;
e. receiving and storing by the computer user input for manually mapping and assigning via dragging and dropping a one or more nicknamed and color designated brainstorming stories to the questions;
f. wherein mapping comprises,
   i. assigning by the computer a meta-data to the questions related to the type or topic of the question; correlating by the computer the meta-data with brand traits and/or brand statements; and, displaying by the computer recommendations for the brainstorming stories to utilize in answering each question based upon the correlation of a question's meta-data to a brand trait or a brand statement;
   ii. receiving and storing by the computer user input comprising one or more brand traits and/or brand positioning statements, and a user's assignment of the brands traits and statements to the stories; and wherein the stories are divided into primary and secondary evidence that directly and indirectly demonstrates the user possesses the character or brand trait; and
f. wherein when the user lacks stories for the question, then repeating steps (c)-(e);
b. a brainstorming unit analyzing and displaying by the computer one or more brainstorming categories, and one or more brainstorming prompts for each brainstorming category,
   i. wherein a brainstorming category may comprise a desirable user character trait, a branding trait, or a branding statement;
   ii. a brainstorming prompt comprises a question in text format for an evidence comprising an autobiographical story that demonstrates the user possessing the brainstorming category;
   iii. wherein the brainstorming unit is configured to receive and store input comprising a brief description of an autobiographical story from a user's personal and/or professional life that provides the evidence that the user possesses the character or branding trait desired by a selected academic institution the user is applying to;

c. a branding unit,
  i. displaying by the computer lists of a character or a brand trait(s) or a brand statement(s) determined by the computer to be suitable for a selected academic application;
  ii. receiving and storing one or more user character or brand traits or brand statements that are user selected or inputted by a third party, wherein each autobiographical story comprises at least one of the user character or brand traits or brand statements;
  iii. wherein each autobiographical story is assigned a nickname and a color designation indicative of the brand trait(s) it demonstrates;
d. a mapping unit displaying a one or more computer application elements comprising a short answer or an essay question in each selected academic application, and to receive and display user input comprising primary and secondary evidence of at least one user autobiographical story demonstrating the user possessing a character or brand trait the selected academic institution desires, and to assign at least one autobiographical story via dragging and dropping to each question of each selected academic application;
e. assigning a meta-data to the application elements related to a type or a topic of the short answer and/or essay question, and correlating by the computer the meta-data with the brand traits and/or the brand statements;
f. displaying a one or more recommendations for the user autobiographical stories for the user to utilize in the user answering an application element short answer or essay question based upon the correlation of the question's meta-data to the character trait or the brand statement;
g. wherein the mapping unit notifies the user when autobiographical stories are over allocated when the story is applied to a question more than a threshold number of times;
h. wherein the mapping unit notifies the user when autobiographical stories are inapplicable when the brand traits associated with a story do not match the associated meta-data assigned to the question; and
i. wherein the mapping unit notifies the user when autobiographical stories are under allocated when the brand trait desired by the selected academic institution has not been selected for any of the questions or has been selected below a desired threshold number of times for the questions.

8. A one or more non-transitory computer-readable storage media having computer-executable instructions stored thereon which, when executed by one or more computers, cause the one or more computers to perform operations for assisting an applicant to complete one or more essay and/or short answer questions on an academic application by assigning user autobiographical stories that demonstrate one or more character and brand traits, and branding statements, specific to the academic application, comprising,
  a. generating a data collection graphical user interface for a user selection of one or more academic applications, wherein the applications are for a competitive process comprising an admission into an academic institution and/or an academic program;
  b. generating a brainstorming graphical user interface to analyze and display by the computer one or more brainstorming categories, and one or more brainstorming prompts for each brainstorming category,
  i. wherein a brainstorming category comprises a desirable user character trait, experience, or a branding statement;
  ii. a brainstorming prompt comprises a question in text format for evidence comprising a user autobiographical story that demonstrates the user possesses the brainstorming category;
  iii. wherein the brainstorming unit is configured to receive and store user input comprising a brief description of the autobiographical story from a user's personal and/or professional life that provides the evidence that the user possesses the brainstorming category;
  c. generating a branding graphical user interface for,
  i. displaying by the computer, lists of a character or a brand trait(s) or a brand positioning statement(s) suitable for a user selected application; and,
  ii. receiving and storing one or more user selected, or a third-party inputted, user character or brand traits or brand positioning statements that are user selected or inputted by a third party, wherein each autobiographical story comprises at least one of the user character or brand traits or brand statements, related to a story input during the brainstorming process, and the story is assigned a nickname and a color designation;
  iii. wherein each autobiographical story is assigned a nickname and a color designation indicative of the brand trait(s) it demonstrates;
  d. wherein when the branding process determines that a selected application seeks a specific brand trait, then the branding unit displays a message recommending the brainstorming of stories to demonstrate that the user possesses the specific brand trait; and
  e. generating a mapping graphical user interface comprising displaying by one or more application elements comprising at least one short answer or essay question in each selected academic application, and receiving and displaying user input comprising evidence of a user autobiographical story demonstrating the user possessing a brand trait the selected academic institution desires, and to assign via dragging and dropping one or more autobiographical stories to the short answer or essay question while using the story's color designation as a visual guide to ensure an even distribution of the stories in the academic application;
  f. assigning a meta-data to the application elements related to a type or a topic of the short answer and/or essay question, and correlating by the computer the meta-data with the brand traits and/or the brand statements;
  g. displaying a one or more recommendations for user autobiographical stories for the user to utilize in the user answering an application element short answer or essay question based upon the correlation of the question's meta-data to the character trait or the brand statement;
  h. wherein the mapping unit notifies the user when autobiographical stories are over allocated when the story is applied to a question more than a threshold number of times;
  i. wherein the mapping unit notifies the user when autobiographical stories are inapplicable when the brand traits associated with a story do not match the associated meta-data assigned to the question; and j. wherein the mapping unit notifies the user when autobiographical stories are under allocated when the brand trait desired by the selected academic institution has not been selected for any of the questions or has been selected below a desired threshold number of times for the questions.

\* \* \* \* \*